United States Patent
Takane et al.

(10) Patent No.: US 9,188,708 B2
(45) Date of Patent: Nov. 17, 2015

(54) FILM HAVING LOW REFRACTIVE INDEX FILM AND METHOD FOR PRODUCING THE SAME, ANTI-REFLECTION FILM AND METHOD FOR PRODUCING THE SAME, COATING LIQUID SET FOR LOW REFRACTIVE INDEX FILM, SUBSTRATE HAVING MICROPARTICLE-LAMINATED THIN FILM AND METHOD FOR PRODUCING THE SAME, AND OPTICAL MEMBER

(75) Inventors: Nobuaki Takane, Tsukuba (JP); Tomomi Kawamura, Chikusei (JP); Masato Nishimura, Chikusei (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 927 days.

(21) Appl. No.: 12/998,363

(22) PCT Filed: Oct. 13, 2009

(86) PCT No.: PCT/JP2009/067740
§ 371 (c)(1),
(2), (4) Date: Apr. 13, 2011

(87) PCT Pub. No.: WO2010/044402
PCT Pub. Date: Apr. 22, 2010

(65) Prior Publication Data
US 2011/0195239 A1    Aug. 11, 2011

(30) Foreign Application Priority Data

| Oct. 17, 2008 | (JP) | 2008-268562 |
| Oct. 22, 2008 | (JP) | 2008-271984 |
| Oct. 28, 2008 | (JP) | 2008-276725 |
| Feb. 12, 2009 | (JP) | 2009-030164 |
| Feb. 12, 2009 | (JP) | 2009-030165 |

(51) Int. Cl.

| B05D 5/06 | (2006.01) |
| G02B 1/118 | (2015.01) |
| B29D 11/00 | (2006.01) |
| C09D 5/00 | (2006.01) |
| C09D 7/12 | (2006.01) |
| G02B 1/113 | (2015.01) |
| G02B 5/02 | (2006.01) |
| C08K 3/22 | (2006.01) |
| C08K 7/26 | (2006.01) |

(52) U.S. Cl.
CPC ........ *G02B 1/118* (2013.01); *B29D 11/00865* (2013.01); *C09D 5/006* (2013.01); *C09D 7/1216* (2013.01); *C09D 7/1266* (2013.01); *G02B 1/113* (2013.01); *G02B 5/0242* (2013.01); *G02B 5/0268* (2013.01); *G02B 5/0278* (2013.01); *G02B 5/0294* (2013.01); *C08K 3/22* (2013.01); *C08K 7/26* (2013.01); *G02B 2207/107* (2013.01); *Y10T 428/24893* (2015.01)

(58) Field of Classification Search
CPC .......... G02B 1/10; G02B 1/105; G02B 5/201; G02B 6/443; G02B 1/118; G02B 5/0278; G02B 5/0294; G02B 5/0268; G02B 5/0242; G02B 2207/107; G11B 7/26; C03C 2217/425; C03C 25/106; C03C 25/1065; C03C 25/12; C03C 25/18; C09D 7/1216; C09D 5/006; C09D 7/1266; B29D 11/0865; Y10T 428/24893; C08K 3/22; C08K 7/26
USPC .................................................. 427/162–169
See application file for complete search history.

(56) References Cited

U.S. PATENT DOCUMENTS

2002/0160166 A1 * 10/2002 Hattori .......................... 428/212

FOREIGN PATENT DOCUMENTS

| CN | 101128752 B | 3/2011 |
| JP | 06-052796 | 2/1994 |
| JP | 08-062401 | 3/1996 |
| JP | 08-234007 | 9/1996 |
| JP | 11-038201 | 2/1999 |

| | | | | |
|---|---|---|---|---|
| JP | 11-202102 | 7/1999 | | |
| JP | 2000-156486 | 6/2000 | | |
| JP | 2002-006108 | 1/2002 | | |
| JP | 2003-158125 | 5/2003 | | |
| JP | 2004-109624 | 4/2004 | | |
| JP | 2004-302112 | 10/2004 | | |
| JP | 2005-266252 | 9/2005 | | |
| JP | 2006-208726 | 8/2006 | | |
| JP | 2006-297680 | 11/2006 | | |
| JP | 2006-301124 | 11/2006 | | |
| JP | 2006-301125 | 11/2006 | | |
| JP | 2006297680 A | * | 11/2006 | |
| JP | 2006-342048 A | | 12/2006 | |
| JP | 2007-199702 | 8/2007 | | |
| JP | 2008-114413 | 5/2008 | | |
| JP | 2009113484 A | * | 5/2009 | ............... B32B 9/00 |
| TW | 200835757 A | | 9/2008 | |
| WO | WO 2007/049440 A1 | | 5/2007 | |

OTHER PUBLICATIONS

Machine Translation of JP2009113484.* http://www.engineeringtoolbox.com/linear-expansion-coefficients-d_95.html, accessed online Jun. 7, 2014.*
http://iopscience.iop.org/0295-5075/70/5/614/fulltext/, accessed online Jun. 7, 2014.*
JP 2006297680 machine translation.*
International Preliminary Report on Patentability issued on May 26, 2011 in International Application No. PCT/JP2009/067740 (6 pages).
Office Action from corresponding Chinese Application No. 200980140674.9 issued Mar. 13, 2013.
G. Decher et al., "Buildup of ultrathin multilayer films by a self-assembly process: III. Consecutively alternating adsorption of anionic and cationic polyelectrolytes on charged surfaces", Thin Solid Films, 210/211 (1992), pp. 831-835.
International Search Report for Application PCT/JP2009/067740 mailed Jan. 26, 2010.
Taiwanese Office Action of Appln. No. 10320720130 dated May 27, 2014 with English translation.
Office Action from Japan Patent Office in the corresponding Patent Application No. 2010-533900 dated May 7, 2014, 2 pages in Japanese and 4 pages in English Translation.
Office Action issued on Apr. 29, 2015, by the Korean Intellectual Property Office in regards to counterpart Korean Patent Application No. 10-2011-7011191.
Substantive Examination Adverse Report, issued by the Intellectual Property Corporation of Malaysia on Jul. 31, 2015, and in regards to counterpart Malaysian Application No. PI 2011001665.

* cited by examiner

*Primary Examiner* — Michael Wieczorek
*Assistant Examiner* — Michael G Miller
(74) *Attorney, Agent, or Firm* — Fitch, Even, Tabin and Flannery LLP

(57) ABSTRACT

Provided is a film having a low refractive index, which can be formed under normal temperature and pressure while obtaining a lower refractive index, has excellent adhesion with a solid substrate, and does not lose geometric optical properties, such as the diffusibility or light-harvesting capability attributed to the microstructure. Also disclosed is a method for producing the same. The film having a low refractive index is obtained by causing an electrolyte polymer and microparticles to be alternately adsorbed on the surface of a solid substrate and bringing the resulting microparticle-laminated film into contact with a silicon compound solution in order to bond the solid substrate with microparticles and microparticles with microparticles. The silicon compound solution is selected from (1) the hydrolysis product of alkoxysilane (I) wherein the functional groups are formed from hydrolyzable groups and non-hydrolyzable organic groups, and the condensation reaction product thereof, (2) the hydrolysis product of a mixture of alkoxysilane (I) and alkoxysilane (II) wherein the functional groups are formed from hydrolyzable groups alone, and the condensation reaction product thereof; and (3) a mixture of hydrolysis product and condensation product thereof according to (1) and alkoxysilane (II).

8 Claims, 3 Drawing Sheets

FILM HAVING LOW REFRACTIVE INDEX FILM AND METHOD FOR PRODUCING THE SAME, ANTI-REFLECTION FILM AND METHOD FOR PRODUCING THE SAME, COATING LIQUID SET FOR LOW REFRACTIVE INDEX FILM, SUBSTRATE HAVING MICROPARTICLE-LAMINATED THIN FILM AND METHOD FOR PRODUCING THE SAME, AND OPTICAL MEMBER

TECHNICAL FIELD

The present invention relates to a low refractive index film which is used in optical members and a method for producing the low refractive index film, a coating liquid set for a low refractive index film, an anti-reflection film including a low refractive index film and a method for producing the anti-reflection film, a substrate having a microparticle-laminated thin film and a method for producing the substrate, and an optical member.

BACKGROUND ART

A low refractive index film is formed on an optical member as an optical functional film included in an anti-reflection film, a reflective film, a half-transparent half-reflective film, a visible light-reflective infrared-transparent film, an infrared-reflective visible light-transparent film, a blue reflective film, a green reflective or red reflective film, an emission line cutoff filter or a color correction film.

Without being limited to optical members having a flat surface shape, in optical functional members such as a Fresnel lens, a lenticular lens and a microlens, which are used in brightness enhancing lens films for liquid crystal backlight, diffusion films or screens for video projection televisions, desired geometric optical performances are obtained in all of such members by using resin materials having a microstructure. Even for the surfaces of these microstructures, an optical functional film including a low refractive index film is needed.

A low refractive index film serves as an anti-reflection film having a single layer structure and exhibits the anti-reflection performance in a broader range of wavelength. Furthermore, the anti-reflection film having a single layer structure brings about a reduction in cost due to a decreased number of layers as compared with an anti-reflection film having a multilayer structure. In regard to the refractive index of the anti-reflection film having a single layer structure, when the substrate is a transparent material such as a resin material, a low refractive index in the range of 1.2 to 1.3 is desirable.

Examples of the method for forming a low refractive index film include a gas phase method such as a vapor deposition method or a sputtering method, and a coating method such as a dipping method or a spin coating method.

However, a representative thin film having a low refractive index obtained by a gas phase method is an $MgF_2$ film having a refractive index of 1.38 or an LiF film having a refractive index of 1.39, and the performance of these thin films as single layer anti-reflection films is low.

Furthermore, representative examples of the material for a low refractive index film that is obtained by a coating method include a fluoropolymer material having a refractive index of 1.35 to 1.4, and a porous material obtained by fusing microparticles formed of a polymer of a fluoromonomer having a refractive index of 1.37 to 1.46 (see, for example, Patent Document 1). However, a fluoropolymer material having a refractive index of 1.3 or less has not yet been obtained.

Meanwhile, examples of a low refractive index film which is converted from a film having a porous structure obtained by calcination, include a porous SOG film and a porous film of magnesium fluoride (see, for example, Patent Documents 2 and 3).

However, a porous SOG film requires a calcination treatment at 200° C. or higher in order to have a refractive index of 1.3 or less, while a porous film of magnesium fluoride requires a heat treatment for one hour at 150° C. Accordingly, from the viewpoint of the heat resistance of the resin material or the structure maintenance of the microstructure, a low refractive index film requiring calcination is not suitable as an anti-reflection film for the use in resin substrates.

Also in the case where a solid substrate has a microstructure such as a Fresnel lens or a lenticular lens, a low refractive index film having a single layer structure is effective in suppressing reflected light at the lens surface and suppressing the ghost of an image that is projected on a screen for video projection or the like. Furthermore, an anti-reflection film can increase the amount of transmitted light in other optical functional members as well.

In a gas phase method, a thin film can be formed to conform to the shape of a microstructure. However, since a gas phase method requires a vacuum apparatus, the production cost rises. Furthermore, the film formed on the inner walls of the vacuum apparatus peels off and falls on the low refractive index film, remaining as foreign matter. In addition, substrate heating that is commonly carried out to obtain adhesiveness of the low refractive index film, causes cracks in the microstructure formed of a resin due to thermal stress (see, for example, Patent Document 4).

A coating method does not require a vacuum apparatus, and the foreign matter originating from a vacuum apparatus is not generated.

However, in a spin coating method, the coating material cannot be prevented from remaining on the recess areas of the microstructure, and the low refractive index film at the recess areas is thickened. When the low refractive index film does not conform to the shape of the microstructure as such, the geometric optical performance such as diffusibility and light-harvesting capability attributed to the microstructure is impaired.

On the other hand, in a dip coating method or the like, the film thickness can be controlled by the lifting speed, and therefore, it is also possible to make the coating material to conform to the shape of the microstructure.

However, since it is necessary to slow down the lifting speed even to several ten micrometers per second, the production cost noticeably increases (see, for example, Patent Document 5).

As a method for forming a thin film having a thickness in a nanometer scale from a solution, an alternate lamination method has been suggested (see, for example, Non-Patent Document 1). In the alternative lamination method, a thin film is formed by electrostatic adsorption in a liquid, and therefore, a thin film formed in satisfactory conformity with the shape of the microstructure can be obtained. Furthermore, since the method is carried out by a normal temperature process, the method does not cause thermal damage to the resin material.

A thin film obtained by alternately laminating an electrolyte polymer having a positive charge and an electrolyte polymer having a negative charge, is turned into a low refractive index film having a refractive index of about 1.2 by generating voids in the thin film through a hydrochloric acid treatment (see, for example, Patent Documents 6 and 7).

On the other hand, a microparticle single layer film produced by electrostatically adsorbing one layer of microparticles on an electrolyte polymer layer, is turned into a low refractive index film without requiring an acid treatment or the like (see, for example, Patent Documents 8 and 9). The reason why a microparticle single layer film is turned into a low refractive index film is that the surface concavo-convex shape formed by microparticles having a diameter of 100 nm or more continuously changes the refractive index, and the voids between the microparticles decrease the average refractive index.

However, a microparticle single layer film using microparticles having a diameter exceeding 100 nm scatters and diffuses visible light, and is therefore inappropriate for optical members which require transparency.

Furthermore, in the case of an optical member having a microstructure on the surface, for example, when the microstructure is a lens, if the low refractive index film at the lens surface scatters and diffuses light, the low refractive index film causes a decrease in the geometric optical performance, such as inability to focus light.

Meanwhile, in the case of using microparticles having a diameter of 100 nm or less, a transparent microparticle-laminated film is likely to be obtained.

However, the refractive index decreasing effect attributable to the surface concavo-convex shape cannot be obtained. Accordingly, lowering of an average refractive index of the microparticle-laminated film is achieved by increasing the density of voids between the microparticles (see, for example, Patent Documents 10 to 12).

These microparticle-laminated films on optical members need to have adhesiveness to substrates. The microparticle-laminated films also need durability against an adhesive tape used for surface protection, prevention of contamination or fixing at the time of processing, transport, assembly and storage of optical members having microparticle-laminated films formed thereon.

On the other hand, in recent years, under the purpose of further miniaturization and an enhancement of production efficiency of camera modules used in image pickup apparatuses such as mobile phones, production is carried out such that a camera module produced by mounting an image pickup element or the like on a lens module, is packaged on a circuit board having electronic parts mounted thereon, and then the assembly is placed in a reflow furnace to be solder welded.

In this production method, all of the constituent parts need to have heat resistance performance at the reflow temperature.

Furthermore, it is preferable for an image pickup lens module which uses an image pickup element such as CCD or CMOS and is incorporated into a mobile phone or the like, to have staunch reproducibility of object.

Recently, image pickup elements have been miniaturized, and concomitantly with this, the demand for miniaturization and compactization of image pickup lenses that are incorporated into the image pickup elements, is also inevitably increasing.

Additionally, image pickup elements are being produced to have a larger number of pixels in the order of megapixels, while image pickup lens modules using these image pickup elements are demanded to be inexpensive and lightweight.

However, in a small-sized image pickup lens module using a transparent plastic lens, there is a risk that the lens module cannot withstand the reflow temperature reaching up to 260° C. or higher and may be deformed.

Therefore, packaging of an image pickup lens module on a substrate is provided, through the use of connectors and the like, in a separate process after a solder reflow process.

Therefore, the cost for connectors and the cost for installation process are inevitable, and even from the viewpoint of lowering the cost, there is a demand for a small-sized image pickup lens module that can withstand the solder reflow temperature.

Particularly, plastics are vulnerable to heat and are prone to undergo expansion or deformation, and many of them have a problem in the deterioration of quality caused by these properties.

Furthermore, a metal oxide thin film formed by vacuum deposition or the like, or an anti-reflection film based on a metal fluorine compound has a very small coefficient of thermal expansion compared with plastics. Therefore, such an anti-reflection film is prone to have cracks (fissure) that are attributed to the heat-induced expansion and deformation of the plastic that serves as a substrate, and there is a possibility that cracks may occur at temperatures that can be encountered in the daily life, for example, at a site exposed to direct sunlight, inside a car, or in a bathroom.

As a technology previously disclosed in order to solve these problems, Patent Document 13 describes a method for producing an anti-reflection film according to a method of plasma polymerization of an organometallic compound.

Patent Document 14 also describes a method of using a hydrolysis product of an organosilane in an anti-reflection film.

PRIOR ART DOCUMENTS

Patent Documents

Patent Document 1: Japanese Patent No. 3718031
Patent Document 2: Japanese Patent Application Laid-Open (JP-A) No. 2003-158125
Patent Document 3: JP-A No. 2004-302112
Patent Document 4: JP-A No. 2000-156486
Patent Document 5: Japanese Patent No. 2905712
Patent Document 6: JP-A No. 2004-109624
Patent Document 7: JP-A No. 2005-266252
Patent Document 8: JP-A No. 2002-006108
Patent Document 9: JP-A No. 2006-208726
Patent Document 10: JP-A No. 2006-297680
Patent Document 11: JP-A No. 2006-301124
Patent Document 12: JP-A No. 2006-301125
Patent Document 13: JP-A No. 8-62401
Patent Document 14: JP-A No. 11-202102

NON-PATENT DOCUMENT

Non-Patent Document 1: Thin Solid Films, 210/211, p. 831 (1992)

DISCLOSURE OF THE INVENTION

Problems to be Solved by the Invention

However, in the method of Patent Document 13, plasma polymerization requires a high running cost, including the facility cost, and is not easy to be applied to the production of lenses at low cost.

Furthermore, in the method of Patent Document 14, there is a problem that the product has insufficient properties as an anti-reflection film as compared with a multilayer anti-reflection film of a metal oxide. Also, unlike a vapor deposition method, it is difficult to obtain uniformity of the film and reproducibility.

Examples of the material to be used include fluorides having low refractive indices (or oxides having low refractive indices) and oxides having high refractive indices. Since these oxides and fluorides can have large differences in the refractive index, a high performance anti-reflection film can be produced by laminating these.

However, this kind of the anti-reflection film needs to be formed using a vapor deposition machine, and the production method has been a cost-consuming technique. In addition, when a vapor deposition machine is used, it is not easy to avoid the attachment of foreign matter resulting from the peeling of a deposited material from the vacuum tank, and the process is accompanied by a large decrease in yield.

Moreover, forming an inorganic multilayer film on a surface of a microlens made of an organic resin is a process inferior in terms of reliability, from the viewpoint of the difference between the respective coefficients of thermal expansion, the difference in the degree of moisture content, and the like.

Particularly, in a solid image pickup element having a constitution including a color filter that is highly hygroscopic, or in a solid image pickup element having a constitution in which a thickness of resin disposed between a lower part of a microlens and a light receiving element is as large as 2 μm or more, there is a serious problem that when an inorganic multilayer film that lacks moisture proofness in most cases, is laminated on a surface of a microlens, swelling or cracking occurs in a process of applying heat during the packaging of a solid image pickup element.

Furthermore, this may also result in that, during the storage of a solid image pickup element obtained after production, the resin as a constituent component slowly absorbs moisture, and the absorbed moisture causes a rapid volume expansion as well as a release of a decomposition gas resulting from hydrolysis of the resin, due to a high temperature treatment upon packaging. In addition to that, the absorbed moisture may also lift up the inorganic multilayer film that lacks moisture proofness in most cases, and expand to destroy the solid image pickup element.

As such, film formation using a vapor deposition machine is not considered preferable as a process for forming a function to be imparted to semiconductor devices, and can be said to be a technique that is wished to be avoided.

On the other hand, for example, the technology disclosed in JP-A No. 4-259256 is a technology of forming a magnesium fluoride film on a surface of a microlens, and the technology disclosed in Japanese Patent No. 2719238 is a technology of forming a fluorine-containing resin film according to a Langmuir-Blodgett method (LB method). However, because these anti-reflection films repel photoresists, a photoresist cannot be formed on such an anti-reflective film, and even if a photoresist could be formed, the anti-reflection film has a fundamental flaw that the film would be peeled off from an underlying surface of a microlens by an alkali solution. Thus, the anti-reflection films have not been put to practical use.

In the case of forming an anti-reflection film by a vapor deposition method using an inorganic material such as glass as a substrate, vapor deposition is usually carried out while heating the substrate, in order to increase the adhesive strength of the film. Furthermore, depending on the film material, it is desirable to carry out vapor deposition while heating the substrate to a temperature at which phase change occurs. For example, in the case of forming an anti-reflection film formed of magnesium fluoride on a surface of a glass lens or a glass plate, when the film is heated to a temperature of 350° C. or higher, which is the phase transition temperature of magnesium fluoride, the film firmly adheres.

On the other hand, in the case of forming an anti-reflection film using a microlens as a substrate, it is necessary to take caution on the temperature of the substrate. This is because when the temperature of the microlens rises excessively, problems such as a decrease in the transmittance of the microlens, and coloration, occur.

However, when vapor deposition is carried out at a temperature of about 200° C. or lower, a sufficient adhesive strength of the anti-reflection film cannot be obtained. Furthermore, when temperature change occurs after the film formation, there are occasions in which cracks occur owing to residual stress, depending on the film material.

Particularly, in the case of a solid image pickup apparatus, a process essentially requiring heating is in waiting after the process of forming an anti-reflection film. Therefore, when a film is to be formed on a microlens, even if a same resin is used, the process is different from the process used in the case of forming a film on, for example, a plastic lens, so that there has been a characteristic problem that when an anti-reflection film is deposited at a low temperature, cracks are likely to be generated in the film during the subsequent production process.

An object of the present invention is to provide a low refractive index film which gives a lower refractive index, can be formed at normal temperature and normal pressure, has excellent adhesiveness to solid substrates, can conform to the shape of a microstructure even if a solid substrate has a microstructure, and does not impair the geometric optical performance such as diffusibility or light harvesting property brought by the microstructure, and a method for producing the low refractive index film.

Furthermore, another object of the present invention is to provide an anti-reflection film which is capable of suppressing reflected light and enhancing transmitted light, and can convert reflected light and transmitted light into an achromatic color, and a method for producing the anti-reflection film.

Still another object of the present invention is to provide a coating liquid set for a low refractive index film, used for the formation of the low refractive index film described above.

In addition, it is another object of the present invention to provide a microparticle-laminated thin film-attached substrate having a large adhesive power between the microparticle-laminated thin film and the substrate and having resistance to thermal expansion, and a method for producing the substrate, and to provide an optical member having the microparticle-laminated thin film-attached substrate.

Means for Solving the Problems

That is, the means for solving the problems described above are as follows.

(1) A low refractive index film produced by making an electrolyte polymer and microparticles to be alternately adsorbed on a surface of a solid substrate to form a microparticle-laminated film, and bringing the microparticle-laminated film into contact with a silicon compound solution, to bind the solid substrate with the microparticles and to bind the microparticles with one another, wherein the silicon compound solution contains any one selected from among (1) a hydrolysate and a condensation reaction product of the hydrolysate, of an alkoxysilane (I) having functional groups composed of hydrolyzable groups and non-hydrolyzable organic groups; (2) a hydrolysate and a condensation reaction product of the hydrolysate, of a mixture of the alkoxysilane (I) with an alkoxysilane (II) having functional groups composed only of hydrolyzable groups;

and (3) a mixture of the hydrolysate and the condensation reaction product of the hydrolysate of the alkoxysilane (I), with the alkoxysilane (II).

(2) A low refractive index film produced by making an electrolyte polymer and microparticles to be alternately adsorbed on a surface of a solid substrate to form a microparticle-laminated film, and bringing the microparticle-laminated film into contact with a silicon compound solution, to bind the solid substrate with the microparticles and to bind the microparticles with one another, wherein the silicon compound solution contains any one selected from among (4) an alkoxysilane (II) having functional groups composed only of hydrolyzable groups; (5) a hydrolysate and a condensation reaction product of the hydrolysate (III), of the alkoxysilane (II); and (6) a mixture of the alkoxysilane (II), with the hydrolysate and the condensation reaction product of the hydrolysate (III), and the solid substrate has a microstructure at the surface.

(3) The low refractive index film according to the above item (1) or (2), wherein the microparticles in the microparticle-laminated film include one or more kinds of porous silica microparticles, hollow silica microparticles, and silica microparticles having a form in which primary particles are connected.

(4) The low refractive index film according to any one of the above items (1) to (3), wherein an average primary particle diameter of the microparticles in the microparticle-laminated film is equal to or more than 1 nm and equal to or less than 100 nm.

(5) The low refractive index film according to any one of the above items (1) to (4), wherein the solid substrate has a microstructure for obtaining any one of a lenticular lens, a Fresnel lens, a prism, a microlens array, a light guiding microstructure, a light diffusion microstructure and a hologram, on the surface.

(6) An anti-reflection film including the low refractive index film according to any one of the above items (1) to (5).

(7) A method for producing a low refractive index film formed on a surface of a solid substrate, the method including:

(i) a step of bringing the surface of the solid substrate into contact with an electrolyte polymer solution (liquid A) or a microparticle dispersion liquid (liquid B), and a subsequent step of rinsing;

(ii) a step of bringing the surface of the solid substrate obtained after the contact with the liquid A, into contact with a dispersion liquid of microparticles having a charge opposite to that of an electrolyte polymer of the liquid A, or a step of bringing the surface of the solid substrate obtained after the contact with the liquid B, into contact with an electrolyte polymer solution having a charge opposite to that of microparticles of the liquid B, and a subsequent step of rinsing;

(iii) a step of forming a microparticle-laminated film by alternately repeating the step (i) and step (ii); and (iv) a step of bringing the microparticle-laminated film into contact with a silicon compound solution (liquid C) containing any one selected from among (1) a hydrolysate and a condensation reaction product of the hydrolysate, of an alkoxysilane (I) having functional groups composed of hydrolyzable groups and non-hydrolyzable organic groups; (2) a hydrolysate and a condensation reaction product of the hydrolysate, of a mixture of the alkoxysilane (I) with an alkoxysilane (II) having functional groups composed only of hydrolyzable groups; and (3) a mixture of the hydrolysate and the condensation reaction product of the hydrolysate of the alkoxysilane (I), with the alkoxysilane (II).

(8) A method for producing a low refractive index film formed on a surface of a solid substrate, the method including:

(i) a step of bringing the surface of the solid substrate into contact with an electrolyte polymer solution (liquid A) or a microparticle dispersion liquid (liquid B), and a subsequent step of rinsing;

(ii) a step of bringing the surface of the solid substrate obtained after the contact with the liquid A, into contact with a dispersion liquid of microparticles having a charge opposite to that of the electrolyte polymer of the liquid A, or a step of bringing the surface of the solid substrate obtained after the contact with the liquid B, into contact with an electrolyte polymer solution having a charge opposite to that of the microparticles of the liquid B, and a subsequent step of rinsing;

(iii) a step of forming a microparticle-laminated film by alternately repeating the step (i) and step (ii); and (iv) a step of bringing the microparticle-laminated film into contact with a silicon compound solution (liquid C) containing any one selected from among (4) an alkoxysilane (II) having functional groups composed only of hydrolyzable groups; (5) a hydrolysate and a condensation reaction product of the hydrolysate (III), of (II); and (6) a mixture of (II) and (III), wherein the solid substrate has a microstructure at the surface.

(9) The method for producing a low refractive index film according to the above item (7) or (8), wherein the microparticles of the microparticle dispersion liquid include one or more kinds of porous silica microparticles, hollow silica microparticles, and silica microparticles having a shape in which primary particles are connected.

(10) The method for producing a low refractive index film according to any one of the above items (7) to (9), wherein an average primary particle diameter of the microparticles of the microparticle dispersion liquid is equal to or more than 1 nm and equal to or less than 100 nm.

(11) The method for producing a low refractive index film according to any one of the above items (7) to (10), wherein the solid substrate has a microstructure for obtaining any one of a lenticular lens, a Fresnel lens, a prism, a microlens array, a light guiding microstructure, a light diffusion microstructure and a hologram, on the surface.

(12) A method for producing an anti-reflection film, including the method for producing a low refractive index film according to any one of the above items (7) to (11).

(13) A coating liquid set for a low refractive index film, including an electrolyte polymer solution, a microparticle dispersion liquid and a silicon compound solution, wherein a charge carried by an electrolyte polymer in the electrolyte polymer solution and a charge carried by microparticles in the microparticle dispersion liquid have opposite signs, and the silicon compound solution contains any one selected from among (1) a hydrolysate and a condensation reaction product of the hydrolysate, of an alkoxysilane (I) having functional groups composed of hydrolyzable groups and non-hydrolyzable organic groups; (2) a hydrolysate and a condensation reaction product of the hydrolysate, of a mixture of the alkoxysilane (I) with an alkoxysilane (II) having functional groups composed only of hydrolyzable groups; and (3) a mixture of the hydrolysate and the condensation reaction product of the hydrolysate of the alkoxysilane (I), with the alkoxysilane (II).

(14) A coating liquid set for a low refractive index film, including an electrolyte polymer solution, a microparticle dispersion liquid and a silicon compound solution, wherein a charge carried by an electrolyte polymer in the electrolyte polymer solution and a charge carried by microparticles in the microparticle dispersion liquid have opposite signs, and the silicon compound solution contains any one selected from among (4) an alkoxysilane (II) having functional groups composed only of hydrolyzable groups; (5) a hydrolysate and a condensation reaction product of the hydrolysate (III), of (II); and (6) a mixture of the alkoxysilane (II) with the condensation reaction product (III).

(15) The coating liquid set for a low refractive index film according to the above item (13) or (14), wherein the microparticles in the microparticle dispersion liquid include one or more kinds of porous silica microparticles, hollow silica microparticles, and silica microparticles having a shape in which primary particles are connected.

(16) The coating liquid set for a low refractive index film according to any one of the above items (13) to (15), wherein an average primary particle size of the microparticles in the microparticle dispersion liquid is equal to or more than 1 nm and equal to or less than 100 nm.

(17) The coating liquid set for a low refractive index film according to any one of the above items (13) to (16), wherein a concentration of the microparticles of the microparticle dispersion liquid is equal to or more than 0.005% by mass and equal to or less than 15% by mass.

(18) The coating liquid set for a low refractive index film according to any one of the above items (13) to (17), wherein an ionic group in the electrolyte polymer solution is one or more selected from the group consisting of a primary, secondary or tertiary amino group, a salt of the amino group, and a quaternary ammonium type group.

(19) The coating liquid set for a low refractive index film according to any one of the above items (13) to (18), wherein a concentration of the electrolyte polymer in the electrolyte polymer solution is equal to or more than 0.0003% by mass and equal to or less than 3% by mass.

(20) A microparticle-laminated thin film-attached substrate produced by forming a microparticle-laminated thin film having voids on a plastic substrate having a coefficient of thermal expansion of 50 to 350 (ppm/K), wherein the microparticle-laminated thin film has an electrolyte polymer and microparticles alternately adsorbed thereto, and when the microparticle-laminated thin film is brought into contact with an alcoholic silica sol product, the plastic substrate is bonded with the microparticles, while the microparticles are bonded with one another.

(21) The microparticle-laminated thin film-attached substrate according to the above item (20), wherein a porosity of the microparticle-laminated thin film is 40% to 80%.

(22) The microparticle-laminated thin film-attached substrate according to the above item (20) or (21), wherein the plastic substrate has a change ratio of a reflection ratio before and after heating, of 2% or less, in a temperature range of a thermal melting temperature or thermal decomposition temperature of the plastic substrate or lower.

(23) The microparticle-laminated thin film-attached substrate according to any one of the above items (20) to (22), wherein the alcoholic silica sol product contains at least one or more kinds of alcoholic silica sols prepared by hydrolyzing a lower alkyl silicate represented by the following formula (I), in any one of methanol and ethanol:

[Formula 1]

$$(OR^1)_n Si(R^2)_{4-n} (n=1\sim 4) \tag{1}$$

wherein $R^1$ represents a methyl group or an ethyl group; and $R^2$ represents a non-hydrolyzable organic group.

(24) The microparticle-laminated thin film-attached substrate according to the above item (23), wherein $R^2$ of the formula (I) is any one selected from a methyl group, an ethyl group and a phenyl group.

(25) The microparticle-laminated thin film-attached substrate according to any one of the above items (20) to (24), wherein a primary particle size of the microparticles is 2 to 100 nm.

(26) The microparticle-laminated thin film-attached substrate according to any one of the above items (20) to (25), wherein the microparticles are formed of an inorganic oxide.

(27) The microparticle-laminated thin film-attached substrate according to the above item (26), wherein the inorganic oxide is an oxide containing at least one element selected from silicon, aluminum, zirconium, titanium, niobium, zinc, tin, cerium and magnesium.

(28) The microparticle-laminated thin film-attached substrate according to any one of the above items (20) to (27), wherein the microparticles have any one or more of a shape in which primary particles are connected in a beaded form, a porous shape and a hollow structure.

(29) An optical member having the microparticle-laminated thin film-attached substrate according to any one of the above items (20) to (28).

(30) The optical member according to the above item (29), wherein the microparticle-laminated thin film-attached substrate has an anti-reflection function.

(31) The optical member according to the above item (29), wherein the microparticle-laminated thin film-attached substrate has a half-transparent half-reflection function.

(32) The optical member according to the above item (29), wherein the microparticle-laminated thin film-attached substrate has a reflective function.

(33) A method for producing a microparticle-laminated thin film-attached substrate in which a microparticle-laminated thin film having voids is formed on a plastic substrate, the method including:

(A) a step of having a plastic substrate having a coefficient of thermal expansion of 50 to 350 (ppm/K), brought into contact with or coated thereon with any of an electrolyte polymer solution and a microparticle dispersion liquid;

(B) a step of having the plastic substrate obtained after the contact or coating with the electrolyte polymer solution, brought into contact with or coated thereon with a dispersion liquid of microparticles having a charge opposite to that of an electrolyte polymer of the electrolyte polymer solution, or a step of having the plastic substrate obtained after the contact or coating with the microparticle dispersion liquid, brought into contact with or coated thereon with a solution of an electrolyte polymer having a charge opposite to that of microparticles of the microparticle dispersion liquid; and (C) a step of having the plastic substrate obtained after the contact or coating with the electrolyte polymer solution or the microparticles, brought into contact with or coated thereon with an alcoholic silica sol product.

(34) The method for producing a microparticle-laminated thin film-attached substrate according to the above item (33), wherein the step (A) and the step (B) are alternately repeated two or more rounds, and then the step (C) is carried out.

(35) The method for producing a microparticle-laminated thin film-attached substrate according to the above item (33) or (34), wherein (D) a rinsing step is carried out after the step (A) and/or the step (B).

(36) The method for producing a microparticle-laminated thin film-attached substrate according to any one of the above items (33) to (35), wherein a heat treatment is carried out after the step (C).

(37) The method for producing a microparticle-laminated thin film-attached substrate according to the above item (36), wherein a temperature of the heat treatment is a glass transition temperature of the plastic substrate or a temperature higher than the glass transition temperature.

(38) The method for producing a microparticle-laminated thin film-attached substrate according to the above item (36), wherein the temperature of the heat treatment is 20 to 260° C.

The disclosure of the present application is related to the subject matters described in Japanese Patent Application No. 2008-268562 filed in Japan on Oct. 17, 2008, Japanese Patent Application No. 2008-271984 filed in Japan on Oct. 22, 2008, Japanese Patent Application No. 2008-276725 filed in Japan on Oct. 28, 2008, Japanese Patent Application No. 2009-30164 filed in Japan on Feb. 12, 2009, and Japanese Patent Application No. 2009-30165 filed in Japan on Feb. 12, 2009, and the disclosures thereof have been incorporated herein by reference.

Effect of the Invention

According to the present invention, there can be provided a low refractive index film which gives a lower refractive index, can be formed at normal temperature and normal pressure, has excellent adhesiveness to solid substrates, can conform to the shape of a microstructure even if a solid substrate has a microstructure, and does not impair the geometric optical performance such as diffusibility or light harvesting property brought by the microstructure.

When the material and shape of the microparticles are defined for the low refractive index film of the present invention, a low refractive index film having a certainly lower refractive index can be obtained.

When the average primary particle size of the microparticles is defined for the low refractive index film of the present invention, transparency of the low refractive index film can be enhanced, and even in the case where solid substrate has a microstructure, the geometric optical performance of the low refractive index film is not impaired.

The low refractive index film of the present invention as described above can be produced by the method for producing a low refractive index film of the present invention. Particularly, since a low refractive index film can be formed at normal temperature and normal pressure, a vacuum apparatus or the like is not needed, and cracking due to thermal stress does not occur in the resinous solid material.

When the solid substrate has a microstructure, since microparticles and an electrolyte polymer are alternately adsorbed to the surface of the microstructure to form a microparticle-laminated film, the microparticle-laminated film conforms to the shape of the microstructure, and the geometric optical performance such as diffusibility or light harvesting properties brought by the microstructure is not impaired. Thereafter, a silicon compound is used to bind the microparticles of the microparticle-laminated film with the substrate and to bind the microparticles with one another, a low refractive index film conforming to the shape of the microstructure, that is, a low refractive index film which does not impair the geometric optical performance such as diffusibility or light harvesting properties brought by the microstructure, can be obtained.

When the microstructure is defined for the low refractive index film of the present invention, the performance of the optical functional member can be more certainly enhanced by the low refractive index film. Due to the low refractive index, the low refractive index film of the present invention can be used for a wide variety of applications as an optical functional film.

Furthermore, according to the present invention, an anti-reflection film which can suppress reflected light and enhance transmitted light, as well as can convert the reflected light and transmitted light into an achromatic color, and a method for producing the anti-reflection film can be provided.

Moreover, according to the present invention, a coating liquid set for a low refractive index film intended for the formation of the low refractive index film can be provided.

According to the present invention, there can be provided a microparticle-laminated thin film-attached substrate having excellent adhesiveness between a microparticle-laminated thin film and a plastic substrate and having a resistance to thermal expansion, a method for producing the microparticle-laminated thin film-attached substrate, and an optical member having the microparticle-laminated thin film-attached substrate.

BEST MODES FOR CARRYING OUT THE INVENTION

Figure 1:
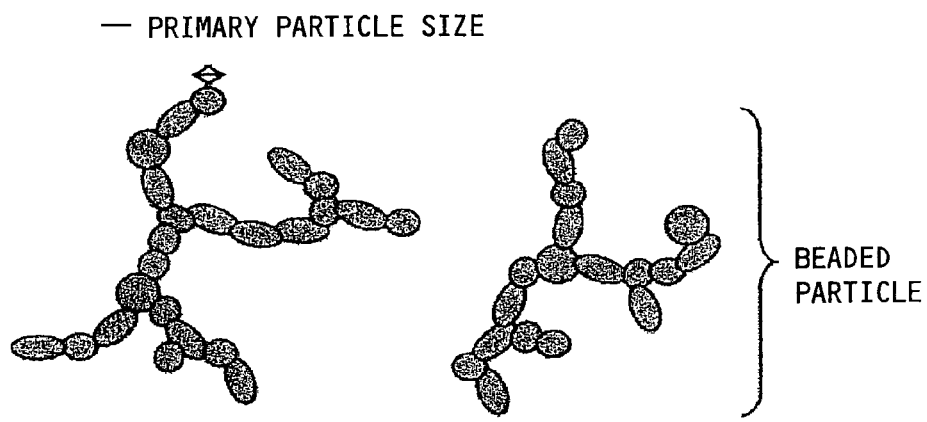
FIG. 1 is a schematic diagram showing a state of microparticles connected in a beaded form and particle sizes of primary particles.

<Low Refractive Index Film and Method for Producing the Same, and Coating Liquid Set for Low Refractive Index Film>

According to a first embodiment, the low refractive index film according to the present invention is a low refractive index film produced by bringing a microparticle-laminated film which has been formed by alternately adsorbing an electrolyte polymer and microparticles on the surface of a solid substrate, into contact with a silicon compound solution, binding the solid substrate with the microparticles, and binding the microparticles with one another, characterized in that the silicon compound solution contains any one selected from among (1) a hydrolysate and a condensation reaction product of the hydrolysate, of an alkoxysilane (I) having functional groups composed of hydrolyzable groups and non-hydrolyzable organic groups; (2) a hydrolysate and a condensation reaction product of the hydrolysate, of a mixture of the alkoxysilane (I) with an alkoxysilane (II) having functional groups composed only of hydrolyzable groups; and (3) a mixture of the hydrolysate and the condensation reaction product of the hydrolysate of the alkoxysilane (I), with the alkoxysilane (II).

According to a second embodiment, the low refractive index film of the present invention is a low refractive index film produced by bringing a microparticle-laminated film which has been formed by alternately adsorbing an electrolyte polymer and microparticles on the surface of a solid substrate, into contact with a silicon compound solution, and binding the solid substrate with the microparticles, and the microparticles with one another, characterized in that the silicon compound solution contains any one selected from among (1) an alkoxysilane (I) having functional groups composed only of hydrolyzable groups; (2) a hydrolysate and a condensation reaction product of the hydrolysate (II), of the alkoxysilane (I); and (3) a mixture of the alkoxysilane (I), with the hydrolysate and the condensation reaction product of the hydrolysate (II), and the solid substrate has a microstructure on the surface.

Furthermore, the anti-reflection film of the present invention is characterized by including the low refractive index film of the present invention.

According to the first embodiment, the method for producing a low refractive index film of the present invention is a method for producing a low refractive index film formed on the surface of a solid substrate, characterized in that the method includes (i) a step of bringing the surface of the solid substrate into contact with an electrolyte polymer solution (liquid A) or a microparticle dispersion liquid (liquid B), and a subsequent step of rinsing; (ii) a step of bringing the surface of the solid substrate obtained after the contact with the liquid A, into contact with a dispersion liquid of microparticles having a charge opposite to that of the electrolyte polymer of the liquid A, or a step of bringing the surface of the solid substrate obtained after the contact with the liquid B, into contact with an electrolyte polymer solution having a charge opposite to that of the microparticles of the liquid B, and a subsequent step of rinsing; (iii) a step of forming a microparticle-laminated film by alternately repeating the step (i) and step (ii); and (iv) a step of bringing the microparticle-laminated film into contact with a silicon compound solution (liquid C) containing any one selected from among (1) a hydrolysate and a condensation reaction product of the hydrolysate, of an alkoxysilane (I) having functional groups composed of hydrolyzable groups and non-hydrolyzable organic groups; (2) a hydrolysate and a condensation reaction product of the hydrolysate, of a mixture of the alkoxysilane (I) with an alkoxysilane (II) having functional groups composed only of hydrolyzable groups; and (3) a mixture of the hydrolysate and the condensation reaction product of the hydrolysate of the alkoxysilane (I), with the alkoxysilane (II).

According to the second embodiment, the method for producing a low refractive index film of the present invention is a method for producing a low refractive index film formed on the surface of a solid substrate, characterized in that the method includes (i) a step of bringing the surface of the solid substrate into contact with an electrolyte polymer solution (liquid A) or a microparticle dispersion liquid (liquid B), and a subsequent step of rinsing; (ii) a step of bringing the surface of the solid substrate obtained after the contact with the liquid A, into contact with a dispersion liquid of microparticles having a charge opposite to that of the electrolyte polymer of the liquid A, or a step of bringing the surface of the solid substrate obtained after the contact with the liquid B, into contact with an electrolyte polymer solution having a charge opposite to that of the microparticles of the liquid B, and a subsequent step of rinsing; (iii) a step of forming a microparticle-laminated film by alternately repeating the step (i) and step (ii); and (iv) a step of bringing the microparticle-laminated film into contact with a silicon compound solution (liquid C) containing any one selected from among (1) an alkoxysilane (I) having functional groups composed of hydrolyzable groups; (2) a hydrolysate and a condensation reaction product of the hydrolysate (II), of (I); and (3) a mixture of (I) and (II), and the solid substrate has a microstructure on the surface.

Furthermore, according to the first embodiment, the coating liquid set for a low refractive index film of the present invention is a coating liquid set for a low refractive index film including an electrolyte polymer solution, a microparticle dispersion liquid and a silicon compound solution, characterized in that the charge carried by the electrolyte polymer in the electrolyte polymer solution and the charge carried by the microparticles in the microparticle dispersion liquid have opposite signs, and the silicon compound solution contains any one selected from among (1) a hydrolysate and a condensation reaction product of the hydrolysate, of an alkoxysilane (I) having functional groups composed of hydrolyzable groups and non-hydrolyzable organic groups; (2) a hydrolysate and a condensation reaction product of the hydrolysate, of a mixture of the alkoxysilane (I) and an alkoxysilane (II) having functional groups composed only of hydrolyzable groups; and (3) a mixture of the hydrolysate and the condensation reaction product of the hydrolysate of the alkoxysilane (I), with the alkoxysilane (II).

According to the first embodiment, the coating liquid set for a low refractive index film of the present invention includes an electrolyte polymer solution, a microparticle dispersion liquid, and a silicon compound solution, and is characterized in that the charge carried by the electrolyte polymer in the electrolyte polymer solution and the charge carried by the microparticles in the microparticle dispersion liquid have opposite signs, and the silicon compound solution contains any one selected from among (1) an alkoxysilane (I) having functional groups composed only of hydrolyzable groups; (2) a hydrolysate and a condensation reaction product of the hydrolysate (II), of (I); and (3) a mixture of the alkoxysilane (I) and the condensation reaction product (II).

Hereinafter, embodiments of the low refractive index film of the present invention and the method for producing the same, the anti-reflection film, and the coating liquid set for a low refractive index film will be described together.

When the low refractive index film of the present invention is formed on a solid substrate such as an optical member, the low refractive index film functions as an optical functional film which is included in an anti-reflection film, a reflection film, a half-transparent half-reflective film, a visible light-reflective infrared-transparent film, an infrared-reflective visible light-transparent film, a blue reflective film, a green reflective or red reflective film, an emission line cutoff filter or a color correction film.

Furthermore, the low refractive index film of the present invention satisfactorily conforms to the shape of a microstructure having a geometric optical performance in optical functional members such as a Fresnel lens, a lenticular lens and a microlens, which are used in brightness enhancing lens films for liquid crystal backlight, diffusion films or screens for video projection televisions. As a result, the low refractive index film of the present invention functions as an optical functional film without impairing the geometric optical performance of the microstructure.

(A) Solid Substrate

The solid substrate may be flat or may have a shape other than that. The shaped object may be a microstructure having a geometric optical performance. Examples of the microstructure include a lenticular lens sheet, a Fresnel lens sheet, a prism sheet, a microlens array sheet, an on-chip microlens array, a light-guiding sheet, a diffusion sheet, a hologram sheet and a solar cell.

Therefore, examples of the microstructure include microstructures for obtaining a lenticular lens, a Fresnel lens, a prism, a microlens array, a light guiding microstructure, a light diffusion microstructure or a hologram.

(B) Solid Substrate Material

In order to form a microparticle-laminated film on a solid substrate by an alternate lamination method, it is required that the solid substrate have a charge at the surface. In order to have the microparticle-laminated film formed by an alternate lamination method closely adhered to the solid substrate, it is desirable for the microparticle-laminated film to have a polar group having a charge present on the surface of the solid substrate. Since the polar group has polarization of the charge within the molecule (intramolecular polarization), or since the polar group is ionized by dissociation, the polar group has a partial positive or negative charge.

Then, a material having a charge opposite to the charge of this polar group is adsorbed. As the polar group, one or two or more among functional groups such as a vinyl group, an epoxy group, a styryl group, a methacryloxy group, an acryloxy group, an amino group, a ureido group, a chloropropyl group, a mercapto group, a sulfide group, a sulfonic acid group, a phosphoric acid group, an isocyanate group, a carboxyl group, an ester group, a carbonyl group, a hydroxyl group and a silanol group, are preferred.

The solid substrate having a polar group at the surface preferably has an absolute value of the zeta potential of 1 to 100 mV, more preferably 5 to 90 mV, and even more preferably 10 to 80 mV.

Examples of the material of the solid substrate include semiconductors such as resin and silicon, metals and inorganic compounds.

The shape of the solid substrate may be any shape such as a film, a sheet, a plate or a shape having a curved surface. Any solid substrate of which a part of or the entire can be immersed and impregnated with a solution, having a form such as a cylindrical form, a thread-like form, a fiber or a foam, can be used since a microparticle-laminated film is formed on the surface.

Furthermore, even if the solid substrate is a solid substrate having a concavo-convex shaped cross-section, a microparticle-laminated film can be formed to conform to the structure of the surface.

Moreover, even if the solid substrate has a structure of a nanometer scale or of a submicron scale on the surface, a microparticle-laminated film can be formed to conform to the structure.

As discussed above, according to the present invention, since a microparticle-laminated film is formed to conform to the structure of the microstructure by an alternate lamination method, a low refractive index film that is obtained thereafter by bringing the microparticle-laminated film into contact with a silicon compound solution, also conforms to the shape of the microstructure, so that the geometric optical performance such as diffusibility or light harvesting properties brought by the microstructure is not impaired.

The resin described above may be a polyester such as polyethylene terephthalate, polybutylene terephthalate or polyethylene naphthalate, which has a hydroxyl group or a carboxyl group; a polyamide having a carboxyl group or an amino group; polyvinyl alcohol; or a polymer or copolymer of acrylic acid or methacrylic acid.

Furthermore, polyethylene, polypropylene, polystyrene, triacetyl cellulose, diacetyl cellulose, cellulose acetate butyrate, polyether sulfone, polyimide, polymethylpentene, polyvinyl chloride, polyvinylacetal, polymethyl methacrylate, polycarbonate, polyurethane and the like can also be used.

Examples of the metal include iron, copper, white copper, and tin plate, which have been subjected to a treatment such as forming an oxide film to allow an electrical charge to be present on the surface.

Furthermore, examples of the inorganic compound include glass and ceramics, which are made to have polar groups on the surface.

A polar group may also be introduced by subjecting the surface of the solid substrate to a corona discharge treatment, a glow discharge treatment, a plasma treatment, an ultraviolet irradiation, an ozone treatment, a chemical etching treatment with an alkali or an acid, or the like. A resin having a polar group introduced thereinto by these treatments may also be used.

According to the present invention, examples of the solid substrate include those having a resin film, an inorganic film, or a film including both an organic material and an inorganic material, laminated on a substrate. The resin film layer, inorganic film layer or organic-inorganic layer may be disposed on anywhere on the solid substrate, and if the layer is not disposed on the outermost surface of the solid substrate, the film layers do not have to have polar groups.

These resin film layer, inorganic film layer and organic-inorganic film may impart an optical function or a function of enhancing mechanical properties or the like to the solid substrate. An example of the layers for enhancing the mechanical properties of the solid substrate may be a hard coat layer.

Examples of the films for imparting an optical function include optical functional films including one or more of an anti-reflection film, a reflective film, a half-transparent half-reflective film, a visible light-reflective infrared-transparent film, an infrared-reflective visible light-transparent film, a blue reflective film, a green reflective or red reflective film, an emission line cutoff filter and a color correction film. When a low refractive index film is formed on a solid substrate having such an optical functional film, other optical functions can be further imparted.

For example, when a low refractive index film is formed on a solid substrate having one or more functions among an anti-reflection function, an emission line cutoff filter function, a near-infrared cutoff filter function and a color correction function, one or more functions that are absent in the solid substrate among the anti-reflection function, the emission line cutoff filter function, the near-infrared cutoff filter function and the color correction function, can be imparted, so that an optical member suitable for an optical filter for displays such as a plasma display panel and a liquid crystal display apparatus, can be obtained.

Furthermore, in an optical filter that is obtained by forming an anti-reflection film including a low refractive index film, using an optical film such as a light guide plate, a diffusion film, a prism film, a brightness enhancing film or a polarizing plate as a solid substrate, reflection at the optical film interface is suppressed. Therefore, a liquid crystal display apparatus in which such an optical filter is incorporated, has enhanced brightness.

Furthermore, in a half-transparent type liquid crystal display apparatus having incorporated therein an optical filter which is obtained by using a light diffusion film as a solid substrate and forming a half-transparent half-reflective film layer including a low refractive index film on the solid substrate, the brightness due to external light reflection is enhanced. As such, when a microparticle-laminated film is formed on a filter member for displays such as flat panel displays, functional improvement of such a member can be achieved.

Furthermore, for a front surface part or a rear surface part of a solid substrate where it is not wished to form a low refractive index film, the formation of a low refractive index film can be avoided by preventing the contact between a microparticle dispersion liquid and the solid substrate by attaching an adhesive film, or the like.

(C) Hard Coat Material

When a hard coat film is laminated, mechanical properties of a solid substrate are enhanced. Examples of the material forming a hard coat film include a crosslinked product of a polymerizable unsaturated double bond-containing compound such as an acrylic resin, a urethane-based resin or a melamine-based resin, an organic silicate compound, a silicone-based resin and a metal oxide. A curable resin such as a thermosetting resin or a radiation-curable resin can be used as the polymerizable unsaturated double bond-containing compound, but it is particularly preferable to use a polyfunctional polymerizable unsaturated double bond-containing compound.

Examples of the polyfunctional polymerizable double bond-containing compound include, but are not limited to, an ester between a polyhydric alcohol and methacrylic acid or acrylic acid (for example, ethylene glycol di(meth)acrylate, 1,4-dichlohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,3,5-cyclohexanetriol trimethacrylate, polyurethane polyacrylate, or polyester polyacrylate), a derivative of vinylbenzene (for example, 1,4-divinylbenzene, 4-vinylbenzoic acid-2-acryloylethyl ester, or 1,4-divinylcyclohexanone), a vinylsulfone compound (for example, divinylsulfone), an acrylamide compound (for example, methylenebisacrylamide), and methacrylamide. In the description above, the term (meth) acrylate means "methacrylate or acrylate."

Examples of commercially available polyfunctional polymerizable unsaturated double bond-containing compound include polyfunctional acrylic curable coating materials manufactured by Mitsubishi Rayon Co., Ltd. (DIABEAM Series and the like), polyfunctional acrylic curable coating materials manufactured by Nagase ChemteX Corp. (DENACOL Series and the like), polyfunctional acrylic curable coating materials manufactured by Shin Nakamura Chemical Co., Ltd. (NK ESTER Series and the like), polyfunctional acrylic curable coating materials manufactured by Dainippon Ink & Chemicals, Inc. (UNIDIC Series and the like), polyfunctional acrylic curable coating materials manufactured by Toagosei Co., Ltd. (ARONIX Series and the like), polyfunctional acrylic curable coating materials manufactured by NOF Corp. (BLEMMER Series and the like), polyfunctional acrylic curable coating materials manufactured by Nippon Kayaku Co., Ltd. (KAYARAD Series and the like), and polyfunctional acrylic curable coating materials manufactured by Kyoeisha Chemical Co., Ltd. (LIGHT ESTER Series, LIGHT ACRYLATE Series, and the like).

For the purpose of efficiently initiating the polymerization of these polyfunctional polymerizable unsaturated double bond-containing compounds, it is particularly effective to add a polymerization initiator, and preferred examples of the polymerization initiator include acetophenones, benzophenones, Michler's benzoyl benzoate, α-amyloxime ester, tetramethylthiuram monosulfide and thioxanthones.

Furthermore, for the purpose of accelerating polymerization, a sensitizer may be used in addition to the polymerization initiator.

Furthermore, a leveling agent and a filler may also be added, and additives are added as necessary into these compounds to obtain a coating material.

A hard coat layer may be formed by applying this coating material using, for example, a bar coating method, a knife coating method, a roll coating method, a blade coating method, a die coating method or a gravure coating method, to form a coating film, drying, and then curing the coating film by heating in the case of using a thermosetting type resin composition, and curing the coating film by irradiating an ionizing radiation in the case of using an ionizing radiation curable type resin composition.

Examples of the ionizing radiation include radiation, electron beam, particle beam, gamma radiation and ultraviolet radiation, but particularly ultraviolet radiation is preferred. As a light source thereof, a spectrum including from near-ultraviolet radiation emitted by a mercury lamp to vacuum ultraviolet radiation emitted by an excimer laser can be used.

A commercially available product of a solid substrate having a hard coat film formed thereon may be used, and examples of such a commercially available product include hard coat PET manufactured by Kimoto Co., Ltd. (KB film), hard coat PET manufactured by Toray Co., Ltd. (TUFTOP N-TOP), hard coat films manufactured by Toyohozai Co., Ltd., and hard coat polycarbonates manufactured by Nissin Chemical Industry Co., Ltd. (LEXAN MARGARD, LEXAN CTG AF).

(D) Intermediate Layer

In order to certainly introduce a polar group to a solid substrate, an intermediate layer may be laminated on a solid substrate, and the solid substrate can be used. In this case, the intermediate layer is regarded as a front surface layer of the solid substrate. Alternately, the intermediate layer material may have a microstructure formed thereon.

The intermediate layer is provided between the solid substrate and the microparticle-laminated film, and when the intermediate layer has polar groups, the adhesiveness between the solid substrate and the microparticle-laminated film is enhanced. It is thought that since the microparticle-laminated film is firmly adhered to the solid substrate via the intermediate layer, the surface hardness of the microparticle-laminated film on the solid substrate is enhanced.

The polar group that is contained in the intermediate layer is preferably one or two or more functional groups selected from a vinyl group, an epoxy group, a styryl group, a methacryloxy group, an acryloxy group, an amino group, a ureido group, a chloropropyl group, a mercapto group, a sulfide group, a sulfonic acid group, a phosphoric acid group, an isocyanate group, a carboxyl group, an ester group, a carbonyl group, a hydroxyl group, and a silanol group.

Examples of the material that can be used for the intermediate layer include resins having these groups, and silane coupling agents.

Examples of the resins as the material of the intermediate layer include a polyester such as polyethylene terephthalate, polybutylene terephthalate or polyethylene naphthalate, which has a hydroxyl group or a carboxyl group; a polyamide having a carboxyl group or an amino group; polyvinyl alcohol; and a polymer or copolymer of acrylic acid or methacrylic acid.

Lamination of this intermediate layer onto a solid substrate can be carried out by a method of applying a coating liquid obtained by dissolving a resin having a polar group in a solvent, on a solid substrate and drying the coating liquid; a method of applying a monomer or oligomer which serves as a raw material of the resin constituting the intermediate layer (among the examples thereof, monomers or oligomers having polar groups are included), on a solid substrate and allowing the monomer or oligomer to react and cure; a method of mixing a monomer or oligomer as a raw material of the resin for the intermediate layer, with a silane coupling agent, applying the mixture, and allowing the mixture to react and cure; or the like. In addition to the methods for forming an intermediate layer described above, the material for intermediate layer may be prepared as a solid substrate by transferring the material for intermediate layer into a mold, or the like.

A coating liquid of a polyester-based resin having a polar group introduced thereinto can be produced, for example, as described below.

117 parts of dimethyl terephthalate, 117 parts of dimethyl isophthalate, 103 parts of ethylene glycol, 58 parts of diethylene glycol, 0.08 parts of zinc acetate and 0.08 parts of antimony trioxide are heated to 40 to 220° C. in a reaction vessel, and the mixture is subjected to a transesterification reaction for 3 hours, to obtain a polyester-forming component. Here, the unit "part" means "parts by mass" (hereinafter, the same).

Subsequently, 9 parts of 5-sodium sulfoisophthalic acid is added thereto, and the resulting mixture is subjected to an esterification reaction at 220 to 260° C. for one hour, and further to a polycondensation reaction for 2 hours under reduced pressure (10 to 0.2 mmHg). Thus, a polyester copolymer having a sulfonic acid group introduced thereinto, which has an average molecular weight of 18000 and a softening point of 140° C., is obtained.

300 parts of this polyester copolymer having a sulfonic acid group introduced thereinto, and 140 parts of n-butylcellosolve are stirred for 3 hours at 150 to 170° C. to obtain a uniform viscous molten liquid, and 560 parts of water is slowly added to this molten liquid. Thereby, an aqueous dispersion liquid of a polyester-based resin can be obtained.

A commercially available product of a polyester resin having a sulfonic acid group introduced thereinto and dispersed in water (for example, VYLONAL MD-1200 (trade name) manufactured by Toyobo Co., Ltd.) may also be used.

In regard to the procedure described above, a polyester copolymer having a sulfonic acid group introduced thereinto can also be obtained by using sulfoisophthalic acid, sulfoterephthalic acid, 4-sulfonaphthalene-2,7-dicarboxylic acid or a metal salt of such an ester-forming derivative, instead of 5-sodium sulfoisophthalic acid.

Examples of the metal for the metal salt include sodium, lithium, potassium and magnesium.

When 5-aminoisophthalic acid or the like is used instead of 5-sodium sulfoisophthalic acid, a polyester copolymer having an amino group introduced thereinto can be obtained.

A polyurethane-based resin having a polar group introduced thereinto can be produced, for example, as described below.

192 parts of a polyether containing sodium sulfonate which is obtained by sulfonating a polyether of ethylene oxide started from allyl alcohol using sodium metabisulfite ($SO_3$-content 8.3% by mass, content of polyethylene oxide 83% by mass), 1013 parts of polytetramethylene adipate, and 248 parts of polypropylene oxide polyether initiated by bisphenol A are mixed, and the mixture is dehydrated at 100° C. under reduced pressure (10 to 0.2 mmHg). This mixture is brought to 70° C., and to this mixture, a mixture of 178 parts of isophorone diisocyanate and 244 parts of hexamethylene-1, 6-diisocyanate is added. Then, the resulting mixture is stirred at a temperature in the range of 80° C. to 90° C. until the isocyanate content reaches 5.6% by mass.

A prepolymer thus obtained is cooled to 60° C., and 56 parts of biuret polyisocyanate obtained from 3 moles of hexamethylene diisocyanate and 1 mole of water, and 173 parts of bisketimine obtained from isophorone diamine and acetone, are sequentially added.

Subsequently, an aqueous solution at 50° C. containing 15 parts of hydrazine hydrate dissolved therein, is added to the above mixture while the mixture is vigorously stirred, and thus an aqueous dispersion liquid of a polyurethane-based resin can be obtained.

An example of the resin prepared to have a functional group introduced thereinto is an organic solvent-soluble non-crystalline polyester resin, and commercially available products of such a resin include VYLON Series (103, 200, 220, 226, 240, 245, 270, 280, 290, 296, 300, 500, 516, 530, 550, 560, 600, 630, 650, 660, 670, 885, GK110, GK130, GK140, GK150, GK180, GK190, GK250, GK330, GK360, GK590, GK640, GK680, GK780, GK810, GK880, GK890 and BX1001 (trade names)) manufactured by Toyobo Co., Ltd.

Furthermore, another example is a water-dispersed polyester resin, and commercially available products of such a resin include VYLONAL Series (MD-1100, MD-1200, MD-1220, MD-1245, MD-1250, MD-1335, MD-1400, MD-1480, MD-1500, MD-1930 and MD-1985 (trade names)) manufactured by Toyobo Co., Ltd.

Another example is a polyester urethane resin, and commercially available products of such a resin include VYLON Series (UR-1350, UR-1400, UR-2300, UR-3200, UR-3210, UR-3500, UR-4125, UR-5537, UR-8200, UR-8300, UR-8700 and UR-9500 (trade name)) manufactured by Toyobo Co., Ltd.

According to the present invention, the silane coupling agent may be a compound represented by the following formula (I).

[Formula 2]

$$R^1_n Si(OR^2)_{4-n} \tag{I}$$

wherein $R^1$ is a non-hydrolyzable group and represents a vinylalkyl group, an epoxyalkyl group, a styrylalkyl group, a methacryloxyalkyl group, an acryloxyalkyl group, an aminoalkyl group, a ureidoalkyl group, a halogen alkyl group such as a chloropropylalkyl group or a sulfide alkyl group, a mercaptoalkyl group, an isocyanatealkyl group or a hydroxyalkyl group; $R^2$ is a hydrolyzable group and represents an alkyl group having 1 to 6 carbon atoms; n represents an integer from 1 to 3; and when plural $R^1$'s are present, the respective $R^1$'s may be identical with or different from each other, and when plural $OR^2$'s are present, the respective $OR^2$'s may be identical with or different from each other.

A silane coupling agent treatment of a solid substrate can be carried out by, for example, first bringing a silane solution obtained by treating a silane coupling agent in an aqueous medium in the presence or absence of an acid to hydrolyze an alkoxy group to be converted into a silanol group, into contact with a solid substrate, thereby adsorbing the silanol group to the hydroxyl groups present on the surface of the solid substrate through hydrogen-bonding, and then subjecting the solid substrate to drying. This treatment causes a dehydration condensation reaction, and thereby a non-hydrolyzable group can be introduced into the surface of the solid substrate.

A silanol group which did not react with the non-hydrolyzable group also functions as a polar group according to the present invention, and interacts with the microparticle-laminated film, so that close adherence between the solid substrate and the microparticle-laminated film can be obtained. Although the details of the mechanism are not clearly known, it is speculated that the interaction is attributable to any one or more of covalent bonding, intermolecular force and van der Waals force.

Specific examples of the silane coupling agent include a vinyl group-functional silane such as vinyltrichlorosilane, vinyltrimethoxysilane, vinyltriethoxysilane, vinylphenyltrimethoxysilane, or vinyltris(2-methoxyethoxy)silane; an alkyl group- or aryl group-functional silane such as methyltrimethoxysilane, methyltriethoxysilane, phenyltrimethoxysilane or phenyltriethoxysilane; an epoxy group-functional silane such as β-(3,4-epoxycyclohexypethyltrimethoxysilane, γ-glycidoxypropyltrimethoxysilane-glycidoxypropylmethyldiethoxysilane, γ-glycidoxypropylmethyldiisopropenoxysilane, methyltriglycidoxysilane, or γ-glycidoxypropyltriethoxysilane; a styryl group-functional silane such as p-styryltrimethoxysilane; a methacryloxy group-functional silane such as γ-methacryloxypropyltrimethoxysilane, γ-methacryloxypropylmethyldimethoxysilane, methyltri(methacryloxyethoxy)silane, γ-methacryloxypropylmethyldiethoxysilane, or γ-methacryloxypropyltriethoxysilane; an acryloxy group-functional silane such as γ-acryloxypropyltrimethoxysilane; an amino group-functional silane such as γ-aminopropyltrimethoxysilane, γ-aminopropyltriethoxysilane, γ-aminopropylmethyldimethoxysilane, γ-aminopropylmethyldiethoxysilane, N-β-(aminoethyl)-γ-aminopropyltrimethoxysilane, N-β-(aminoethyl)-γ-aminopropylmethyldimethoxysilane, N-β-(aminoethyl)-γ-aminopropyltriethoxysilane, N-β-(aminoethyl)-γ-aminopropylmethyldiethoxysilane, N-β-(N-vinylbenzylaminoethyl)-γ-aminopropyltrimethoxysilane, γ-anilinopropyltrimethoxysilane, γ-triethoxysilyl-N-(1,3-dimethylbutylidene)-propylamine, or N-phenyl-3-aminopropyltrimethoxysilane; a ureido group-functional silane such as γ-ureidopropyltriethoxysilane; a chloropropyl group-functional silane such as γ-chloropropyltrimethoxysilane; a mercapto group-functional silane such as γ-mercaptopropyltrimethoxysilane, γ-mercaptopropyltriethoxysilane, or γ-mercaptopropylmethyldimethoxysilane; a sulfide group-functional silane such as bis(triethoxysilylpropyl) tetra sulfide; and an isocyanate group-functional silane such as γ-isocyanatopropyltriethoxysilane, trimethylsilyl isocyanate, dimethylsilyl isocyanate, phenylsilyl triisocyanate, tetraisocyanatesilane, methylsilyl triisocyanate, vinylsilyl triisocyanate, or ethoxysilane triisocyanate.

A functional group may be introduced into the surface of microparticles by using such a silane coupling agent. Thereby, any one or more attractive forces among covalent bonding, intermolecular force and van der Waals force can be certainly applied between the microparticles themselves or between the microparticles and the substrate.

Examples of commercially available products of the silane coupling agent include KA-1003, ICBM-1003 and KBE-1003 having vinyl groups; KBM-303, ICBM-403, KBE-402 and KBE-403 having epoxy groups; KBM-1403 having styryl groups; ICBM-502, ICBM-503, KBE-502 and KBE-503 having methacryloxy groups; ICBM-5103 having acryloxy groups; KBM-602, KBM-603, KBE-603, KBM-903, KBE-903, KBE-9103, ICBM-573, ICBM-575 and KBM-6123 having amino groups; KBE-585 having ureido groups; ICBM-703 having chloropropyl groups; KBM-802 and KBM-803 having mercapto groups; KBE-846 having sulfide groups; and KBE-9007 having isocyanate groups (all trade names, manufactured by Shin-Etsu Chemical Co., Ltd.).

Furthermore, an intermediate layer may also be formed using a primer prepared by diluting a silane coupling agent in advance with a solvent or water. Examples of commercially available products of the primer include KBP-40, KBP-41, KBP-43 and KBP-90 obtained by diluting silane coupling agents having amino groups; KBP-44 obtained by diluting a silane coupling agent having isocyanate groups; and X-12-414 obtained by diluting a silane coupling agent having mercapto groups (all trade names, manufactured by Shin-Etsu Chemical Co., Ltd.)

It is preferable to use a resin having a polar group in the intermediate layer, so as to obtain close adherence between the solid substrate and the intermediate layer. In regard to the coating method that can be employed when an intermediate layer of a silane coupling agent or a resin is formed on a solid substrate, the process can be carried out by a well known method, and examples of the method that can be employed include a reverse roll coating method, a gravure coating method, a kiss coating method, a roll brush method, a spray coating method, an air knife coating method, a wire bar coating method, a pipe doctor method and a curtain coating method, a spin coating method, a dip coating method and an alternate lamination method. These methods can be carried out singly or in combination. For all of the coating methods, it is preferable to dilute the concentration of the coating liquid so that the intermediate layer conforms to the shape of the microstructure.

In order to further ensure the close adherence between the solid substrate and the intermediate layer, the solid substrate may be subjected to a corona discharge treatment, a glow discharge treatment, a plasma treatment, ultraviolet irradiation, an ozone treatment, a chemical etching treatment with an alkali or an acid.

An electrolyte polymer layer may also be formed for the purpose of making the charge density at the surface of a solid substrate (may include an intermediate layer) uniform, and adsorbing microparticles thereto without unevenness. The electrolyte polymer is preferably polydiallyldimethylammonium chloride (PDDA) or polyethyleneimine (PEI) having a positive charge, or sodium polystyrene sulfonate (PSS) having a negative charge.

Furthermore, as disclosed in Advanced Material, Vol. 13, pp. 52-54 (published in 2001), an alternately laminated film of two kinds of electrolyte polymers having different charge signs may be formed on a solid substrate (may include an intermediate layer) using an alternate lamination method.

When such an electrolyte polymer layer is formed as an intermediate layer on the surface of a solid substrate, it is preferable to make the electrolyte polymer layer closely adhered to the solid substrate. As a method for inducing close adherence, in the case where the solid substrate or the surface layer of the solid substrate is formed of a polymer, a method of binding an electrolyte polymer or the like to the polymer at the surface of the solid substrate according to a conventionally known method using heat, light, electron beam, γ-radiation or the like, may be used.

Furthermore, this method may also be used to graft a monomer having a polar group to the solid substrate.

Examples of the monomer having a polar group include acrylic acid or methacrylic acid, or an alkali metal salt or amine salt thereof; itaconic acid, or an alkali metal salt or amine salt thereof; allylamine or a hydrohalic acid salt thereof; 3-vinylpropionic acid, or an alkali metal salt or amine salt thereof; vinylsulfonic acid, or an alkali metal salt or amine salt thereof; vinylstyrenesulfonic acid, or an alkali metal salt or amine salt thereof; 2-sulfoethylene acrylate, 2-sulfoethylene methacrylate, 3-sulfopropylene acrylate or 3-sulfopropylene methacrylate, or an alkali metal salt or amine salt thereof; 2-acrylamido-2-methylpropanesulfonic acid, or an alkali metal salt or amine salt thereof; and a phosphoric acid monomer such as mono(2-acryloyloxyethyl) acid phosphate, mono(2-methacryloyloxyethyl)acid phosphate or acidphosphooxypolyethylene glycol mono(meth) acrylate, an alkali metal salt or amine salt thereof.

(E) Method for Forming Microparticle-Laminated Film

As disclosed in Langmuir, Vol. 13, pp. 6195-6203 (1997), a microparticle-laminated film can be formed on a solid substrate by a method of alternately repeating a step of bringing the solid substrate into contact with an electrolyte polymer solution and a step of bringing the solid substrate into contact with a microparticle-dispersed solution (alternate lamination method). There are no particular limitations on the number of repetition, but the thickness of the thin film can be controlled by that number. In regard to the alternate lamination method described above, it is preferable to adjust the number of alternate repetition to from one round to one hundred rounds, so as to secure transparency. Furthermore, in the alternate lamination method described above, it is preferable to end the process with the step of bringing the solid substrate into contact with the microparticle-dispersed solution, rather than with the step of bringing the solid substrate into contact with the electrolyte polymer solution.

When adsorption proceeds in the respective steps and the surface charge is reversed, new electrostatic adsorption does not occur any longer. Therefore, the thickness of the film formed by one round of contact with the electrolyte polymer solution or the microparticle-dispersed solution can be controlled. Furthermore, any excess material that has been physically adsorbed can be removed by rinsing the adsorbed surface.

In addition, as long as the surface charge is reversed, the film formation can be continuously carried out. Accordingly, the thickness uniformity of the thin film formed by the alternate lamination method is higher than that obtained by a conventional dip coating method, and the thickness controllability is also high. High thickness controllability is important for the microparticle-laminated film to exhibit desired optical functions by the light interference effect. The rinsing liquid is preferably water, an organic solvent, or a mixed solvent such as water and a water-soluble organic solvent. Examples of the water-soluble organic solvent include methanol, ethanol, propanol, acetone, dimethylformamide, and acetonitrile.

In regard to an apparatus for forming a microparticle-laminated film, as disclosed in J. Appl. Phys., Vol. 79, pp. 7501-7509 (1996) or in PCT International Patent Application WO 2000/013806, an apparatus called dipper, in which an arm with a solid substrate fixed thereto moves automatically to immerse the solid substrate into an electrolyte polymer solution, a microparticle dispersion liquid or a rinsing liquid according to a computer program, may be used.

A microparticle-laminated film may also be formed by adding dropwise or spraying an electrolyte polymer solution or a microparticle dispersion liquid on a solid substrate. At that time, the rinsing liquid may be supplied by any of dropwise addition, spraying and showering, or by a method combining them. Furthermore, the solid substrate may be performing a movement such as conveyance or rotation.

(F) Microparticle Dispersion Liquid

The microparticle dispersion liquid used in the present invention is a product in which the microparticles that will be described later are dispersed in a medium (liquid) which is water, an organic solvent, or a mixed solvent such as water and a water-soluble organic solvent. Examples of the water-soluble organic solvent include methanol, ethanol, propanol, acetone, dimethylformamide, and acetonitrile.

The proportion of the microparticles occupying the microparticle dispersion liquid is usually preferably equal to or more than 0.005% by mass and equal to or less than 15% by mass, more preferably equal to or more than 0.001% by mass and equal to or less than 10% by mass, and even more preferably equal to or more than 0.01% by mass and equal to or less than 5% by mass. If the proportion of the microparticles is too low, a microparticle-laminated film cannot be formed, and if the proportion is too high, the microparticle-laminated film impairs transparency or smoothness because of aggregation between the microparticles, which is not preferable. If the dispersibility of the microparticles is low, a so-called dispersant can be used upon preparing a microparticle dispersion liquid, in order to improve dispersibility.

As such a dispersant, a surfactant, an electrolyte polymer, a nonionic polymer, or the like can be used. The amount of use of these dispersants may vary with the kind of the dispersant used, but in general, the amount of the dispersant with respect to the microparticles is preferably 0.00001% to 1% by mass. If the amount is too large, gelation and separation may occur, or the microparticles become electrically neutral in the dispersion liquid, making it difficult to obtain a microparticle-laminated film.

Furthermore, the pH of the microparticle dispersion liquid can be adjusted to the range of 1 to 13 using an alkaline aqueous solution of sodium hydroxide, potassium hydroxide or the like, or an acidic aqueous solution of hydrochloric acid, sulfuric acid or the like, and the pH can also be adjusted by means of a dispersant. As the pH of the microparticle dispersion liquid deviates further from the isopotential point, the electrostatic attractive force between the microparticles and the solid substrate or the electrolyte polymer tends to become stronger. Here, the isopotential point is the pH value at which the surface potential of the microparticles becomes zero, and the particles cause aggregation because the electrostatic repulsive force is lost. However, since the isopotential point varies with the number of the surface hydroxyl group or the crystal structure, different materials for the microparticles have different isopotential points.

(G) Material for Microparticles

The average primary particle size of the microparticles that are dispersed in the microparticle dispersion liquid used in the present invention is preferably equal to or more than 1 nm and equal to or less than 100 nm, because the microparticle-laminated film has high transparency, and as a result, the geometric optical performance of the microstructure is not impaired. The average primary particle size is more preferably equal to or more than 2 nm and equal to or less than 40 nm, and even more preferably equal to or more than 3 nm and equal to or less than 20 nm. Microparticles having an average primary particle size of less than 1 nm are difficult to form a film. If the average primary particle size exceeds 100 nm, it is difficult to form a transparent microparticle-laminated film, and when a microstructure is present on the surface of the solid substrate, the geometric optical performance of the microstructure is impaired.

Furthermore, in the case of forming a microparticle-laminated film by an alternate lamination method, the amount of thickness change of the microparticle-laminated film per one round of the number of alternate lamination is usually about the same as the average primary particle size of the microparticles. For that reason, if the average primary particle size is too large, the degree of accuracy of thickness control is lowered, and it is difficult to obtain, with a high degree of accuracy, a film thickness suitable for the exhibition of optical functions.

The film thickness d1 required for the exhibition of optical functions of the microparticle-laminated film is determined by the following expression (1) (see Optical Thin Film Technology, Japan Optomechatronics Association, written by Mikio Okamoto, pp. 7-45, published on Jan. 15, 2002).

[Expression 1]

$$d_1 = \frac{\lambda}{n \cdot x} \quad (1)$$

wherein λ represents the wavelength at which it is wished to exhibit optical functions; n represents the refractive index of the film; and x is usually 2 to 8.

According to the present invention, the average primary particle size of the microparticles, the average secondary particle size, and the particle size of the particles having a shape in which primary particles are connected, can be measured using known methods. According to the present invention, the particles having a shape in which primary particles are connected, may be indicated as beaded particles.

When primary particles are dispersed in the microparticle dispersion liquid without aggregating, the average primary particle size can be measured by a dynamic scattering method. However, in the case of secondary particles in which primary particles are aggregated, or in the case of beaded particles in which primary particles are covalently bonded, what is measured by a dynamic scattering method is not the average primary particle size, but is the average secondary particle size or the particle size of beaded particles. The average primary particle size in secondary particles or beaded particles can be measured according to a BET method or an electron microscopic method.

In the BET method, molecules whose area of occupancy is known, such as nitrogen gas, are adsorbed to the particle surface, and the specific surface area is determined from the relationship between the amount of adsorption and pressure. This specific surface area is converted to the particle size based on a table of conversion, and thereby the average primary particle size can be determined.

In the electron microscopic method, first, the microparticles are ladled from the microparticle dispersion liquid on a copper mesh on which an amorphous carbon film having a thickness of several ten nanometers, or the microparticles are adsorbed onto an amorphous carbon film. These microparticles are observed with a transmission electron microscope, subsequently the lengths of all of the microparticles shown in a captured image are measured, and the arithmetic average is determined as the average primary particle size.

Furthermore, the number of microparticles used to measure the length is preferably 100 or more, and when the number of microparticles in one captured image is less than 100, plural captured images are used to have 100 or more microparticles. When the aspect ratio of the particles is high as in the case of pillar-shaped particles, generally the length of the shorter axis is measured, and the arithmetic average of the lengths is taken as the average primary particle size.

In regard to the measurement of particle size as described above, the microparticles may be obtained not only from the microparticle dispersion liquid for the production of a microparticle-laminated film, but also from a microparticle-laminated film. As a method of obtaining microparticles from a microparticle-laminated film, a method of peeling microparticle aggregates in a powder form by polishing the microparticle-laminated film on a solid substrate using steel wool (#0000, manufactured by Nihon Steel Wool Co., Ltd.) or a cutter, and dispersing the microparticle aggregates in a solvent, may be employed.

There are no particular limitations on the method and apparatus for dispersing the microparticle aggregates, and for example, a method of applying ultrasonic waves, or a method of dispersing the microparticle aggregates using a roll, a Banbury mixer, a kneader, a single-screw extruder, a twin-screw extruder or the like, may be employed.

Thereby, microparticle aggregates with a smaller size, or monodisperse microparticles are obtained. For the solvent mentioned above, water, an organic solvent, or a mixed solvent such as water and a water-soluble organic solvent can be used.

In the electron microscopic method, the particle size of the microparticles and the shape can be simultaneously observed. It can be distinguished whether the primary particles have a porous structure, a hollow structure, or a shape in which the primary particles are connected. The particles having a shape in which primary particles are connected have a shape such as shown in FIG. 1, and in the present invention, the particles are referred to as beaded particles in some occasions.

The value of the average primary particle size defined in the present invention is a value obtained according to a BET method.

It is preferable for these beaded particles to be covalently bonded between primary particles, so as to enhance the strength of the microparticle-laminated film. In a microparticle film using beaded particles, the steric hindrance brought by the beaded shape prevents other beaded particles or the electrolyte polymer having the opposite charge from occupying the space more compactly, and as a result, the microparticle film has a higher porosity and a lower refractive index than microparticle films using spherical particles.

The beaded particles such as shown in FIG. 1 are such that more than a half the number of the beaded particles dispersed in the solution are composed of four or more primary particles. Furthermore, in the beaded particles, primary particles are not aggregated in a three-dimensional dumpling shape, and in many cases, the number of particles adjacent to one primary particle does not exceed 10. In the closest packing, the number of particles adjacent to one primary particle is 16.

The conformation of the primary particles in the beaded particles is characterized in that the site at which the number of particles adjacent to one primary particle is equal to or more than 1 and equal to or less than 8, occupies 50% or more. Therefore, beaded particles are likely to obtain a two-dimensionally stretched shape when adsorbed to a substrate, and also contribute to an enhancement of film formability. Furthermore, when the primary particles are covalently bonded to one another, the beaded particles also contribute to an enhancement of the strength of the microparticle-laminated film.

The microparticles according to the present invention include inorganic microparticles, and specific examples that are used include halides or oxides of lithium, sodium, magnesium, aluminum, zinc, indium, silicon, tin, titanium, zirconium, yttrium, bismuth, niobium, cerium, cobalt, copper, iron, holmium and manganese. More specific examples include lithium fluoride (LiF), sodium fluoride (NaF), magnesium fluoride ($MgF_2$), aluminum fluoride ($AlF_3$), aluminum oxide ($Al_2O_3$), zinc oxide (ZnO), indium tin oxide (ITO), silica ($SiO_2$), tin oxide ($SnO_2$), titanium oxide ($TiO_2$), zirconium oxide ($ZrO_2$), yttrium oxide ($Y_2O_3$), bismuth oxide ($Bi_2O_3$), niobium oxide ($Nb_2O_5$), ceria ($CeO_2$), cobalt oxide (CoO), copper (CuO), iron ($Fe_2O_3$), holmium ($Ho_2O_3$), and manganese ($Mn_3O_4$). These can be used singly or as mixtures of two or more kinds. The microparticles may be amorphous, and there are no particular limitations on the crystal type that can be adopted by the microparticles.

Among the inorganic microparticles described above, silica ($SiO_2$) is preferred from the viewpoint that a thin film having a low refractive index needed in an anti-reflection film is obtained, and a water-dispersed colloidal silica ($SiO_2$) having its average primary particle size controlled, such as to 1 nm to 100 nm, is most preferred. If the average primary particle size exceeds 100 nm, it is difficult to form a transparent microparticle-laminated film, and when a microstructure is present on the surface of the solid substrate, the geometric optical performance of the microstructure is impaired. Examples of commercially available products of such inorganic microparticles include SNOWTEX (manufactured by Nissan Chemical Industries, Ltd.).

Furthermore, speaking in terms of the shape, it is preferable to use one or more kinds of porous silica microparticles, hollow silica microparticles, and silica microparticles having a shape in which primary particles are connected. It is because when a microparticle-laminated film is formed by using particles having a shape in which primary particles are connected, densification is inhibited because of steric hindrance, and the refractive index of the microparticle-laminated film is decreased.

It is also because when a microparticle-laminated film is formed by using porous particles and hollow particles, the voids at the surfaces of the porous particles and the voids inside the hollow particles are introduced, and the refractive index of the microparticle-laminated film is decreased.

The porous silica microparticles preferably have a porosity of 10% to 70%, and preferably have pores having an internal diameter of 1 to 25 nm. According to an example of the method for production thereof, 1 mmol of hydrochloric acid and 40 mL of water are added to 0.1 mol of tetraethoxysilane, and 10 wt % of gelatin is further added thereto. The mixture is subjected to hydrolysis for one hour at room temperature, and then is dried at 50° C. The dried product is heated to 600° C. in air at a rate of 1° C./min, and thereby a silica porous material having pores generated by the removal of gelatin is obtained.

By further pulverizing this porous material in water using a bead mill or the like, an aqueous dispersion liquid of porous silica microparticles having a diameter of several ten nanometers can be obtained. Examples of commercially available products include NIPSIL and NIPGEL manufactured by Nippon Silica Industrial Co., Ltd.

The hollow silica microparticles are preferably such that the porosity of the hollow part with respect to the microparticles is 10% to 50%, and examples of commercially available products include THRULYA manufactured by Catalysts & Chemicals Industries Co., Ltd.

In order to obtain a lower refractive index, it is more preferable that the microparticles serving as a base contain a shape of particles connected in a beaded form as shown in FIG. 1. Examples of commercially available products include SNOWTEX UP, SNOWTEX PS-S, SNOWTEX PS-M (trade names, manufactured by Nissan chemical Industries, Ltd.); FINE CATALOID F120 (trade name, manufactured by Catalysts & Chemicals Industries Co., Ltd.); and a pearl necklace-shaped silica sol.

Polymer microparticles can also be used as the microparticles according to the present invention, and examples include polyethylene, polystyrene, acrylic polymers, silicone polymers, phenolic resins, polyamides, and natural polymers. These can be used singly or as mixtures of two or more kinds.

Those particles are synthesized by a preparation method such as a solution spray method, a solution removal method, an aqueous solution reaction method, an emulsion method, a suspension polymerization method, a dispersion polymerization method, an alkoxide hydrolysis method (sol-gel method), a hydrothermal reaction method, a chemical reduction method, or an in-liquid pulse laser abrasion method. Examples of commercially available products of polymer microparticles include MISTPEARL (manufactured by Arakawa Chemical Industries, Ltd.).

Furthermore, for the purpose of applying any one or more attractive forces of covalent bonding, intermolecular force and van der Waals force between the microparticles or between the microparticles and the substrate, an ionic functional group may be added to the surface of these microparticles. Addition of a functional group to the surface of microparticles can be carried out by subjecting the silane coupling agent represented by the formula (I) to a condensation reaction with the hydroxyl group or the like of the microparticles.

Examples of the functional group that is provided on the surface of the microparticles include a vinyl group, an epoxy group, a styryl group, a methacryloxy group, an acryloxy group, an amino group, a ureido group, a chloropropyl group, a sulfide group, a mercapto group, and an isocyanate group, as described above.

Commercially available products of silane coupling agents include KBM Series and KBE Series manufactured by Shin-Etsu Chemical Co., Ltd. Furthermore, a carboxyl group, a carbonyl group, a phenol group and the like may also be provided on the surface of the microparticles, and examples of commercially available products of microparticles having these functional groups provided on the surface include MISTPEARL (trade name, manufactured by Arakawa Chemical Industries, Ltd.).

The microparticles dispersed in a medium are electrically charged either negatively or positively, because a diffuse electric double layer is generated due to the dissociation of the surface polar groups or adsorption of ions. The thickness of the diffuse electric double layer ($1/\kappa$) on the microparticle surface represented by the following expression is the distance in which the surface charge, the attractive force between counterions (electrolyte ions), and the force induced by thermal motion are brought into equilibrium. Here, $\kappa$ is called as Debye-Huckel parameter, and is represented by the following expression (Hiroyuki Ohshima, "Dispersion Stability and Aggregation Control of Nanoparticles, and Measurement and Evaluation of Zeta Potential", Technical Information Institute Co., Ltd.).

$$\frac{1}{\kappa} = \frac{1}{Ze}\sqrt{\frac{\varepsilon_r \varepsilon_0 kT}{2000 N_A C}} \quad \text{[Expression 2]}$$

wherein k represents Boltzmann constant; $\varepsilon_0$ represents the vacuum permittivity, $\varepsilon_r$ represents the specific permittivity of the medium (liquid); T represents the absolute temperature; Z represents the valence; e represents unit charge; $N_A$ represents Avogadro's number; and C represents the electrolyte concentration and the unit is M (=mol/liter).

The surface potential ($\phi_0$) of the microparticles is a product of the electric field ($\epsilon/\epsilon_r\epsilon_0$) produced by the surface charge density ($\upsilon$) and the electrical double layer ($1/\kappa$), and is represented by the following expression. From this expression, it is understood that the surface potential ($\phi_0$) of the microparticles can be controlled by the surface charge density (a) or the electrolyte concentration (C).

$$\phi_0 = \frac{\sigma}{\varepsilon_r\varepsilon_0\kappa} = \frac{\sigma}{Ze}\sqrt{\frac{kT}{2000\varepsilon_r\varepsilon_0 N_A C}} \quad \text{[Expression 3]}$$

There are no limitations on the electrolyte that is added to increase the electrolyte concentration, as long as the electrolyte is soluble in water, a mixed solvent of water and an alcohol, and the like, but examples that can be used include salts of alkali metals and alkaline earth metals, quaternary ammonium ions and the like with halogen elements, LiCl, KCl, NaCl, $MgCl_2$, and $CaCl_2$.

The surface charge density ($\sigma$) can be controlled by the pH. It is because the degree of dissociation (ionization) of the dissociable groups present on the particle surface is affected by the pH. For example, in the case where carboxyl groups (—COOH) or surface hydroxyl groups (—OH) are present on the surface of the microparticles, when the pH is increased, the groups are ionized to be converted to carboxylate anions (—COO—) or hydroxide ions (—O—), and therefore, the charge density $\sigma$ increases.

On the other hand, in the case where amino groups (—$NH_2$) are present, when the pH is decreased, the amino groups are converted to ammonium ions (—$NH_3^+$), and the charge density increases. That is, there is an increase in the charge density in the higher pH region and in the lower pH region.

Microparticles having the same sign of surface potential repel each other and are stably dispersed in the medium without aggregating. The zeta potential reflects the surface charge of microparticles, and is used as an index of the dispersion stability of microparticles (Fumio Kitahara, Kunio Furusawa, Masataka Ozaki, and Hiroyuki Ohshima, "Zeta Potential: Physical Chemistry of Fine Particles Interfaces", Scientist Press Co., Ltd., published in January 1995). When the absolute value of the zeta potential increases, the repulsive force between the microparticles grows stronger, and the stability of the particles is increased. On the contrary, when the zeta potential is close to zero, the microparticles are more likely to aggregate.

This zeta potential can be measured by, for example, an electrophoretic light scattering analysis method (as known as a laser Doppler method). Microparticles that migrate under the effect of an external electric field (E) are irradiated with a laser light having a wavelength ($\lambda$), and the change in the frequency of light scattering at the angle of scattering ($\theta$) (Doppler shift amount $\Delta v$) is measured. Thereby, the migration velocity (V) of the microparticles is determined by the following expression.

$$V = \frac{\Delta v \cdot \lambda}{2n \cdot \sin(\theta/2)} \quad \text{[Expression 4]}$$

wherein n represents the refractive index of the medium (liquid). Here, the electrophoretic mobility (U) is determined from the migration velocity (V) obtained herein and the external electric field (E), by the following expression.

$$U = \frac{V}{E} \quad \text{[Expression 5]}$$

The zeta potential ($\xi$) can be determined from the electrophoretic mobility (U) by using the following Smoluchowski's expression.

$$\xi = \frac{4\pi\eta U}{\varepsilon} \quad \text{[Expression 6]}$$

wherein $\eta$ represents the viscosity of the medium (liquid); and $\epsilon$ represents the permittivity of the medium (liquid) (Fumio Kitahara, Kunio Furusawa, Masataka Ozaki, and Hiroyuki Ohshima, "Zeta Potential: Physical Chemistry of Fine Particles Interfaces", Scientist Press Co., Ltd., published in January 1995).

There may be mentioned, as a relatively new analysis method for the zeta potential, an ultrasonic system or a colloid vibration current method. Examples of the analyzing apparatus include DT-200, DT-1200 and DT-300 (trade names) manufactured by Dispersion Technology, Inc.

The microparticles in the solvent, which have been irradiated with ultrasonic waves, vibrate in a relative manner due to the density difference between the solvent and the microparticles, and thus an electric field called as colloid vibration potential is generated by polarization of the charged microparticles and the counterions in the surroundings. When this electric field is detected and analyzed, the zeta potential can be measured.

In the particles of an inorganic oxide, when the pH of the dispersed solution changes, the zeta potential changes greatly. For example, when the pH of a solution in which titania particles (manufactured by Nippon Aerosil Co., Ltd.) are dispersed is changed to 3, 7.5 and 11, the zeta potential changes to +40 mV, 0 mV and −20 mV, respectively, while the particle size changes to 400 nm, 1600 nm and 900 nm, respectively.

That is, it can be seen that when the zeta potential becomes 0 mV, the particles aggregate (Otsuka Electronics Co., Ltd., Application Note, Zeta potential "Measurement of Zeta Potential of Inorganic Substances", p. LS-N002-6, published on Sep. 1, 2002). As can be seen from this, it is preferable to control the absolute value of the zeta potential of microparticles in the range of several mV to several ten mV, in order to stably disperse the microparticles in a solution.

An aqueous dispersion liquid of silica microparticle (SNOWTEX (ST) 20) manufactured by Nissan Chemical Industries, Ltd., which has been adjusted to 1% by mass, is at pH 10, and the zeta potential of the silica microparticles is −48 mV. When the pH of this silica microparticle dispersion liquid is adjusted to 9, the zeta potential of the silica microparticles becomes −45 mV. Also, when sodium chloride is added to an aqueous dispersion liquid of silica microparticles at pH 10, and the sodium chloride concentration of the aqueous dispersion liquid of silica microparticles is adjusted to 0.25 moles/liter, the zeta potential of the silica microparticles becomes −40 mV.

In a silica microparticle-laminated film produced by an alternate lamination method using an aqueous dispersion liquid of silica microparticles and a 0.3 mass % aqueous solution of polydiallyldimethylammonium chloride (PDDA), when the zeta potential is −48 mV, the refractive index of the silica microparticle-laminated film is 1.31, while when the zeta potential is −45 mV and −40 mV, the refractive index is 1.29. When the microparticle volume fraction is determined from this refractive index of 1.31, the volume fraction is found to be 60%, and when the microparticle volume fraction is determined from the refractive index of 1.29, the volume fraction is found to be 56%. From these results, it is speculated that the decrease in the refractive index is caused by a decrease in the microparticle volume fraction, which is in turn caused by a decrease in the zeta potential of the microparticles. In other words, the refractive index of the microparticle-laminated film can be controlled by controlling the zeta potential of the microparticles.

The type of microparticles that are contained in the microparticle-laminated film is not limited to one kind. For example, two or more kinds of microparticles may be adsorbed in a single round of liquid contact with the microparticle-dispersed solution, and the kinds of microparticles may be different for each liquid contact with the microparticle-dispersed solution.

Here, microparticles of titanium oxide, cerium oxide, niobium oxide, tin oxide, aluminum oxide and silicon oxide are preferred from the viewpoint of increasing the surface hardness of the microparticle-laminated film.

(H) Electrolyte Polymer Solution

An electrolyte polymer solution is required when a microparticle-laminated film is produced using an alternate lamination method. This electrolyte polymer solution is a solution obtained by dissolving an electrolyte polymer having a charge of the opposite sign or the same sign with respect to the surface charge of the microparticles, in water, an organic solvent, or a mixed solvent of a water-soluble organic solvent and water. Examples of the water-soluble organic solvent that can be used include methanol, ethanol, propanol, acetone, dimethylformamide, and acetonitrile.

As the electrolyte polymer, a polymer having a functional group having a charge in the main chain or in a side chain, can be used.

The ionic group in the electrolyte polymer solution is preferably one or more selected from the group consisting of a primary, secondary or tertiary amino group, a salt of the amino group, and a quaternary ammonium type group. That is, it is preferable that the electrolyte polymer have the ionic group. Examples of the electrolyte polymer will be described below.

A polyanion is generally a compound having a functional group capable of being negatively charged, such as sulfonic acid, sulfuric acid or carboxylic acid. Examples that can be used include polystyrene sulfonic acid (PSS), polyvinyl sulfuric acid (PVS), dextran sulfuric acid, chondroitin sulfuric acid, polyacrylic acid (PAA), polymethacrylic acid (PMA), polymaleic acid, polyfumaric acid, polyparaphenylene (−), polythiophene-3-acetic acid, polyamic acid, and copolymers including at least one or more of those polymers. Furthermore, functional polymeric ions such as poly(aniline-N-propanesulfonic acid) (PAN), and biopolymers having charges such as various deoxyribonucleic acids (DNA) and ribonucleic acids (RNA), polysaccharides having charges, such as pectin, can also be used.

A polycation is preferably a primary, secondary or tertiary amino group, or a quaternary ammonium group. Although the details are not clearly known, the surface hydroxyl group of silica is relatively strongly bonded to an amino group or an ammonium group.

Examples that can be used include polyethyleneimine (PEI and quaternized products thereof), polyallylamine and quaternized products thereof, polyallylamine hydrochloride (PAH), polydiallyldimethylammonium chloride (PDDA), polyvinylpyridine (PVP), polylysine, polyacrylamide, polypyrrole, polyaniline, polyparaphenylene (+), polyparaphenylene vinylene, polyethylimine, and copolymers including at least one or more of those polymers, or those polymers with different kinds of salt.

More specific examples include polyallylamine amidosulfate, a copolymer of allylamine hydrochloride and diallylamine hydrochloride, a copolymer of allylamine hydrochloride and dimethylallylamine hydrochloride, a copolymer of allylamine hydrochloride and others, a partially methoxycarbonylated allylamine polymer, a partially methylcarbonylated allylamine acetate polymer, a diallylamine hydrochloride polymer, a methyldiallylamine hydrochloride polymer, a methyldiallylamine amidosulfate polymer, a methyldiallylamine acetate polymer, a copolymer of diallylamine hydrochloride and sulfur dioxide, a copolymer of diallylamine acetate and a dioxide ion, a copolymer of diallylmethylethylammonium ethylsulfate and sulfur dioxide, a copolymer of methyldiallylamine hydrochloride and sulfur dioxide, a copolymer of diallyldimethylammonium chloride and sulfur dioxide, a copolymer of diallyldimethylammonium chloride and acrylamide, a copolymer of diallyldimethylammonium chloride and diallylamine hydrochloride, a copolymer of dimethylamine and epichlorohydrin, a copolymer of dimethylamine, ethylenediamine and epichlorohydrin, and a copolymer of polyamide polyamine and epichlorohydrin.

These electrolyte polymers are all water-soluble, or soluble in a mixed liquid of water and an organic solvent. The weight average molecular weight of the electrolyte polymer (value measured by gel permeation chromatography, using a calibration curve based on standard polystyrenes) cannot be briefly defined for different kinds of the electrolyte polymer used, but the weight average molecular weight in general is preferably 400 to 300,000.

The concentration of the electrolyte polymer in the solution is preferably equal to or more than 0.0003% by mass and equal to or less than 3% by mass, more preferably equal to or more than 0.001% by mass and equal to or less than 1% by mass, and even more preferably equal to or more than 0.01% by mass and equal to or less than 1% by mass. If the concentration of the electrolyte polymer is too low, the microparticle-laminated film cannot be formed properly, and if the concentration is too high, the removal of excess electrolyte polymer is insufficiently achieved in the washing step, and the excess electrolyte polymer produces aggregates, thereby impairing the transparency or smoothness of the microparticle-laminated film.

Furthermore, the pH of the electrolyte polymer solution is preferably equal to or higher than 5 and equal to or lower than 12, more preferably equal to or higher than 6 and equal to or lower than 11.5, even more preferably equal to or higher than 7 and equal to or lower than 11, and still more preferably equal to or higher than 9 and equal to or lower than 10.5. If the pH value is too low, the hydroxyl groups of the metal oxide microparticles cannot be activated, and the amount of adsorption of the electrolyte polymer is non-uniform, so that the thickness of the microparticle-laminated film becomes non-uniform. If the pH value is too high, the electrolyte polymer solution dissolves the metal oxide, and consequently impairs the transparency or smoothness of the microparticle-laminated film.

A (PDDA/PSS) multilayer film can be produced by an alternate lamination method, using polydiallyldimethylammonium chloride (PDDA) which is a polycation, and polystyrene sulfonic acid (PSS) which is a polyanion. The thickness of a (PDDA/PSS) 45-layer structured film which has been formed on a silicon wafer through 45 rounds of alternate lamination, is 60 nm, and the thickness of a PDDA/DSS film obtained per one round of alternate lamination can be estimated to be about 1.3 nm. From these results, it can be seen that the PDDA layer and the PSS layer are formed with a thickness in the molecular order. In addition, the monolayers of PDDA and PSS are thought to be several angstroms in thickness, in view of their molecular structures.

(I) Microparticle-Laminated Film

The microparticle-laminated film according to the present invention can be obtained during the process of producing the low refractive index film of the present invention, and the low refractive index film of the present invention can be produced by bringing the microparticle-laminated film into contact with a silicon compound solution.

The microparticle-laminated film will be described in detail below.

The microparticle-laminated film allows control of its refractive index, as well as the refractive index of the low refractive index film of the present invention, through the selection of the microparticle material. The refractive index of the microparticle-laminated film can be determined by an analysis of the polarization properties measured by ellipsometry, or an analysis of the reflection spectrum or the transmission spectrum measured with a spectrophotometer. These techniques are excellent because the thickness of the microparticle-laminated film can be simultaneously evaluated. Other examples of the method for determining the thickness of the microparticle-laminated film include methods of observing the film, such as SEM (scanning electron microscopy), TEM (transmission electron microscopy), and AFM (atomic force microscopy). Furthermore, a film may be formed on a quartz crystal oscillator, and the film thickness can be determined from the amount of frequency change and the density of the film material.

In the case of using a polydiallyldimethylammonium chloride (PDDA) as an electrolyte polymer having a charge different from that of the microparticles, as described above, the PDDA layer has a thickness in the molecular order, such as less than 1.3 nm. Therefore, it is thought that the PDDA layer covers the surface of the solid substrate or the microparticles while conforming to the surface shape. Furthermore, due to its thinness, the PDDA layer functions as an electrostatic binding material between the solid substrate and the microparticles and between the microparticles themselves.

The refractive index of the microparticle-laminated film is lower than that of the bulk of the microparticle material, but that is because gaps are produced between the microparticles in the microparticle-laminated film. The gaps between the microparticles in the microparticle-laminated film according to the present invention are mostly filled with air, and the refractive index of the microparticle-laminated film, $n_c$, can be determined from the following expression (2).

[Expression 7]

$$n_c = \sqrt{\rho_p n_p^2 + (1-\rho_p) n_0^2} \quad (2)$$

wherein $\rho_p$ represents the volume density of the microparticles in the microparticle-laminated film; $n_p$ represents the refractive index of the material that constitutes the microparticles; and $n_1$ represents the refractive index of air=1.0 (see Thin-Film Optical Devices, by Sadafumi Yoshida and Hiroyoshi Yajima, University of Tokyo Press, pp. 34-37, published on Sep. 20, 1994).

For example, the refractive index, $n_c$, of a microparticle-laminated film which uses titania microparticles having a bulk refractive index, $n_p$, of 2.3, is 1.8, and the refractive index, $n_c$, of a microparticle-laminated film which uses silica microparticles having a bulk refractive index, $n_p$, of 1.48, is 1.2. As such, since the microparticle-laminated film exhibits a lower refractive index than the bulk refractive index of the microparticle material, the selection range of the refractive index in an optical design is extended.

The refractive index of the microparticle-laminated film according to the present invention is equal to or more than 1.10 and equal to or less than 1.28. However, if the refractive index is less than 1.10, it is difficult to form a microparticle-laminated film having that refractive index, and if the refractive index exceeds 1.28, when a silicon compound increases the refractive index by penetrating into the microparticle-laminated film, the anti-reflection function is decreased. This refractive index is preferably equal to or more than 1.14 and equal to or less than 1.28, more preferably equal to or more than 1.14 and equal to or less than 1.25, even more preferably equal to or more than 1.15 and equal to or less than 1.23, and still more preferably equal to or more than 1.16 and equal to or less than 1.20.

The microparticle-laminated film has voids in the film, but since the size of the microparticles and the voids is sufficiently smaller than the wavelength of light (visible light), the microparticle-laminated film has an average refractive index, $n_c$. Furthermore, when the voids of the microparticle-laminated film are filled with a silicon compound, since the size of the voids of the microparticle-laminated film is reduced, the microparticle-laminated film still exhibits an average refractive index in that case. An anti-reflection film including such a microparticle-laminated film, or an anti-reflection film including a microparticle-laminated film containing a material other than the microparticles in the voids, has a certain average refractive index, and functions as an optically single-layered film.

In a microparticle-laminated film formed by using particles having a shape in which primary particles are connected as shown in FIG. 1, densification is inhibited due to the steric hindrance caused by the particles themselves, and therefore, the refractive index of the microparticle-laminated film is decreased. In that case, since voids having a size equal to or more than the particle size of the primary particles are present in the interior or at the surface of the microparticle-laminated film, the internal voids can be observed with a TEM (transmission electron microscope), and the surface voids can be observed with a SEM (scanning electron microscope) or an AFM (atomic force microscope).

When a low refractive index film having a refractive index $n_{AR}$ and a film thickness $d_{AR}$ as represented by the following expressions (5) and (6) is formed on the surface of a solid substrate having a refractive index $n_s$, the surface reflection ratio of the solid substrate at a wavelength λ is 0%.

[Expression 8]

$$n_{AR} = \sqrt{n_s} \quad (5)$$

[Expression 9]

$$d_{AR} = \frac{\lambda}{4n_{AR}} \quad (6)$$

Figure 2:
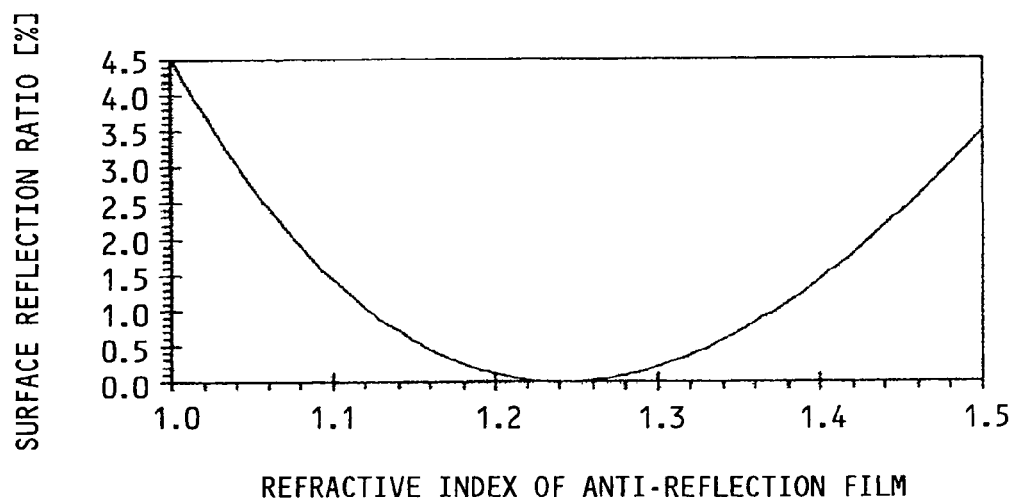
FIG. 2 is a graph showing a relationship between a refractive index of an anti-reflection film and a surface reflection ratio of an anti-reflection film-attached solid substrate (refractive index 1.54)

For example, in order to obtain a surface reflection ratio of 0% for a transparent solid substrate having a refractive index $n_s$=1.54 at a wavelength of 550 nm, it is needed to form a low refractive index film having $n_{AR}$=1.241 and $d_{AR}$=111 nm on the surface of the solid substrate. The relationship between the surface reflection ratio obtained when an anti-reflection film is formed on a transparent solid substrate with $n_s=1.54$, and the refractive index of the low refractive index film, is shown as in FIG. 2. Whether the refractive index of the low refractive index film is smaller or larger than $n_{AR}$, the surface reflection ratio of the low refractive index film-attached solid substrate increases to be more than 0%.

On the other hand, in order to obtain a surface reflection ratio of 0.1% or less for a transparent solid substrate having a refractive index $n_s=1.54$ at a wavelength of 550 nm, the $n_c$ of the low refractive index film may be equal to or more than 1.203 and equal to or less than 1.281.

Furthermore, in order to obtain a surface reflection ratio of 1.0% or less for a transparent solid substrate having a refractive index $n_s=1.54$ at a wavelength of 550 nm, the n, of the low refractive index film may be equal to or more than 1.123 and equal to or less than 1.372. When there is no low refractive index film, the surface reflection ratio of a transparent solid substrate having a refractive index $n_s=1.54$ is 4.5%. Therefore, when a low refractive index film having a refractive index of equal to or more than 1.123 and equal to or less than 1.372 is formed on the surface of a solid substrate, that low refractive index film functions as an anti-reflection film.

The refractive index of the microparticle-laminated film according to the present invention is smaller than the refractive index $n_{AR}$ (see expression (5)) which makes the surface reflection ratio of a solid substrate, to be 0%. For that reason, even if the refractive index of the microparticle-laminated film increases because of the penetration of a silicon compound into the microparticle-laminated film, the microparticle-laminated film continuously functions as an anti-reflection film. For example, when the refractive index of a microparticle-laminated film is originally 1.372 and increases to 1.490 for some reason, the surface reflection ratio of the solid substrate increases from 1.0% to 3.3%, and the microparticle-laminated film no longer serves as an anti-reflection film.

However, when the refractive index of a microparticle-laminated film is originally 1.123 and increases to 1.241 due to penetration of a silicon compound into the microparticle-laminated film, the surface reflection ratio of the solid substrate decreases from 1.0% to 0.0%, and the anti-reflection function is enhanced. As can be seen from this, a low refractive index film produced by making a silicon compound to penetrate into a microparticle-laminated film having a refractive index smaller than $n_{AR}$ (see expression (5)), functions as an excellent anti-reflection film.

Furthermore, also for the use as an optical functional thin film other than an anti-reflection film, the microparticle-laminated film having a low refractive index as in the present invention is useful for an enhancement of the optical performance or for the maintenance of optical functions.

(J) Silicon Compound Solution

The silicon compound solution used in the present invention contains, according to a first embodiment, any one selected from among (1) a hydrolysate and a condensation reaction product of the hydrolysate, of an alkoxysilane (I) having functional groups composed of hydrolyzable groups and non-hydrolyzable organic groups; (2) a hydrolysate and a condensation reaction product of the hydrolysate, of a mixture of the alkoxysilane (I) with an alkoxysilane (II) having functional groups composed only of hydrolyzable groups; and (3) a mixture of a hydrolysate and a condensation reaction product of the hydrolysate of the alkoxysilane (I), with the alkoxysilane (II).

On the other hand, the silicon compound solution used in a second embodiment contains any one selected from among (4) an alkoxysilane (II) having functional groups composed only of hydrolyzable groups; (5) a hydrolysate and a condensation reaction product of the hydrolysate (III), of the alkoxysilane (II); and (6) a mixture of the alkoxysilane (II), with the hydrolysate and a condensation reaction product of the hydrolysate (III).

In a low refractive index film which is obtained by bringing a microparticle-laminated film into contact with a silicon compound solution containing any one of the above items (1) to (6), a silicon compound is used to bind the solid substrate with the microparticles, and the microparticles with one another. That is, the silanol groups of the silicon compound produced by hydrolysis are covalently bonded to the hydroxyl groups or polar groups on the surface of the microparticles through hydrogen bonding or dehydration condensation, and the silicon compound is bonded to the microparticles. Furthermore, the silanol groups of the silicon compound produced by hydrolysis, or any alkoxy groups remaining behind without being hydrolyzed, form hydrogen bonding with the hydroxyl groups or polar groups on the surface of the solid substrate, and thereby the silicon compound is bonded to the substrate. Through such binding, the low refractive index film of the present invention has excellent adhesiveness to the substrate than a microparticle-laminated film. Hydrolysis of the silicon compound may be carried out by the water of adsorption carried by the microparticle-laminated film after the contact with the silicon compound solution. Furthermore, when hydrolysis of the silicon compound is not carried out before the contact with the microparticle-laminated film, that is, when an alkoxysilane is directly brought into contact with the microparticle-laminated film, the hydrolysis is carried out by the water of adsorption carried by the microparticle-laminated film after the contact.

The silicon compounds of the above items (1) to (6) will be described in detail below.

<Silicon Compound of (1)>

The silicon compound of item (1) is a hydrolysate and a condensation reaction product of the hydrolysate, of an alkoxysilane (I) having functional groups composed of hydrolyzable groups and non-hydrolyzable organic groups, as described above.

[Alkoxysilane (I)]

The alkoxysilane (I) has functional groups composed of hydrolyzable groups and non-hydrolyzable organic groups, and a specific example thereof may be a silane coupling agent. Specific examples of the silane coupling agent include a vinyl group-functional silane such as vinyltrimethoxysilane, vinyltriethoxysilane, vinylphenyltrimethoxysilane, or vinyltris(2-methoxyethoxy)silane; an alkyl group- or aryl group-functional silane such as methyltrimethoxysilane, methyltriethoxysilane, phenyltrimethoxysilane or phenyltriethoxysilane; an epoxy group-functional silane such as β-(3,4-epoxycyclohexyl)ethyltrimethoxysilane, γ-glycidoxypropyltrimethoxysilane, γ-glycidoxypropylmethyldiethoxysilane, γ-glycidoxypropylmethyldiisopropenoxysilane, methyltriglycidoxysilane, or γ-glycidoxypropyltriethoxysilane; a styryl group-functional silane such as p-styryltrimethoxysilane; a methacryloxy group-functional silane such as γ-methacryloxypropyltrimethoxysilane, γ-methacryloxypropylmethyldimethoxysilane, methyltri(methacryloxyethoxy)silane, γ-methacryloxypropylmethyldiethoxysilane, or γ-methacryloxypropyltriethoxysilane; an acryloxy group-functional silane such as γ-acryloxypropyltrimethoxysilane; an amino group-functional silane such as γ-aminopropyltrimethoxysilane, γ-aminopropyltriethoxysilane, γ-aminopropylmethyldimethoxysilane, γ-aminopropylmethyldiethoxysilane, N-β-(aminoethyl)-γ-aminopropyltrimethoxysilane, N-β-(aminoethyl)-γ-aminopropylmethyldimethoxysilane, N-β-(aminoethyl)-γ-aminopropyltriethoxysilane, N-β-(aminoethyl)-γ-aminopropylmethyldiethoxysilane, N-β-(N-vinylbenzylaminoethyl)-γ-aminopropyltrimethoxysilane, γ-anilinopropyltrimethoxysilane, γ-triethoxysilyl-N-(1,3-dimethylbutylidene)-propylamine, or N-phenyl-3-aminopropyltrimethoxysilane; a ureido group-functional silane such as γ-ureidopropyltriethoxysilane; a chloropropyl group-functional silane such as γ-chloropropyltrimethoxysilane; a mercapto group-functional silane such as γ-mercaptopropyltrimethoxysilane, γ-mercaptopropyltriethoxysilane or γ-mercaptopropylmethyldimethoxysilane; a sulfide group-functional silane such as bis(triethoxysilylpropyl) tetrasulfide; and an isocyanate group-functional silane such as γ-isocyanatopropyltriethoxysilane, or ethoxysilane triisocyanate.

A hydrolysate and a condensation reaction product of the hydrolysate of the alkoxysilane (I) are obtained by hydrolyzing the alkoxysilane (I) by a known method. For example, the alkoxysilane (I) can be hydrolyzed by mixing the alkoxysilane (I) with water in the presence of an acidic catalyst, in the presence of a basic catalyst, or in the absence thereof, and in the presence or absence of a solvent.

The temperature at the time of alkoxy hydrolysis can be selected from between room temperature and the boiling point of the solvent, and the duration of hydrolysis may be arbitrarily selected from between 1 hour to 1000 hours, in accordance with the progress of hydrolysis and polycondensation. Furthermore, it is preferable to perform stirring during the hydrolysis. It is preferable to add the alkoxysilane (I) in an amount of incorporation of 1% to 90% by mass. It is preferable to add water in an amount of incorporation of 1% to 500% by mass, and more preferably 5% to 100% by mass, based on the alkoxysilane (I). The solvent is preferably a lower alcohol such as methanol, ethanol, propanol or butanol; a polar solvent such as ethyl acetate, acetone, dimethylformamide or acetonitrile; or a mixed solvent of a lower alcohol and a polar solvent. As the acid catalyst, an inorganic acid or an organic acid can be suitably used, and preferred examples of the inorganic acid include hydrochloric acid, sulfuric acid, phosphoric acid and boric acid, while preferred examples of the organic acid include formic acid, acetic acid, oxalic acid and p-toluenesulfonic acid. The amount of catalyst that is preferably employed is usually 1 ppm to 5% based on the alkoxysilane (I). If the catalyst is used in an amount of more than 5%, the target product may still be obtained, but particularly good results may not be expected.

<Silicon Compound of (2)>

The silicon compound of item (2) is, as described above, a hydrolysate and a condensation reaction product of the hydrolysate, of a mixture of the alkoxysilane (I) and an alkoxysilane (II) having functional groups composed only of hydrolyzable groups.

[Alkoxysilane (II)]

The alkoxysilane (II) has hydrolyzable groups only, and specific examples include tetramethoxysilane, tetraethoxysilane, tetrapropoxysilane, tetrabutoxysilane, tetrakis(2-methoxyethoxy)silane, an oligomer of methyl silicate, and an oligomer of ethyl silicate. Specific examples of the oligomer of methyl silicate include METHYL SILICATE 51 manufactured by Fuso Chemical Co., Ltd., manufactured by Tama Chemicals Co., Ltd., or manufactured by Colcoat Co., Ltd.; and METHYL SILICATE 53A (heptamer on the average) manufactured by Colcoat Co., Ltd. Specific examples of the oligomer of ethyl silicate include ETHYL SILICATE 40 manufactured by Tama Chemicals Co., Ltd. or manufactured by Colcoat Co., Ltd.; ETHYL SILICATE 45 manufactured by Tama Chemicals Co., Ltd.; and ETHYL SILICATE 48 manufactured by Colcoat Co., Ltd. Furthermore, in the alkoxysilane (II), the hydrolyzable groups may not be all identical. For example, a mixture of tetramethoxysilane and tetraethoxysilane may be used, or methoxy groups and ethoxy groups may be introduced at a ratio of approximately 50:50 as the functional groups of the silicate. An example thereof may be EMS-485 manufactured by Colcoat Co., Ltd.

The silicon compound of item (2) is obtained by mixing an alkoxysilane (I) and an alkoxysilane (II) and hydrolyzing the mixture, but the mixing ratio of the alkoxysilane (II) [b] to the alkoxysilane (I) [a](b/a) is preferably set at 0.1 to 10.0, more preferably 0.25 to 4.0, and even more preferably 0.5 to 2.0, from the viewpoint of an enhancement of the adhesiveness between a low refractive index film and a plastic substrate. The silicon compound can be obtained by subjecting a mixture obtained by mixing the alkoxysilane (I) and the alkoxysilane (II) at this mixing ratio, to hydrolysis in the same manner as in the case of the silicon compound of the above item (1).

Furthermore, in the silicon compound solution of the item (2), the silane concentration is preferably adjusted to 0.1% to 10% by mass, and more preferably 0.3% to 5% by mass. If the silane concentration is too low, there is no difference between the adhesiveness of the low refractive index film to the substrate and the adhesiveness of the microparticle-laminated film to the substrate. If the silane concentration is too high, the filling amount of the silicon compound into the voids of the microparticle-laminated film increases excessively, and accordingly, the refractive index of the low refractive index film is not lowered. Here, the silane concentration is determined by the formula: (Mass of alkoxysilane (I)+mass of alkoxysilane (II)/total mass of the solution).

<Silicon Compound of (3)>

The silicon compound of the item (3) is, as described above, a mixture of a hydrolysate and a condensation reaction product of the hydrolysate of the alkoxysilane (I), with the alkoxysilane (II), in other words, a mixture of the silicon compound of the above item (1) with the alkoxysilane (II).

The silicon compound of the item (3) is obtained by mixing the silicon compound of the above item (1) and the alkoxysilane (II). The mixing ratio of the alkoxysilane (II) [d] to the silicon compound of the above item (1) [c] (d/c) is preferably set at 0.1 to 10.0, more preferably 0.25 to 4.0, and even more preferably 0.5 to 2.0, from the viewpoint of enhancing the adhesiveness between a low refractive index film and a plastic substrate.

Furthermore, in the silicon compound solution of the item (3), the silane concentration is preferably adjusted to 0.1% to 10% by mass, and more preferably 0.3% to 5% by mass. Here, the silane concentration is determined by the formula: (Mass of alkoxysilane (I) to obtain the silicon compound of above item (1)+mass of alkoxysilane (II)/total mass of the solution).

<Silicon Compound of (4)>

The silicon compound of the item (4) is, as described above, an alkoxysilane (II) having functional groups composed only of hydrolyzable groups.

In the silicon compound solution of the item (4), the silane concentration is preferably adjusted to 0.1% to 10% by mass, and more preferably 0.3% to 5% by mass. If the silane concentration is too low, there is no difference between the adhesiveness of the low refractive index film to the substrate and the adhesiveness of the microparticle-laminated film to the substrate. If the silane concentration is too high, the filling amount of the silicon compound into the voids of the microparticle-laminated film increases excessively, and accordingly, the refractive index of the low refractive index film is not lowered.

<Silicon Compound of (5)>

The silicon compound of the item (5) is a hydrolysate and a condensation reaction product of the hydrolysate (III), of the alkoxysilane (II).

A hydrolysate and a condensation reaction product of the hydrolysate of the alkoxysilane (II) are obtained by hydrolyzing the alkoxysilane (II) by a known method. For example, the alkoxysilane (II) can be hydrolyzed by mixing the alkoxysilane (II) with water in the presence of an acidic catalyst, in the presence of a basic catalyst, or in the absence thereof, and in the presence or absence of a solvent.

The temperature at the time of hydrolysis can be selected from between room temperature and the boiling point of the solvent, and the duration of hydrolysis may be arbitrarily selected from between 1 hour to 1000 hours, in accordance with the progress of hydrolysis and polycondensation.

Furthermore, it is preferable to perform stirring during the hydrolysis. It is preferable to add the alkoxysilane (II) in an amount of incorporation of 1% to 90% by mass.

It is preferable to add water in an amount of incorporation of 1% to 500% by mass, and more preferably 5% to 100% by mass, based on the alkoxysilane (II).

The solvent is preferably a lower alcohol such as methanol, ethanol, propanol or butanol; a polar solvent such as ethyl acetate, acetone, dimethylformamide or acetonitrile; or a mixed solvent of a lower alcohol and a polar solvent.

As the acid catalyst, an inorganic acid or an organic acid can be suitably used, and preferred examples of the inorganic acid include hydrochloric acid, sulfuric acid, phosphoric acid and boric acid, while preferred examples of the organic acid include formic acid, acetic acid, oxalic acid and p-toluenesulfonic acid. The amount of catalyst that is preferably employed is usually 1 ppm to 5% based on the alkoxysilane (II). If the catalyst is used in an amount of more than 5%, the target product may still be obtained, but particularly good results may not be expected.

In the silicon compound solution of the item (5), the silane concentration is preferably adjusted to 0.1% to 10% by mass, and more preferably 0.3% to 5% by mass. If the silane concentration is too low, there is no difference between the adhesiveness of the low refractive index film to the substrate and the adhesiveness of the microparticle-laminated film to the substrate. If the silane concentration is too high, the filling amount of the silicon compound into the voids of the microparticle-laminated film increases excessively, and accordingly, the refractive index of the low refractive index film is not lowered. The silane concentration is determined by the formula: (Mass of alkoxysilane (II)/total mass of the solution).

<Silicon Compound of (6)>

The silicon compound of the item (6) is a mixture of the alkoxysilane (II), with the hydrolysate and the condensation reaction product of the hydrolysate (III).

The silicon compound of the item (6) is obtained by mixing the alkoxysilane (II) with the hydrolysate and the condensation reaction product of the hydrolysate (III). The mixing ratio of the hydrolysate and the condensation reaction product of the hydrolysate (III) [b] to the alkoxysilane (II) [a](b/a) is preferably set at 0.1 to 10.0, more preferably 0.25 to 4.0, and even more preferably 0.5 to 2.0, from the viewpoint of enhancing the adhesiveness between a low refractive index film and a substrate.

Furthermore, in the silicon compound solution of the item (6), the silane concentration is preferably adjusted to 0.1% to 10% by mass, and more preferably 0.3% to 5% by mass. If the silane concentration is too low, there is no difference between the adhesiveness of the low refractive index film to the substrate and the adhesiveness of the microparticle-laminated film to the substrate. If the silane concentration is too high, the filling amount of the silicon compound into the voids of the microparticle-laminated film increases excessively, and accordingly, the refractive index of the low refractive index film is not lowered. Here, the silane concentration is determined by the formula: (Mass of alkoxysilane (II)+alkoxysilane (III)/total mass of the solution).

Among the silicon compounds of the above items (1) to (6), the silicon compounds of items (2) and (5) are particularly preferable because these compounds have more silanol groups produced by hydrolysis, and the adhesiveness between the low refractive index film and the substrate can be enhanced. The most preferred silicon compound is (5).

In regard to the method of bringing a silicon compound solution containing any one of the above items (1) to (6), into contact with a microparticle-laminated film, a known method may be used. Any of a spraying method, a dipping method, a roll coating method, a spin coating method and the like can be used.

The silicon compound is dissolved in a diluent solvent to prepare a solution (silicon compound solution), and the solution can be brought into contact with the microparticle-laminated film by the various methods described above. The diluent solvent for the concentration adjustment of the silicon compound is preferably a lower alcohol such as methanol, ethanol, propanol or butanol; a polar solvent such as ethyl acetate, acetone, dimethylformamide or acetonitrile; or a mixed solvent of a lower alcohol and a polar solvent.

When the silicon compound solution is brought into contact with a microparticle-laminated film, and then the diluent solvent is evaporated, the silicon compound is hydrolyzed by the water of adsorption carried by the microparticle-laminated film, and a polycondensation reaction sufficiently proceeds concomitantly with evaporation of the diluent solvent. When the silicon compound having the silanol groups produced by the hydrolysis is bonded to the microparticles and the substrate, the silicon compound serves as a bridging agent, and thereby adhesiveness between the low refractive index film and the substrate is obtained. Furthermore, when the silicon compound having the silanol groups produced by the hydrolysis binds microparticles with microparticles, the entire low refractive index film is closely adhered to the substrate. As the amount of the silicon compound that is brought into contact with the microparticle-laminated film increases, the refractive index of the low refractive index film increases. Therefore, the refractive index of the low refractive index film can be controlled by adjusting the amount of the silicon compound.

For example, in the case of bringing the silicon compound into contact with the microparticle-laminated film by a spin coating method, the refractive index of the low refractive index film can be controlled by adjusting the spin rotation speed and the concentration of the silicon compound. The spin rotation speed is arbitrarily selected to be 100 to 5000 rotations/min, and the concentration of the silicon compound is preferably 0.1% to 10% by mass, and more preferably 0.3% to 5% by mass.

In regard to the silicon compound of the item (4), although the alkoxysilane (II) does not undergo hydrolysis, in this case, when the silicon compound is brought into contact with the microparticle-laminated film and then the diluent medium is evaporated, the silicon compound is hydrolyzed by the water of adsorption carried by the microparticle-laminated film, and a polycondensation reaction proceeds concomitantly with evaporation of the diluent medium.

The low refractive index film obtained by bringing a silicon compound solution into contact with a microparticle-laminated film, is excellent in the adhesiveness to the substrate as compared with the microparticle-laminated film, and such difference can be seen by a tape test. For example, a low refractive index film obtained by bringing a hydrolysate of tetraethoxysilane into contact with a microparticle-laminated film is such that even if the low refractive index film is subjected to a tape test using an adhesive tape (31B, manufactured by Nitto Denko Corp.) having an adhesive power of 6.2 N/20 mm, the low refractive index film does not undergo neither peeling off nor film loss. However, when a microparticle-laminated film is subjected to a tape test under the same conditions, the microparticle-laminated film undergoes peeling or film loss. In addition, the film loss refers to a state in which the thickness of a film has been reduced due to cohesive failure, and the film thickness can be evaluated by an evaluation of film thickness with an ellipsometer, or an analysis of the reflection ratio or transmittance measured with a spectrophotometer. Alternatively, it can also be evaluated whether film loss is occurring or not, based on the scattering of light due to the surface unevenness produced by cohesive failure of the film. On the other hand, peeling of the film can be evaluated based on that the reflection ratio or transmittance is almost close to the corresponding value of the substrate itself.

The coating liquid set for a low refractive index film of the present invention includes the (F) microparticle dispersion liquid, (H) electrolyte polymer solution, and (J) silicon compound solution described above. When these liquids are used as described above, the low refractive index film of the present invention can be formed.

(K) Optical Member

Since the microparticle-laminated film according to the present invention is obtained by an alternate lamination method, the uniformity of film thickness is high. Therefore, the low refractive index film of the present invention obtained by bringing the microparticle-laminated film into contact with a silicon compound solution, can be suitably used in optical members. The low refractive index film of the present invention can be made to function as, for example, an anti-reflection film, a reflective film, a half-transparent half-reflective film, a visible light-reflective infrared-transparent film, an infrared-reflective visible light-transparent film, a blue reflective film, a green reflective film, a red reflective film, an emission line cutoff filter film, or a film having a constitution in which two or more color correction films have been added. The low refractive index film can suitably function as an anti-reflection film in particular.

Accordingly, a solid substrate having the low refractive index film of the present invention formed thereon can be used as, for example, an anti-reflection film-attached substrate, a reflective film-attached substrate (mirror), a half-transparent half-reflective film-attached substrate (translucent mirror), a visible light-reflective infrared-transparent film-attached substrate (cold mirror), an infrared-reflective visible light-transparent film-attached substrate (hot mirror), a blue reflective film-attached substrate, a green reflective film-attached substrate or a red reflective film-attached substrate (dichroic mirror), an emission line cutoff filter film-attached substrate, or a color correction film-attached substrate.

The above-described function is often exhibited by a microparticle-laminated film composed of a multilayer structural film formed by laminating a low refractive index film and a high refractive index film on a solid substrate while controlling the film thickness.

The refractive index required for the manifestation of optical functions is generally in the range of 1.2 to 1.5 for a low refractive index film, and in the range of 1.6 to 2.4 for a high refractive index film. However, in many cases, a lower refractive index is better for the low refractive index, while a higher refractive index is better for the high refractive index film. In addition, the film thickness required for the manifestation of optical functions can be determined by the expression (1) shown above. Adjustment of the refractive index can be achieved by the selection of microparticles as discussed above.

Examples of an anti-reflection film having a multilayer structure include such films having a lamination number of four or more layers, in which a high refractive index film and a low refractive index film are alternately laminated on a solid substrate, and they exhibit an anti-reflection function in a broad wavelength region. In this case, as the difference in the refractive index between the low refractive index film and the high refractive index film is larger, the anti-reflection performance is superior. From the viewpoint of the use in actual anti-reflection films, the minimum value of the surface reflection ratio of the microparticle-laminated film in the visible light wavelength region is preferably 3% or less, more preferably 2% or less, even more preferably 1% or less, and still more preferably 0.5% or less.

A fundamental multilayer structure of a half-transparent high-reflective film is generally a four-layered structure in which two layers of a high refractive index film and a low refractive index film are laminated in order on a solid substrate, and this is repeated two times. The thickness of each layer of the high refractive index film and the low refractive index film should essentially approximate the value of the above expression (1), but the thickness may be slightly increased or decreased, in order to make the reflection spectrum or transmission spectrum smooth in the target wavelength region, that is, in order to make the wavelength dependency of the reflection ratio or transmittance smaller.

Also in a single-layered film of a high refractive index film, when the thickness approximates the value of the expression (1), the film exhibits a half-transparent half-reflection function in a wavelength region centered around the wavelength $\lambda$. From the viewpoint of the use in actual half-transparent half-reflective films, it is preferable that the average value of the reflection ratio of the microparticle-laminated film in the visible light wavelength region be equal to or more than 15% and equal to or less than 50%, and the average value of the transmittance be equal to or more than 50% and equal to or less than 85%; it is more preferable that the average value of the reflection ratio be equal to or more than 15% and equal to or less than 40%, and the average value of the transmittance be equal to or more than 60% and equal to or less than 85%; and it is even more preferable that the average value of the reflection ratio be equal to or more than 15% and equal to or less than 30%, and the average value of the transmittance be equal to or greater than 70% and equal to or less than 85%.

A fundamental multilayer structure of a reflective film is a structure in which a bilayer structure obtained by laminating two layers of a high refractive index film and a low refractive index film in order on a solid substrate, is laminated in repetition, so that the structure has a high refractive index film and a low refractive index film alternately laminated, but the lowermost layer on the solid substrate side and the uppermost layer are formed of the high refractive index film. The film thicknesses are essentially determined respectively by the expression (1) shown above. As the number of repetition of the bilayer structure of the high refractive index and the low refractive index increases, a higher reflection ratio is obtained.

Furthermore, as the difference in the refractive index between the low refractive index film and the high refractive index film is larger, even though the number of repetition of the bilayer structure remains the same, the reflection ratio increases. Accordingly, when the difference in the refractive index between the low refractive index film and the high refractive index film is increased, the number of repetition of the bilayer structure required to obtain a high reflection ratio can be reduced.

Since a visible light-reflective infrared-transparent film, an infrared-reflective visible light-transparent film, a blue reflective film, a green reflective film, a red reflective film, an emission line cutoff filter film and a color correction film are characterized by having a high reflective ratio at a certain particular wavelength, the fundamental film structure is the same multilayer structure as in the case of the reflective film.

As it can be seen from the expression (2), the refractive index of a microparticle-laminated film can be controlled by alteration of the microparticle material or by control of the volume density of the microparticles, and thus a microparticle-laminated film having a high refractive index or a low refractive index can be obtained. For example, when microparticles of titanium oxide having a bulk refractive index of 2.3, microparticles of ceria having a bulk refractive index of 2.2, and microparticles of tin oxide having a bulk refractive index of 1.9 are used, and the volume density of the microparticles is controlled to 60%, a titania microparticle-laminated film having a refractive index of 1.89, a ceria microparticle-laminated film having a refractive index of 1.82, or a tin oxide microparticle-laminated film having a refractive index of 1.60 is obtained.

On the other hand, when microparticles of aluminum oxide having a bulk refractive index of 1.6 and microparticles of silica having a bulk refractive index of 1.48 are used, and the volume density of the microparticles is controlled to 50%, an aluminum oxide microparticle-laminated film having a refractive index of 1.33 or a silica microparticle-laminated film having a refractive index of 1.26 is obtained. The microparticle volume density can be controlled by the zeta potential of the microparticles or the microparticle shape.

In regard to the microstructure having high geometric optical performance as a result of highly effective control of the microstructure, it is not preferable to scatter or diffuse visible light in an anti-reflection film or a low refractive index film having a microstructured surface. This is because an anti-reflection film or a low refractive index film which scatters or diffuses light even to a slightest degree causes the extent of scattering or diffusion of light when light is incident from an angle.

In the case of an anti-reflection film having a microstructured surface, light enters not only from the normal direction, but also in many occasions, from an oblique direction. Therefore, for example, when an anti-reflection film or a low refractive index film which scatters or diffuses light is formed on the surface of a lens-shaped object, a decrease in the geometric optical performance occurs, such as an inability to focus light. That is, in order to prevent an anti-reflection film from impairing the geometric optical performance of the microstructure, it is preferable for the anti-reflection film or the low refractive index film to be transparent. According to the present invention, when the turbidity of the anti-reflection film or the low refractive index film is measured, it can be evaluated whether the anti-reflection film or the low refractive index film of the present invention does not impair the geometric optical performance of the microstructure.

In a microstructure having high geometric optical performance as a result of highly effective control of the microstructure, the anti-reflection film on the microstructured surface is preferably formed to be conforming to the shape of the microstructure. If the anti-reflection film does not conform to the shape of the microstructure, the geometric optical performance of the microstructure is impaired. For example, in the case of a lens-shaped microstructure, if the anti-reflection film on the surface of an on-chip microlens array which is used in solid state image capturing elements, does not conform to the shape of the microlens, the light-focusing performance of the lens is impaired, and therefore, the sensitivity is decreased as a result of a reduction in the amount of light collected. Furthermore, the light irradiated on areas other than photodiodes turns into stray light, causing flare or a decrease in contrast.

According to the present invention, when the cross-section of a microstructure having a low refractive index film formed thereon is observed with a scanning electron microscope or the like, and the thickness of the low refractive index film in the normal direction from the microstructure surface is measured, the conformity of the low refractive index film with the shape of the microstructure can be evaluated. Furthermore, the microstructure is observed from an oblique direction with a scanning electron microscope or the like, and from the projected shape of the microstructure, the conformity of the low refractive index film with the shape of the microstructure can be evaluated.

According to the present invention, when a solid substrate has polar groups on the surface, a microparticle-laminated film formed thereon can obtain practical adhesiveness. Furthermore, when the microparticles are bonded to the substrate by a silicon compound, more excellent adhesiveness can be obtained. An example of a method of evaluating the surface hardness of a film on a solid substrate may be a pencil hardness test. An example of an apparatus for evaluating the hardness of the thin film itself without depending on the hardness of the solid substrate may be a nanoindenter.

Furthermore, an example of a method for evaluating adhesiveness may be a tape peeling test.

In the tape peeling test, it is not necessarily required to have an adhesive force of 2.94 N/10 mm or more as defined in JIS Z 1522, and the test may be performed using an adhesive tape used in more practical processes. In a process for producing semiconductors such as a photoelectric conversion element, a protective tape such as an adhesive tape used in a back grinding process, is suitable for the purpose.

Furthermore, for optical functional members such as a Fresnel lens or a lenticular lens used in a brightness enhancing lens film for liquid crystal backlight, a diffusion film, or a screen of video projection televisions, an adhesive tape that is attached for surface protection, contamination prevention or fixing during processing, transportation, assembly and storage, is suitable for the purpose.

(L) Drying Treatment

The low refractive index film formed on the surface of a solid substrate as described above may be subjected to a drying treatment by heating. The dehydration condensation between the silicon compound and the microparticles or the substrate is accelerated, and an enhancement of the strength and adhesiveness to substrate of the low refractive index film is promoted.

The heating temperature is desirably a temperature lower than the melting temperature, glass transition temperature, softening temperature and the like of the solid substrate, and a temperature at which optical functions such as transparency or color-freeness of the solid substrate are maintained is preferable. In addition, the heating temperature may exceed the melting temperature or boiling temperature of the electrolyte polymer in the microparticle-laminated film.

Since the electrolyte polymer in the microparticle-laminated film according to the present invention is in a trace amount, even if the electrolyte polymer evaporates by heating and is removed from the microparticle-laminated film, the optical functions or mechanical properties are maintained.

Also, the electrolyte polymer is required as an electrostatic binding material for the formation of the microparticle-laminated film; however, after the formation of the microparticle-laminated film, as the microparticle-laminated film is maintained by the attractive force between the microparticles, the electrolyte polymer may remain in the film, or may be absent.

The heating time is preferably one minute to one hour. As a matter of fact, the relationship between the heating temperature and the heating time is relative, and when the treatment temperature is low, the object can be achieved by continuing the treatment over a correspondingly long time.

Furthermore, there are no limitations on the atmosphere of the heating treatment, and the atmosphere may be any of an oxidizing atmosphere such as in air, an inert atmosphere such as in nitrogen, or a reducing atmosphere containing hydrogen or the like. There are no limitations on the heating method, and the heating can be carried out using any heating means or heating apparatus such as an oven, an inductive heating apparatus, or an infrared heater.

<Microparticle-Laminated Thin Film-Attached Substrate and a Method for Producing the Same>

Next, the microparticle-laminated thin film-attached substrate of the present invention and a method for producing the same will be explained.

The microparticle-laminated thin film-attached substrate of the present invention is a microparticle-laminated thin film-attached substrate having a microparticle-laminated thin film with voids formed on a plastic substrate having a coefficient of thermal expansion of 50 to 350 (ppm/K), and is characterized in that the microparticle-laminated thin film is attached such that an electrolyte polymer and microparticles are alternately adsorbed and are in contact with an alcoholic silica sol product, and thereby the plastic substrate are bonded with the microparticles, and the microparticles are bonded with one another.

The method for producing a microparticle-laminated thin film-attached substrate of the present invention is a method for producing a microparticle-laminated thin film-attached substrate having a microparticle-laminated thin film with voids formed on a plastic substrate, and is characterized by including (A) a step of having a plastic substrate having a coefficient of thermal expansion of 50 to 350 (ppm/K), brought into contact with or coated thereon with any of an electrolyte polymer solution and a microparticle dispersion liquid; (B) a step of having the plastic substrate obtained after the contact or coating with the electrolyte polymer solution, brought into contact with or coated thereon with a dispersion liquid of microparticles having a charge opposite to that of the electrolyte polymer of the electrolyte polymer solution, or a step of having the plastic substrate obtained after the contact or coating with the microparticle dispersion liquid, brought into contact with or coated thereon with a solution of an electrolyte polymer having a charge opposite to that of the microparticles of the microparticle dispersion liquid; and (C) a step of having the plastic substrate obtained after the contact or coating with the electrolyte polymer solution or the microparticles, brought into contact with or coated thereon with an alcoholic silica sol product.

The microparticle-laminated thin film-attached substrate of the present invention and a method for producing the same will be explained below in a combined manner.

Figure 5:
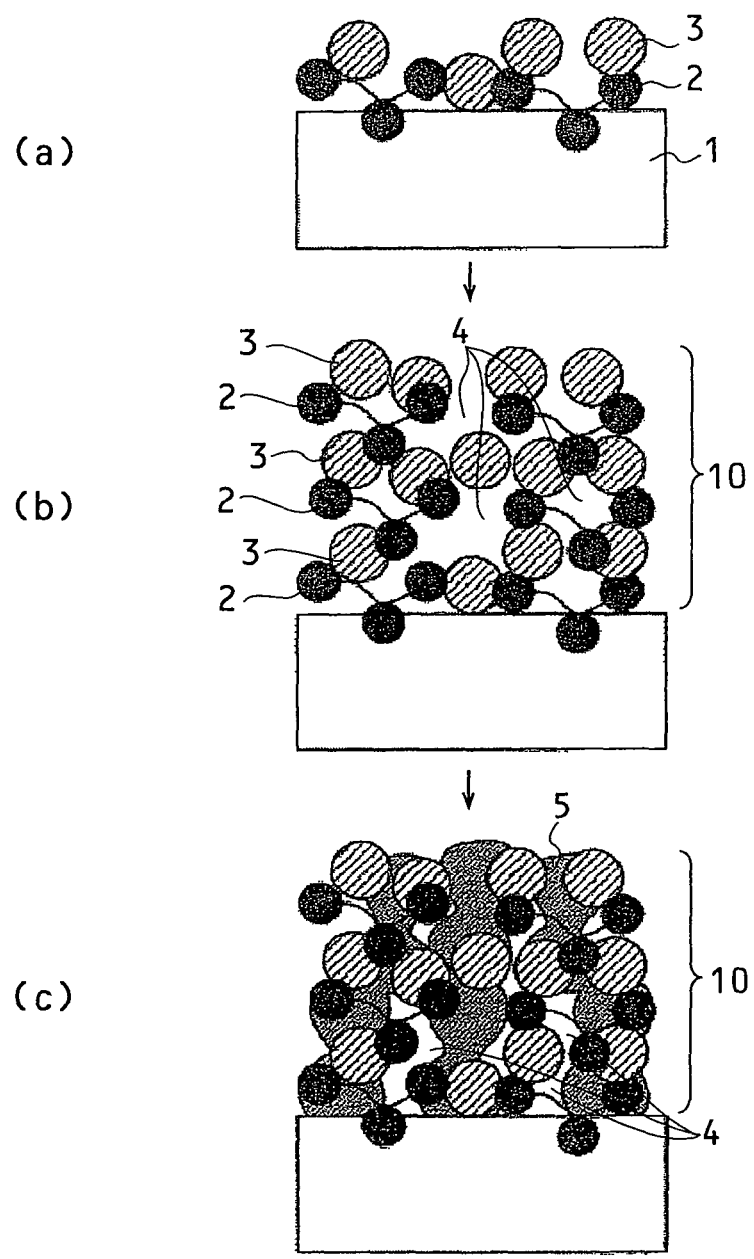
FIG. 5 is a conceptual diagram showing a state of a connection between microparticles concomitant with an application of a silica sol.

The microparticle-laminated thin film-attached substrate of the present invention includes, as shown in FIG. 5, a microparticle-laminated thin film 10 having voids 4, on a plastic substrate 1. The microparticle-laminated thin film 10 is constituted such that an electrolyte polymer 2 and microparticles 3 are alternately adsorbed, and the plastic substrate 1 and the microparticles 3 are bonded, as well as the microparticles 3 are bonded with one another, by means of an alcoholic silica sol product 5.

Various components of the microparticle-laminated thin film of the present invention will be described below.

(Microparticles)

In regard to the microparticles used in the formation of a microparticle-laminated thin film, the average primary particle size in a state in which the microparticles are dispersed in a solution, is preferably 2 to 100 nm in order to obtain transparency of the microparticle-laminated thin film, and is more preferably 2 to 40 nm, and most preferably 2 to 20 nm, from the viewpoint of securing optical functions of the microparticle-laminated thin film. Microparticles having an average primary particle size of less than 2 nm are difficult to form the film, and when the average primary particle size is larger than 100 nm, the microparticles are prone to scatter visible light, so that the transparency of the microparticle-laminated thin film is likely to be impaired.

Furthermore, in the case of forming a microparticle-laminated thin film by an alternate lamination method, as described previously, the amount of thickness change of the microparticle-laminated thin film per one round of alternate lamination is usually about the same as the average primary particle size of the microparticles. Therefore, if the average primary particle size is too large, the degree of accuracy of thickness control is lowered, and it is difficult to obtain a film thickness with high accuracy for the manifestation of optical functions. If the average primary particle size is not to impair film thickness controllability, the microparticles may be primary particles, or may be secondary particles of a type in which primary particles are aggregated.

Here, the film thickness $d_1$ required for the manifestation of optical functions of the microparticle-laminated film is determined by the expression (1) described above. Furthermore, the average primary particle size of microparticles, or measurement of the average primary particle size can be measured by a BET method or an electron microscopic method as described above, but the value of the average primary particle size defined in the present invention is a value obtained according to a BET method. However, for the hollow-shaped microparticles and porous microparticles that will be described later, the value of the average primary particle size is a value obtained according to a (transmission) electron microscopic method.

The microparticles that can be used in the present invention may be inorganic microparticles, and specific examples of the inorganic microparticles are the same as those inorganic microparticles exemplified in the explanation given above for the low refractive index film of the present invention.

Preferably, an oxide containing at least one element selected from the group consisting of silicon, aluminum, zirconium, titanium, niobium, zinc, tin, cerium and magnesium is suitably selected from the viewpoint of transparency.

The microparticles may be amorphous, and there are no particular limitations on the crystal type that can be adopted. For example, $TiO_2$ may be of the rutile type or the anatase type. Examples of the commercially available products of such inorganic microparticles that can be used include an aqueous dispersion liquid of titania microparticles manufactured by Taki Chemical Co., Ltd. (trade name: TYNOC M-6), an aqueous dispersion liquid of zinc oxide microparticles manufactured by Sumitomo Osaka Cement Co., Ltd. (trade name: ZnO-350), an aqueous dispersion liquid of ceria microparticles manufactured by Taki Chemical Co., Ltd. (trade name: NEEDLAL P10), an aqueous dispersion liquid of tin oxide microparticles manufactured by Taki Chemical Co., Ltd. (trade name: CERAMACE S-8), an aqueous dispersion liquid of niobium oxide microparticles manufactured by Taki Chemical Co., Ltd. (trade name: BAIRAL NB-X10), an aqueous dispersion liquid of alumina microparticles manufactured by Nissan Chemical Industries, Ltd. (trade name: ALUMINA SOL-5), and an aqueous dispersion liquid of silica microparticles manufactured by Nissan Chemical Industries, Ltd. (trade name: SNOWTEX 20).

Among the inorganic microparticles described above, silica ($SiO_2$) is preferred from the viewpoint of obtaining a thin film having a low refractive index needed in anti-reflection films, and water-dispersed colloidal silica ($SiO_2$) having the average primary particle size controlled, such as to 2 nm to 23 nm, is most preferred. Examples of commercially available products of such inorganic microparticles include SNOWTEX (trade name, manufactured by Nissan Chemical Industries, Ltd.).

Furthermore, in regard to the shape of the microparticles, it is preferable that the microparticles use one or more selected from among a shape in which primary particles are connected in a beaded form, a porous shape and a hollow structure. These microparticles are the same as those explained for the low refractive index film of the present invention described above, and concerning the particle size, production method, specific examples and the like, the same applies to the present invention.

(Microparticle Dispersion Liquid)

The microparticle dispersion liquid used in the present invention is a product in which the microparticles described above are dispersed in a medium (liquid) which is water, an organic solvent, or a mixed solvent such as water and a water-soluble organic solvent. The details on the microparticle dispersion liquid are the same as the explanations given in section "(F) Microparticle dispersion liquid" for the low refractive index film of the present invention described above.

(Electrolyte Polymer and Electrolyte Polymer Solution)

The electrolyte polymer used in the present invention is the same as the electrolyte polymer mentioned in section "(H) Electrolyte polymer solution" described previously for the low refractive index film of the present invention, and preferred examples are also the same. Furthermore, the electrolyte polymer solution used in the present invention is, as described previously in section "(H) Electrolyte polymer solution," a product in which an electrolyte polymer having a charge of the opposite sign or the same sign with respect to the surface charge of the microparticles, is dissolved in water, an organic solvent, or a mixed solvent of a water-soluble organic solvent and water.

(Alcoholic Silica Sol)

Examples of the alcoholic silica sol that can be used include tetra-, tri- or bifunctional alkoxysilanes, and condensates, hydrolysates and silicon varnishes of these alkoxysilanes. Specific examples include, as tetrafunctional alkoxysilanes, tetramethoxysilane, tetraethoxysilane, and tetrapropoxysilane; as trifunctional alkoxysilanes, methyltrimethoxysilane, methyltriethoxysilane, phenyltrimethoxysilane, phenyltriethoxysilane, vinyltrimethoxysilane, vinyltriethoxysilane, methacryloxypropyltrimethoxysilane, glycidopropoxytrimethoxysilane, glycyropropylmethyldiethoxysilane, aminopropyltriethoxysilane, aminoethylaminopropyltrimethoxysilane, and mercaptopropyltrimethoxysilane; as bifunctional alkoxysilanes, dimethyldimethoxysilane, dimethyldiethoxysilane, diphenyldimethoxysilane, and diphenyldiethoxysilane.

Examples of the condensates include condensates of tetrafunctional alkoxysilanes such as ETHYL SILICATE 40 (trade name), ETHYL SILICATE 48 (trade name) and METHYL SILICATE 51 (trade name) manufactured by Colcoat Co., Ltd., but the examples are not limited to these. Furthermore, examples of the hydrolysates that can be used include products obtained by hydrolyzing alkoxysilanes using an organic solvent, water and a catalyst.

Among these silica compounds, the alcoholic silica sol that is applied to the present invention is a lower alkyl silicate in which $R^1$ in the following formula (1) is a methyl group or an ethyl group. Particularly, alcoholic silica sols such as tetramethoxysilane, tetraethoxysilane, ETHYL SILICATE 40 (trade name, manufactured by Colcoat Co., Ltd.), ETHYL SILICATE 48 (trade name, manufactured by Colcoat Co., Ltd.), METHYL SILICATE 51 (trade name, manufactured by Colcoat Co., Ltd.), and hydrolysis products thereof, are particularly suitable since these compounds can firmly fix the film and relatively inexpensive. The alcoholic silica sol may also be a mixture of those compounds.

Furthermore, an alcoholic silica sol in which $R^2$ in the formula (1) is any one of a methyl group, an ethyl group and a phenyl group, is preferred. it is because, due to the hydrophobic properties of the groups and the hydrophobic interaction of the plastic substrate, penetrability and wettability are enhanced and adhesiveness is easily obtained.

[Formula 3]

$$(OR^1)_n Si(R^2)_{4-n} (n=1 \text{ to } 4) \quad (1)$$

(Alcoholic Silica Sol Product)

The alcoholic silica sol product preferably includes an alcoholic silica sol prepared by hydrolyzing at least one or more kinds of the lower alkyl silicate represented by the formula (I), in any one of methanol and ethanol.

More specifically, the alcoholic silica sol product preferably includes (a) an alcoholic silica sol itself; (b) a product in which group —SiOMe of an alcoholic silica sol has been converted to group —SiOH; (c) a polymer of silica sol; and (d) a silica sol in which, after an alcoholic silica sol is brought into contact with a microparticle-laminated thin film, the silanol group (—Si—OH) contained in the molecules of the alcoholic silica sol is subjected to dehydration condensation with the hydroxyl group (—OH) contained in the microparticle-laminated thin film to be converted to a —Si—O— bond.

As examples of the method for producing an alcoholic silica sol product, known methods can be used (see, for example, JP-A No. 6-52796). Specifically, a hydrolysis reaction is carried out using tetramethoxysilane or tetraethoxysilane, water in an amount of about 10 to 20 times the molar number of tetramethoxysilane or tetraethoxysilane, and the catalyst described above, while stirring the mixture at a temperature of room temperature (25° C.) to 50° C. (preferably, room temperature (25° C.) to 30° C.), for one hour or longer (preferably 2 to 5 hours). Thus, an alcoholic silica sol having a solids concentration of 20% by mass or less, and preferably 1 to 10% by mass, in terms of $SiO_2$ concentration, is prepared.

The alcoholic silica sol thus prepared can be diluted with a diluent medium (liquid) to make it easier to apply. Examples of this kind of diluent liquid include alcohols such as methanol, ethanol, n-propanol, 2-propanol, n-butanol and 2-butanol; esters such as ethyl acetate and butyl acetate; ketones such as methyl ethyl ketone; and mixed solvents of these. Furthermore, these diluent liquids may be added to dilute the alcoholic silica sol, so as to adjust the solids concentration to equal to or more than 0.1% by mass and less than 0.5% by mass, in terms of $SiO_2$ concentration.

In order to apply the alcoholic silica sol product described above on a microparticle-laminated thin film, any of a spraying method, a dipping method, a roll coating method, a spin coating method and the like can be used. When the alcoholic silica sol product is applied and then heated to a temperature of 20° C. to 140° C., the diluent medium is evaporated, and at the same time, the silanol groups produced in the alcoholic silica sol are bonded to the microparticles and the substrate, thereby working as a bridging agent. Thus, adhesiveness of the microparticle-laminated thin film to the substrate is obtained.

(Plastic Substrate)

In regard to the material of the plastic substrate used in the present invention, from the viewpoint of dimensional stability in the use environment, and particularly from the viewpoint of the stability of the shape at the use temperature, a material having a coefficient of thermal expansion of 50 to 350 (ppm/K), preferably 60 to 300 (ppm/K), and more preferably 60 to 200 (ppm/K) is used. If the coefficient of thermal expansion is less than 50 (ppm/K), the coefficient of thermal expansion is at a level such as that possessed by glass, and the moldability of the plastic substrate is decreased. If the coefficient of thermal expansion is more than 350 (ppm/K), the degree of deformation by heat is high, and when used in lenses, the plastic substrate may slip out of the casing, or the optical axis is misaligned, so that the distance of forming an image is changed.

Furthermore, the shape may be any shape, such as a film form, a sheet form, a plate form, or a shape having a curvature. As long as a part or the entirety of the substrate can be immersed and allow a solution to penetrate thereinto, such as a cylindrical form, a thread-like form, a fibrous form or a foam, the substrate can be used since a microparticle-laminated thin film can be formed on the surface. Even if the cross-section of the substrate has a concavo-convex shape, a microparticle-laminated thin film can be formed to conform to the shape of the structure of the surface. In addition, even if the substrate surface has a structure of a nanometer scale or a submicron scale, a microparticle-laminated thin film can be formed to conform to the shape of the structure.

Examples of the plastic substrate include stretched or unstretched transparent plastic films formed of polyester, polystyrene, cellulose acetate, polypropylene, polyethylene, polyamide, polyimide, polyether sulfone, polysulfone, polyvinyl acetal, polyether ketone, polyvinyl chloride, polyvinylidene chloride, polymethyl acrylate, polymethyl methacrylate, polycarbonate or polyurethane.

The plastic substrate according to the present invention is preferably such that, from the viewpoint of preventing deterioration of the optical performance due to a heat treatment or the like, the change ratio of the reflection ratio before and after heating in a temperature range of equal to or lower than the thermal melting temperature or thermal decomposition temperature of the plastic substrate, is 2% or less, more preferably 1% or less, and even more preferably 0.5% or less.

(Method for Pretreatment of Plastic Substrate)

The plastic substrate may be used directly, or the surface charge of the substrate is converted negatively or positively by introducing a polar functional group to the surface through a corona discharge treatment, a glow discharge treatment, a plasma treatment, ultraviolet irradiation, an ozone treatment, a chemical etching treatment using an alkali or an acid, a silane coupling treatment or the like. As another example of the method of efficiently introducing a charge to the substrate surface, the substrate surface may be alternatively brought into contact with aqueous solutions of PDDA (polydiallyldimethylammonium chloride), which is a strong electrolyte polymer, or PEI (polyethyleneimine), and PSS (polystyrene sulfonic acid), to form an alternate lamination film (see Advanced Material, 13, 51-54 (2001)).

When the microparticle-laminated film is used as an optical member requiring transparency, it is preferable that the substrate be transparent. Examples of substrates which themselves have transparency include substrates made of polyesters such as polyethylene terephthalate, polybutylene terephthalate, and polyethylene naphthalate; thermoplastic resins such as polyethylene, polypropylene, polystyrene, triacetyl cellulose, diacetyl cellulose, cellulose acetate butyrate, polyether sulfone, polyamide, polyimide, polymethylpentene, polyvinyl chloride, polyvinyl alcohol, polyvinyl acetal, polymethyl methacrylate, polycarbonate, and polyurethane; and silicone resins.

Furthermore, when the microparticle-laminated thin film is used as an optical member in which only the reflection ratio is considered important, the substrate does not require transparency.

In an area of the surface of the substrate where it is not intended to form the microparticle-laminated thin film, the formation of the microparticle-laminated thin film on the substrate can be inhibited by preventing the contact between the microparticle dispersion liquid and the substrate, such as adhering an adhesive film or the like.

If an adhesive layer has been formed on the substrate surface opposite to the anti-reflection film formed on the substrate, the adhesive layer is adhered to a glass substrate at the display surface as an object to be adhered, so that the anti-reflection film faces air.

(Method for Forming Microparticle-Laminated Thin Film)

According to the present invention, an alternate lamination method is used to produce a microparticle-laminated thin film having voids.

The microparticle-laminated thin film 10 according to the present invention can be formed by carrying out the following steps (A) to (C) in this sequence (see FIG. 5).

(A) A layer of an electrolyte polymer 2 or microparticles 3 is formed by a step of having a plastic substrate having a coefficient of thermal expansion of 50 to 350 (ppm/K), brought into contact with or applied with any one of an electrolyte polymer solution or a microparticle dispersion liquid;

(B) a layer of the microparticles 3 or the electrolyte polymer 2 is formed by a step of having the plastic substrate obtained after the contact or coating with the electrolyte polymer solution, brought into contact with or coated thereon with a dispersion liquid of microparticles having a charge opposite to that of the electrolyte polymer of the electrolyte polymer solution, or a step of having the plastic substrate obtained after the contact or coating with the microparticle dispersion liquid, brought into contact with or coated thereon with a solution of an electrolyte polymer having a charge opposite to that of the microparticles of the microparticle dispersion liquid; and (C) the substrate 1 is bonded with the microparticles 3, and the microparticles 3 are bonded to one another, by means of an alcoholic silica sol product 5, by a step of having the plastic substrate obtained after the contact or coating with the electrolyte polymer solution or the microparticles, brought into contact with or coated thereon with an alcoholic silica sol product.

It is preferable to carry out the step (C) after repeating the step (A) and the step (B) alternately two or more times. When the step (A) and the step (B) are alternately repeated two or more times, the thickness of the thin film can be controlled. In this case, the number of alternate repetition is preferably equal to or more than 2 times and equal to or less than 100 times, in view of securing transparency.

Furthermore, it is preferable to carry out (D) a rinsing step after the step (A) and/or step (B), because any excess material that has been physically adsorbed to the adsorption surface, can be removed.

After the step (C), a heating treatment can be carried out. By performing a heating treatment, as described above, the diluent medium is evaporated, and at the same time, the silanol groups produced in the alcoholic silica sol are bonded with the microparticles and the substrate, serving as a bridging agent, so that adhesiveness of the microparticle-laminated thin film to the substrate is obtained.

In this case, the temperature of the heating treatment is preferably set at the glass transition temperature of the plastic substrate, or a temperature equal to or higher than the glass transition temperature, or at 20° C. to 260° C., from the viewpoint of preventing deformation of the plastic substrate. There are no particular limitations on the atmosphere for the heating treatment, and the atmosphere may be any of an oxidizing atmosphere such as in air, an inert atmosphere such as in nitrogen, or a reducing atmosphere containing hydrogen or the like. There are no limitations on the heating method, and heating can be carried out using a heating means or a heating apparatus such as an oven, an inductive heating apparatus or an infrared heater.

According to the alternate lamination method such as described above, a microparticle-laminated thin film having a desired porosity can be obtained based on the values already known as disclosed in the documents listed below. Therefore, the refractive index obtained after applying an alcoholic silica sol on this microparticle-laminated thin film and volatilizing the solvent, can be controlled by the concentration of the alcoholic silica sol.

The adjustment of the porosity can be carried out by adjusting the surface potential of the microparticles, such as in the method of adjusting the pH of the microparticle dispersion liquid used in the production of the microparticle-laminated thin film (when the pH is adjusted to 3 to 9, the porosity is relatively high, and in a pH range other than that, the porosity is controlled to be relatively low).

When a refractive index with which a satisfactory anti-reflection film is obtained is taken into consideration, the porosity is preferably 40% to 80%, more preferably 40% to 70%, and even more preferably 50% to 60%. For the method of controlling the surface potential of the microparticles, the methods described in JP-A No. 2006-301125, JP-A No. 2006-297680 and JP-A No. 2006-301124 can be used. For example, the porosity is first set at 63%, an alcoholic silica sol product having a mass concentration of 0.4% is applied, and then the porosity can be adjusted to the desired porosity, 53%.

(Apparatus for Forming Microparticle-Laminated Thin Film)

As the apparatus for forming a microparticle-laminated thin film, the apparatus called as dipper, which has been explained above with regard to the low refractive index film of the present invention, may be used, and a continuous film forming process may also be used, in which a film is taken out from the film wound in a roll form, and is directly brought into contact with a microparticle dispersion liquid and dried, and then the film is wound into a roll.

The plastic substrate is alternately immersed in an electrolyte polymer solution (polycation or polyanion) and a microparticle dispersion liquid, and thereby a microparticle-laminated thin film is produced on the solid substrate. If the surface charge of the plastic substrate is negative, the substrate is brought into contact with a cationic solution (one of the electrolyte polymer or the microparticle dispersion liquid) in the beginning, and then is brought into contact with an anionic solution (one of the electrolyte polymer or the microparticle dispersion liquid).

The duration of contact is appropriately adjusted based on the polymer, microparticles, or the film thickness intended to be laminated. After the plastic substrate is brought into contact with the cationic or anionic solution, and before the plastic substrate is brought into contact with a solution having the opposite charge, any excess solution may be washed away by rinsing with the solvent only. Since the solution is electrostatically adsorbed, no peeling occurs in this process. This rinsing process may also be carried out in order to prevent any polymer electrolyte or microparticles that are not adsorbed, from entering the solution of the opposite charge. If this process is not carried out, cations and anions that have entered may be mixed in the solution and cause precipitation.

In the case of using an alternate lamination apparatus called dipper as the apparatus, a plastic substrate is mounted on a robot arm that moves horizontally and vertically, the plastic substrate is immersed in a cationic solution or an anionic solution within a programmed time period, subsequently the plastic substrate is immersed in a rinsing liquid, subsequently the plastic substrate is immersed in a microparticle dispersion liquid having a charge opposite to that of the solution, and then the plastic substrate is immersed in a rinsing liquid. This process is defined as one cycle, and the process can be continuously and automatically carried out for the number of steps intended to perform lamination. During the program, two or more kinds of cationic substances or anionic substances may be used in combination, as the electrolyte polymer. For example, the initial two layers may be formed using a combination of polydimethyldiallylammonium chloride and sodium polystyrene sulfonate, and the subsequent two layers may be formed using a combination of polydimethyldiallylammonium chloride and an anionic silica sol.

A film wound in a roll form is taken out from the wind-off part, and a cationic solution tank or an anionic tank, a rinsing tank, a microparticle dispersion liquid, and a rinsing tank are arranged in series on the way. This arrangement is provided in line for the number of steps intended to perform lamination, a drying step and the like are arranged at the end, and thereby a process of continuous film formation on a film-like substrate provided with a roll-up part can be used.

The microparticle-laminated thin film thus obtained may be applied with a fluoropolymer solution or a fluorine-based coupling agent solution, in order to impart anti-fouling properties. The concentration of the solution is preferably 0.1% to 5% by mass. If the concentration is less than 0.1% by mass, sufficient anti-fouling properties may not be obtained. This is because the anti-fouling component penetrates from the surface of the microparticle-laminated thin film into the interior, and it is difficult for the anti-fouling component to remain on the surface. Furthermore, if the concentration is more than 5% by mass, a desired porosity may not be obtained. This is because the volume occupied by the anti-fouling component fills up the voids. Furthermore, since the anti-fouling component fills up the valley parts of the fine shape, the shape changes, and in the case of a substrate having a function of bending light, such as a lens, the characteristics may be deteriorated.

(Determination of Refractive Index and Thickness of Microparticle-Laminated Thin Film)

The refractive index and thickness of the microparticle-laminated thin film can be determined from the spectrum of surface reflection ratio, by an analytic program of an instant photometric spectrophotometer (trade name: F20, manufactured by Filmetrics, Inc.) which combines a reflection ratio spectrometric method and a curve fitting method.

(Determination of Porosity of Microparticle-Laminated Thin Film)

In the microparticle-laminated thin film-attached substrate of the present invention, air is present in the gaps between the microparticles. That is, since pores can be observed by an observation of the surface and the cross-section using a scanning electron microscope, if the apparent refractive index of the silica microparticle-laminated thin film is lower than that of silica, the factor causing a decrease in the refractive index is air that is present in the gaps, and the refractive index $n_c$ of the microparticle-laminated film can be determined by the expression (2) described above.

<Optical Member>

The optical member of the present invention is an optical member having the microparticle-laminated thin film-attached substrate of the present invention as described above, and examples of the optical member include an embodiment in which an anti-reflection function is imparted to the microparticle-laminated thin film; an embodiment in which a half-transparent half-reflection function is imparted to the microparticle-laminated thin film; and an embodiment in which a reflection function is imparted to the microparticle-laminated thin film, that is, embodiments of an anti-reflection film, a half-transparent half-reflective film, and a reflective film, respectively. Other examples include films having a constitution of combining two or more of a visible light-reflective infrared-transparent film, an infrared-reflective visible light-transparent film, a blue reflective film, a green reflective film, a red reflective film, an emission line cutoff filter film, and a color correction film.

Since the microparticle-laminated film according to the present invention is obtained by an alternate lamination method, the microparticle-laminated film has high thickness uniformity, and can be therefore suitably used in optical members. Accordingly, the optical member of the present invention can be applied to, for example, an anti-reflection film-attached substrate, a half-transparent half-reflective film-attached substrate (translucent mirror), and a reflective film-attached substrate (mirror).

In addition to that, adequate conditions for various films and the like in connection with the optical member of the present invention are the same as those explained in section "(K) Optical member" described previously for the low refractive index film of the present invention, and further explanation will not be given here.

EXAMPLES

Hereinafter, the present invention will be described by way of Examples, but the present invention is not intended by any means to be limited to these Examples.

First, Examples related to the first embodiment of the low refractive index film of the present invention (Examples 1 to 11) will be described.

Example 1

1. Formation of Microparticle-Laminated Film

A silica aqueous dispersion liquid (trade name: SNOWTEX (ST) OUP, manufactured by Nissan Chemical Industries, Ltd.; silica sol) in which beaded silica microparticles having an average primary particle size of 8 nm as measured by a BET method were dispersed, was used as a microparticle dispersion liquid having the concentration adjusted to 1% by mass, without adjusting the pH. An aqueous solution of polydiallyldimethylammonium chloride (PDDA, manufactured by Sigma-Aldrich Company Ltd.) having the concentration adjusted to 0.1% by mass and the pH adjusted to 10, was used as an aqueous solution of electrolyte polymer.

As solid substrates, a silicon wafer (6PW-A1, manufactured by Sumco Corp.; 6 inches φ, 625 μm in thickness), a glass substrate (trade name: S1111, manufactured by Matsunami Glass Industries, Ltd.; 25 mm×75 mm×0.7 mm in thickness, refractive index at a wavelength of 550 nm is 1.54), and a polystyrene plate irradiated with ultraviolet radiation emitted from a low pressure mercury lamp (10 mW) for 2 minutes (manufactured by Hikari Co., Ltd.; transparent, 1 mm in thickness) were respectively subjected to (a) a process of adding dropwise an aqueous solution of an electrolyte polymer, and after a lapse of one minute, showering the substrate with ultrapure water for rinsing purpose for one minute, and (b) a process of adding dropwise a microparticle dispersion liquid, and after a lapse of one minute, showering the substrate with ultrapure water for rinsing purpose for one minute, in this sequence. Performing the process (a) one time and the process (b) one time in order was defined as one cycle, and the number of this cycle was designated as the number of microparticle alternate lamination. The microparticle alternate lamination was performed 4 times, and thus a microparticle-laminated film was formed on the surface of each of the solid substrates.

2. Silicon Compound Treatment 50 g of phenyltrimethoxysilane (alkoxysilane (I), KBM103, manufactured by Shin-Etsu Chemical Co., Ltd.) was placed in a 300-ml three-necked round bottom flask, and 75 g of methanol (hereinafter, indicated as MeOH) was added thereto. The mixture was stirred at 25° C. to make the liquid uniform, subsequently 17.7 g of a 1.3 mass % aqueous solution of $H_3PO_4$ was added to the mixture, and the resulting mixture was stirred for 24 hours at 25° C. Thus, a solution having a silane concentration of 35% (stock solution) was obtained. 1-Butanol was added to this solution, and thus a silicon compound solution having the silane concentration adjusted to 1 mass % was obtained. Each of the solid substrates having a microparticle-laminated thin film formed thereon as described above, was placed on a spin coater, and 20 ml of the silicon compound solution mentioned above was spread over the entire substrate. Subsequently, the solution was spread and dried at a speed of rotation of 1000 $min^{-1}$. Thereafter, the solution was dried at 25° C. for 24 hours, and thus a low refractive index film was produced.

3. Evaluation of Refractive Index

The refractive index and thickness of the low refractive index film on the silicon wafer were evaluated with an automatic ellipsometer (trade name: MARY-102, manufactured by Five Lab Co., Ltd.; laser light wavelength 632.8 nm), and as a result, the refractive index of the low refractive index film was 1.30, while the thickness was 110 nm.

4. Evaluation of Transparency

The haze value of the glass substrate thus obtained having the low refractive index film formed thereon was measured with a turbidimeter (manufactured by Nippon Denshoku Industries Co., Ltd.) according to JIS K 7361-1-1997, and as a result, the haze value was 0.4%. The haze value of the glass substrate only was measured in the same manner, and as a result, the haze value was 0.1%. The turbidity of the low refractive index film was determined by subtracting the haze value of the solid substrate only, from the haze value of the solid substrate having the low refractive index film formed thereon. As a result, the turbidity of the low refractive index film was 0.3%, and it was found that the low refractive index film had very high transparency.

5. Evaluation of Anti-Reflection Performance

A transmission spectrum of the glass substrate having the low refractive index film formed thereon was measured with a visible-ultraviolet spectrophotometer (trade name: V-570, manufactured by JASCO Corp.), and the maximum transmittance in the wavelength range of 400 to 800 nm was 95%.

Furthermore, a black adhesive tape (trade name: VT-196, manufactured by Nichiban Co., Ltd.) was adhered on the surface of the glass substrate opposite to the surface where the low refractive index film was formed such that no air bubbles remained under the adhesive tape, and a spectrum of the surface reflection ratio of the one surface where the low refractive index film was formed, was measured with a visible-ultraviolet spectrophotometer (trade name: V-570, manufactured by JASCO Corp.). The minimum surface reflection ratio of the glass substrate having the low refractive index film formed thereon in the wavelength range of 400 to 800 nm was 0.3%.

Since the transmittance of the glass substrate was 91%, and the surface reflection ratio was 4.5%, it was found that an anti-reflection film having excellent properties was formed, and the transmittance was also enhanced.

6. Evaluation of Adhesiveness

An adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm was used as an adhesive tape, and the adhesive tape was adhered to the low refractive index film using a roll laminator (LMP-350EX, manufactured by Lami Corporation, Inc.) under the conditions of a roll load of 0.3 MPa, a transfer speed of 0.3 m/min, and a temperature of 20° C. One minute after the adhesion of the tape, the substrate was irradiated with 200 mJ/cm$^2$ of ultraviolet radiation using an ultraviolet exposure apparatus (HMW-6N-4, manufactured by Orc Manufacturing Co., Ltd.). One edge of the tape was lifted perpendicularly to the substrate surface and was instantaneously peeled by pulling. The low refractive index film was visually observed, and as a result, the substrate surface was not seen, while the low refractive index film did not scatter visible light. Therefore, it was found that the low refractive index film was closely adhered to the substrate. The low refractive index films on the silicon substrate, the glass substrate and the polystyrene substrate were all closely adhered to the substrates.

Example 2

First, a microparticle-laminated film was produced according to Example 1.

Next, a low refractive index film was produced according to Example 1, except that 50 g of diphenyldimethoxysilane (alkoxysilane (I), KBM202SS, manufactured by Shin-Etsu Chemical Co., Ltd.) was placed in a 300-ml three-necked round bottom flask, 81 g of MeOH was added thereto, the mixture was stirred at 25° C. to make the liquid uniform, subsequently 12.1 g of a 2.7 mass % aqueous solution of $H_3PO_4$ was added to the mixture, the resulting mixture was stirred for 4 hours at 25° C. to obtain a solution having a silane concentration of 35% (stock solution), and that the silane concentration of this solution was adjusted to 5% by mass to obtain a silicon compound solution.

The refractive index of the low refractive index film evaluated in the same manner as in Example 1 was 1.3, and the thickness was 110 nm. The turbidity of the low refractive index film evaluated in the same manner as in Example 1 was 0.3%. The transmission spectrum of the glass substrate having the low refractive index film formed thereon was measured in the same manner as in Example 1, and the maximum transmittance in the wavelength range of 400 to 800 nm was 95%. The surface reflection spectrum of the glass substrate having the low refractive index film formed thereon was measured in the same manner as in Example 1, and the minimum surface reflection ratio in the wavelength range of 400 to 800 nm was 0.3%.

The adhesiveness was evaluated in the same manner as in Example 1, and in regard to the use of an adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm, the low refractive index films on the silicon substrate, the glass substrate and the polystyrene were all closely adhered to the substrates.

Example 3

First, a microparticle-laminated film was produced according to Example 1.

Next, a low refractive index film was produced according to Example 1, except that 50 g of hexyltriethoxysilane (alkoxysilane (I), KBE3063, manufactured by Shin-Etsu Chemical Co., Ltd.) was placed in a 300-ml three-necked round bottom flask, 42 g of MeOH was added thereto, the mixture was stirred at 25° C. to make the liquid uniform, subsequently 7.4 g of a 0.05 mass % aqueous solution of $H_3PO_4$ was added to the mixture, the resulting mixture was stirred for 72 hours at 25° C. to obtain a solution having a silane concentration of 50% (stock solution), and that the silane concentration of this solution was adjusted to 1% by mass to obtain a silicon compound solution.

The refractive index of the low refractive index film evaluated in the same manner as in Example 1 was 1.3, and the thickness was 110 nm. The turbidity of the low refractive index film evaluated in the same manner as in Example 1 was 0.3%. The transmission spectrum of the glass substrate having the low refractive index film formed thereon was measured in the same manner as in Example 1, and the maximum transmittance in the wavelength range of 400 to 800 nm was 95%. The surface reflection spectrum of the glass substrate having the low refractive index film formed thereon was measured in the same manner as in Example 1, and the minimum surface reflection ratio in the wavelength range of 400 to 800 nm was 0.3%.

The adhesiveness was evaluated in the same manner as in Example 1, and in regard to the use of an adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm, the low refractive index films on the silicon substrate, the glass substrate and the polystyrene were all closely adhered to the substrates.

Example 4

A microparticle-laminated film was produced on a substrate according to Example 1, except that an aqueous solution of an electrolyte polymer which contained polyethyleneimine (PEI) at an adjusted concentration of 0.1% by mass, without adjusting the pH, was used, and the number of microparticle alternate lamination was set at 3 times.

Next, a low refractive index film was produced according to Example 1, except that 50 g of octyltriethoxysilane (alkoxysilane (I), L04407, manufactured by ALFA Aesar GmbH & Co KG.) was placed in a 300-ml three-necked round bottom flask, 42 g of MeOH was added thereto, the mixture was stirred at 25° C. to make the liquid uniform, subsequently 7.4 g of a 1.7 mass % aqueous solution of HCl was added to the mixture, the resulting mixture was stirred for 6 hours at 25° C. to obtain a solution having a silane concentration of 50% (stock solution), that the silane concentration of this solution was adjusted to 1% by mass to obtain a silicon compound solution, and that the film was dried for 30 minutes at 80° C. instead of drying for 24 hours at 25° C.

The refractive index of the low refractive index film evaluated in the same manner as in Example 1 was 1.3, and the thickness was 110 nm. The turbidity of the low refractive index film evaluated in the same manner as in Example 1 was 0.3%. The transmission spectrum of the glass substrate having the low refractive index film formed thereon was measured in the same manner as in Example 1, and the maximum transmittance in the wavelength range of 400 to 800 nm was 95%. The surface reflection spectrum of the glass substrate having the low refractive index film formed thereon was measured in the same manner as in Example 1, and the minimum surface reflection ratio in the wavelength range of 400 to 800 nm was 0.3%.

The adhesiveness was evaluated in the same manner as in Example 1, and in regard to the use of an adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm, the low refractive index films on the silicon substrate, the glass substrate and the polystyrene were all closely adhered to the substrates.

Example 5

First, a microparticle-laminated film was produced according to Example 4.

Next, a low refractive index film was produced according to Example 1, except that 50 g of decyltrimethoxysilane (alkoxysilane (I), KBM3103C, manufactured by Shin-Etsu Chemical Co., Ltd.) was placed in a 300-ml three-necked round bottom flask, 46 g of MeOH was added thereto, the mixture was stirred at 25° C. to make the liquid uniform, subsequently 3.6 g of a 10.0 mass % aqueous solution of $H_3PO_4$ was added to the mixture, the resulting mixture was stirred for 24 hours at 25° C. to obtain a solution having a silane concentration of 50% (stock solution), and that the silane concentration of this solution was adjusted to 1% by mass to obtain a silicon compound solution.

The refractive index of the low refractive index film evaluated in the same manner as in Example 1 was 1.3, and the thickness was 110 nm. The turbidity of the low refractive index film evaluated in the same manner as in Example 1 was 0.3%. The transmission spectrum of the glass substrate having the low refractive index film formed thereon was measured in the same manner as in Example 1, and the maximum transmittance in the wavelength range of 400 to 800 fun was 95%. The surface reflection spectrum of the glass substrate having the low refractive index film formed thereon was measured in the same manner as in Example 1, and the minimum surface reflection ratio in the wavelength range of 400 to 800 nm was 0.3%.

The adhesiveness was evaluated in the same manner as in Example 1, and in regard to the use of an adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm, the low refractive index films on the silicon substrate, the glass substrate and the polystyrene were all closely adhered to the substrates.

Example 6

First, a microparticle-laminated film was produced according to Example 4.

Next, a low refractive index film was produced according to Example 1, except that 50 g of dodecyltriethoxysilane (alkoxysilane (I), S08550, manufactured by Fluorochem, Ltd.) was placed in a 300-ml three-necked round bottom flask, 40 g of MeOH was added thereto, the mixture was stirred at 25° C. to make the liquid uniform, subsequently 9.7 g of a 4.3 mass % aqueous solution of $H_3PO_4$ was added to the mixture, the resulting mixture was stirred for 4 hours at 25° C. to obtain a solution having a silane concentration of 50% (stock solution), and that the silane concentration of this solution was adjusted to 5% by mass to obtain a silicon compound solution.

The refractive index of the low refractive index film evaluated in the same manner as in Example 1 was 1.3, and the thickness was 110 nm. The turbidity of the low refractive index film evaluated in the same manner as in Example 1 was 0.3%. The transmission spectrum of the glass substrate having the low refractive index film formed thereon was measured in the same manner as in Example 1, and the maximum transmittance in the wavelength range of 400 to 800 nm was 95%. The surface reflection spectrum of the glass substrate having the low refractive index film formed thereon was measured in the same manner as in Example 1, and the minimum surface reflection ratio in the wavelength range of 400 to 800 nm was 0.3%.

The adhesiveness was evaluated in the same manner as in Example 1, and in regard to the use of an adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm, the low refractive index films on the silicon substrate, the glass substrate and the polystyrene were all closely adhered to the substrates.

Example 7

First, a microparticle-laminated film was produced according to Example 4.

Next, a low refractive index film was produced according to Example 1, except that 50 g of 3-methacryloxypropyltriethoxysilane (alkoxysilane (I), KBE503, manufactured by Shin-Etsu Chemical Co., Ltd.) was placed in a 300-ml three-necked round bottom flask, 40 g of MeOH was added thereto, the mixture was stirred at 25° C. to make the liquid uniform, subsequently 9.7 g of a 4.3 mass % aqueous solution of $H_3PO_4$ was added to the mixture, the resulting mixture was stirred for 4 hours at 25° C. to obtain a solution having a silane concentration of 50% (stock solution), and that the silane concentration of this solution was adjusted to 5% by mass to obtain a silicon compound solution.

The refractive index of the low refractive index film evaluated in the same manner as in Example 1 was 1.3, and the thickness was 110 nm. The turbidity of the low refractive index film evaluated in the same manner as in Example 1 was 0.3%. The transmission spectrum of the glass substrate having the low refractive index film formed thereon was measured in the same manner as in Example 1, and the maximum transmittance in the wavelength range of 400 to 800 nm was 95%. The surface reflection spectrum of the glass substrate having the low refractive index film formed thereon was measured in the same manner as in Example 1, and the minimum surface reflection ratio in the wavelength range of 400 to 800 nm was 0.3%.

The adhesiveness was evaluated in the same manner as in Example 1, and in regard to the use of an adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm, the low refractive index films on the silicon substrate, the glass substrate and the polystyrene were all closely adhered to the substrates.

Example 8

First, a microparticle-laminated film was produced according to Example 4.

Next, a low refractive index film was produced according to Example 1, except that 50 g of N-phenyl-3-aminopropyl-trimethoxysilane (alkoxysilane (I), KBM573, manufactured by Shin-Etsu Chemical Co., Ltd.) was placed in a 300-ml three-necked round bottom flask, 40 g of MeOH was added thereto, the mixture was stirred at 25° C. to make the liquid uniform, subsequently 9.7 g of a 4.3 mass % aqueous solution of $H_3PO_4$ was added to the mixture, the resulting mixture was stirred for 4 hours at 25° C. to obtain a solution having a silane concentration of 50% (stock solution), and that the silane concentration of this solution was adjusted to 5% by mass to obtain a silicon compound solution.

The refractive index of the low refractive index film evaluated in the same manner as in Example 1 was 1.3, and the thickness was 110 nm. The turbidity of the low refractive index film evaluated in the same manner as in Example 1 was 0.3%. The transmission spectrum of the glass substrate having the low refractive index film formed thereon was measured in the same manner as in Example 1, and the maximum transmittance in the wavelength range of 400 to 800 nm was 95%. The surface reflection spectrum of the glass substrate having the low refractive index film formed thereon was measured in the same manner as in Example 1, and the minimum surface reflection ratio in the wavelength range of 400 to 800 nm was 0.3%.

The adhesiveness was evaluated in the same manner as in Example 1, and in regard to the use of an adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm, the low refractive index films on the silicon substrate, the glass substrate and the polystyrene were all closely adhered to the substrates.

Example 9

First, a microparticle-laminated film was produced according to Example 4.

Next, a low refractive index film was produced according to Example 1, except that 25 g of decyltrimethoxysilane (alkoxysilane (I), KBM3103C, manufactured by Shin-Etsu Chemical Co., Ltd.) and 25 g of tetraethoxysilane (alkoxysilane (II), manufactured by Wako Pure Chemical Industries, Ltd.; tetraethyl orthosilicate) were placed in a 300-ml three-necked round bottom flask, 46 g of MeOH was added thereto, the mixture was stirred at 25° C. to make the liquid uniform, subsequently 3.6 g of a 10.0 mass % aqueous solution of $H_3PO_4$ was added to the mixture, the resulting mixture was stirred for 24 hours at 25° C. to obtain a solution having a silane concentration of 50% (stock solution), and that the silane concentration of this solution was adjusted to 1% by mass to obtain a silicon compound solution.

The refractive index of the low refractive index film evaluated in the same manner as in Example 1 was 1.3, and the thickness was 110 nm. The turbidity of the low refractive index film evaluated in the same manner as in Example 1 was 0.3%. The transmission spectrum of the glass substrate having the low refractive index film formed thereon was measured in the same manner as in Example 1, and the maximum transmittance in the wavelength range of 400 to 800 nm was 95%. The surface reflection spectrum of the glass substrate having the low refractive index film formed thereon was measured in the same manner as in Example 1, and the minimum surface reflection ratio in the wavelength range of 400 to 800 nm was 0.3%.

The adhesiveness was evaluated in the same manner as in Example 1, and in regard to the use of an adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm, the low refractive index films on the silicon substrate, the glass substrate and the polystyrene were all closely adhered to the substrates.

Example 10

First, a microparticle-laminated film was produced according to Example 4.

Next, a low refractive index film was produced according to Example 1, except that 50 g of octyltriethoxysilane (alkoxysilane (I), L04407, manufactured by ALFA Aesar GmbH & Co KG.) was placed in a 300-ml three-necked round bottom flask, 75 g of MeOH was added thereto, the mixture was stirred at 25° C. to make the liquid uniform, subsequently 17.7 g of a 1.3 mass % aqueous solution of $H_3PO_4$ was added to the mixture, the resulting mixture was stirred for 24 hours at 25° C., subsequently 50 g of an ethoxysilane oligomer (alkoxysilane (II), ETHYL SILICATE 48, manufactured by Colcoat Co., Ltd.) was added thereto, the mixture was stirred for 5 minutes at 25° C. to obtain a solution having a silane concentration of 70% (stock solution), and that the film was dried for 30 minutes at 80° C. instead of drying for 24 hours at 25° C.

The refractive index of the low refractive index film evaluated in the same manner as in Example 1 was 1.3, and the thickness was 110 nm. The turbidity of the low refractive index film evaluated in the same manner as in Example 1 was 0.3%. The transmission spectrum of the glass substrate having the low refractive index film formed thereon was measured in the same manner as in Example 1, and the maximum transmittance in the wavelength range of 400 to 800 nm was 95%. The surface reflection spectrum of the glass substrate having the low refractive index film formed thereon was measured in the same manner as in Example 1, and the minimum surface reflection ratio in the wavelength range of 400 to 800 nm was 0.3%.

The adhesiveness was evaluated in the same manner as in Example 1, and in regard to the use of an adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm, the low refractive index films on the silicon substrate, the glass substrate and the polystyrene were all closely adhered to the substrates.

Example 11

A microparticle-laminated film was produced according to Example 1, except that use was made of a microlens array sheet having microlenses (photocurable resin, width 9 μm, height 1.5 μm) as a microstructure on a substrate. Next, a low refractive index film was produced according to Example 4. In addition, a protective tape was adhered to a part of the microlens array sheet to provide an area where the microparticle-laminated film and the low refractive index film were not formed.

The microlens array sheet having a microparticle-laminated film formed thereon was observed with a scanning electron microscope (trade name: XL30ESEM, manufactured by Philips Electronics, N.V.) at an angle of 75° from the normal direction of the sheet surface, and thereby the shape of the microlens having the microparticle-laminated film formed thereon was observed. Furthermore, the shape of the microlens at the area where the microparticle-laminated film was not formed was also observed in the same manner. The outline of the observed image of the microlens having the microparticle-laminated film formed thereon is indicated with a dashed line in FIG. 3. Furthermore, the outline of the observed image of the microlens on which the microparticle-laminated film was not formed is indicated with a solid line in FIG. 3. Assuming that the thickness of the microparticle-laminated film was 0.1 the outline of the microlens having the microparticle-laminated film formed thereon was recorded above the outline of the microlens on which the microparticle-laminated film was not formed, with a 0.1 μm shift. As a result, it could be confirmed that the thickness of the microparticle-laminated film on the microlens in the normal direction of the microlens was uniform, and it could be confirmed that the microparticle-laminated film was satisfactorily conforming to the shape of the microlens. The adhesiveness was evaluated in the same manner as in Example 1, and in regard to the use of an adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm, the low refractive index film on the microlens array sheet was all closely adhered to the substrate.

Comparative Example 1

An isopropanol dispersion liquid of silica microparticles (trade name: IPA-ST-UP, manufactured by Nissan Chemical Industries, Ltd.; organosilica sol) in which beaded silica microparticles having an average primary particle size of 8 nm as measured by a BET method were dispersed, was adjusted to a concentration of 1.5% by mass to obtain a microparticle dispersion liquid.

50 g of octyltriethoxysilane (alkoxysilane (I), L04407, manufactured by ALFA Aesar GmbH & Co KG) was placed in a 300-ml three-necked round bottom flask, and 42 g of MeOH was added thereto. The mixture was stirred at 25° C. to make the liquid uniform, subsequently 7.4 g of a 1.7 mass % aqueous solution of HCl was added to the mixture, and the resulting mixture was stirred for 6 hours at 25° C. Thus, a solution having a silane concentration of 50% (stock solution) was obtained. 1-Butanol was added to this solution, and thus a silicon compound solution having the silane concentration adjusted to 1% by mass was obtained. 50 Parts by mass of the silicon compound solution and 50 parts by mass of the microparticle dispersion liquid were mixed, and thus a microparticle-dispersed silicon compound solution was obtained.

As substrates, a silicon wafer (6PW-A1, manufactured by Sumco Corp.; 6 inches φ, 625 μm in thickness), a glass substrate (trade name: S1111, manufactured by Matsunami Glass Industries, Ltd.; 25 mm×75 mm×0.7 mm in thickness, refractive index at a wavelength of 550 nm is 1.54), a polystyrene plate irradiated with ultraviolet radiation emitted from a low pressure mercury lamp (10 mW) for 2 minutes (manufactured by Hikari Co., Ltd.; transparent, 1 mm in thickness), and a microlens array sheet having microlenses as a microstructure (photocurable resin, width 9 μm, height 1.5 μm) were respectively treated such that the microparticle-dispersed silicon compound solution was added dropwise and was spread and dried at a speed of rotation of 1000 $min^{-1}$. Thus, low refractive index films were formed on the substrates. Furthermore, a protective tape was adhered to a part of the microlens array sheet to provide an area where the low refractive index film was not formed.

The refractive index of the low refractive index film evaluated in the same manner as in Example 1 was 1.25, and the thickness was 110 nm. The turbidity of the microparticle-laminated film evaluated in the same manner as in Example 1 was 0.3%. The transmission spectrum of the glass substrate having the low refractive index film formed thereon was measured in the same manner as in Example 1, and the maximum transmittance in the wavelength range of 400 to 800 nm was 95%. The surface reflection spectrum of the glass substrate having the low refractive index film formed thereon was measured in the same manner as in Example 1, and the minimum surface reflection ratio in the wavelength range of 400 to 800 nm was 0.1%.

The adhesiveness was evaluated in the same manner as in Example 1, and in regard to the use of an adhesive tape (UHP-1025M3, manufactured by Denki Formula Kogyo Kabushiki Kaisha) having an adhesive force of 1500 cN/25 mm (after ultraviolet irradiation, 25 cN/25 mm) and a width of 25 mm, the microparticle-laminated films on the silicon substrate, the glass substrate, the polystyrene and the microlens array sheet were all closely adhered to the substrates.

Figure 4:
FIG. 4 is a diagram showing an outline of an image obtained by observing, with SEM, a microlens having a microparticle-laminated film of Comparative Examples 1 and 3 formed thereon (dashed line in the drawing) and an outline of an image obtained by observing, with SEM, a microlens having a microparticle-laminated film formed thereon (solid line in the drawing), with the outlines being laid in parallel through a vertically shift by 0.1 μm.

The microlens having the low refractive index film formed thereon and the microlens on which the low refractive index film was not formed, were observed with a scanning electron microscope in the same manner as in Example 9, and a comparison of the outlines of the observed images was made. As a result, the thickness of the low refractive index film in the normal direction of the microlens was non-uniform as shown in FIG. 4, and the thickness increased in the areas closer to the valley areas of the microlenses. Thereby, it can be seen that the low refractive index film changes the shape of the microlens, and it is speculated that the low refractive index film decreases the light harvesting performance.

The results of the Examples and Comparative Example described above are presented in Table 1 and Table 2.

TABLE 1

| | Method for producing microparticle-laminated film | Silicon compound | Characteristics of low refractive index film | | |
|---|---|---|---|---|---|
| | | | Adhesiveness to glass, adhesiveness to Si | Adhesiveness to PS | Conformity with shape of microlens |
| Example 1 | Alternate lamination method | Hydrolysate/condensate of phenyltrimethoxysilane | ○ | ○ | — |
| Example 2 | Alternate lamination method | Hydrolysate/condensate of diphenyldimethoxysilane | ○ | ○ | — |
| Example 3 | Alternate lamination method | Hydrolysate/condensate of hexyltriethoxysilane | ○ | ○ | — |
| Example 4 | Alternate lamination method | Hydrolysate/condensate of octyltriethoxysilane | ○ | ○ | — |
| Example 5 | Alternate lamination method | Hydrolysate/condensate of decyltrimethoxysilane | ○ | ○ | — |
| Example 6 | Alternate lamination method | Hydrolysate/condensate of dodecyltriethoxysilane | ○ | ○ | — |
| Example 7 | Alternate lamination method | Hydrolysate/condensate of 3-methacryloxypropyltriethoxysilane | ○ | ○ | — |
| Example 8 | Alternate lamination method | Hydrolysate/condensate of N-phenyl-3-aminopropyltrimethoxysilane | ○ | ○ | — |
| Example 9 | Alternate lamination method | Hydrolysate/condensate of mixture of decyltrimethoxysilane and tetraethoxysilane | ○ | ○ | — |
| Example 10 | Alternate lamination method | Mixture of hydrolysate/condensate of octyltriethoxysilane, and ETHYL SILICATE 48 | ○ | ○ | — |
| Example 11 | Alternate lamination method | Hydrolysate/condensate of octyltriethoxysilane | ○ | ○ | ○ |

(○: Satisfactory adhesiveness of low refractive index films to silicon substrate, glass substrate and polystyrene)
(x: Poor adhesiveness of low refractive index films to silicon substrate, glass substrate and polystyrene, peeling occurs)
(○: Satisfactory conformity with shape of microlens)
(x: Poor conformity with shape of microlens, shape change)

TABLE 2

| | Method for producing microparticle-laminated film or low refractive index film | Silicon compound | Characteristics of low refractive index film | | |
|---|---|---|---|---|---|
| | | | Adhesiveness to glass, adhesiveness to Si | Adhesiveness to PS | Conformity with shape of microlens |
| Comparative Example 1 | Spin coating method | Mixture of hydrolysate/condensate of octyltriethoxysilane, and silica microparticles | ○ | ○ | x |

(○: Satisfactory adhesiveness of low refractive index films to silicon substrate, glass substrate and polystyrene)
(x: Poor adhesiveness of low refractive index films to silicon substrate, glass substrate and polystyrene, peeling occurs)
(○: Satisfactory conformity with shape of microlens)
(x: Poor conformity with shape of microlens, shape change)

It can be seen from Table 1 and Table 2 that when any one of an alkoxysilane, a hydrolysate and a condensation reaction product of the hydrolysate of the alkoxysilane, and a mixture of those is brought into contact with a microparticle-laminated film, the low refractive index film can be imparted with adhesiveness to the substrate. Furthermore, it can be seen that when the microparticle-laminated film is produced by an alternate lamination method, the low refractive index film can be made to conform to the shape of a microstructure such as a microlens.

Next, Examples related to the second embodiment of the low refractive index film of the present invention (Examples 12 to 19) will be described.

Example 12

1. Formation of Microparticle-Laminated Film

A silica aqueous dispersion liquid (trade name: SNOWTEX (ST) OUP, manufactured by Nissan Chemical Industries, Ltd.; silica sol) in which beaded silica microparticles having an average primary particle size of 8 nm as measured by a BET method were dispersed, was used as a microparticle dispersion liquid having the concentration adjusted to 1% by mass, without adjusting the pH. An aqueous solution of polydiallyldimethylammonium chloride (PDDA, manufactured by Sigma-Aldrich Company Ltd.) having the concentration adjusted to 0.1% by mass and the pH adjusted to 10, was used as an aqueous solution of electrolyte polymer.

As solid substrates, a silicon wafer (6PW-A1, manufactured by Sumco Corp.; diameter 6 inches, 625 μm in thickness), a glass substrate (trade name: S1111, manufactured by Matsunami Glass Industries, Ltd.; 25 mm×75 mm×0.7 mm in thickness, refractive index at a wavelength of 550 nm is 1.54), a polystyrene plate irradiated with ultraviolet radiation emitted from a low pressure mercury lamp (10 mW) for 2 minutes (manufactured by Hikari Co., Ltd.; transparent, 1 mm in thickness), and a microlens array sheet having microlenses as a microstructure (photocurable resin, width 9 μm, height 1.5 μm) were respectively subjected to (a) a process of adding dropwise an aqueous solution of an electrolyte polymer, and after a lapse of one minute, showering the substrate with ultrapure water for rinsing purpose for one minute, and (b) a process of adding dropwise a microparticle dispersion liquid, and after a lapse of one minute, showering the substrate with ultrapure water for rinsing purpose for one minute, in this sequence.

Performing the process (a) one time and the process (b) one time in order, was defined as one cycle, and the number of this cycle was designated as the number of microparticle alternate lamination. The microparticle alternate lamination was performed 4 times, and thus a microparticle-laminated film was formed on the surface of each of the solid substrates. In addition, a protective tape was adhered to a part of the microlens array sheet to provide an area where the microparticle-laminated film and the low refractive index film were not formed.

2. Silicon Compound Treatment 50 g of tetraethoxysilane (alkoxysilane (I), manufactured by Wako Pure Chemical Industries, Ltd.; tetraethyl orthosilicate) was placed in a 300-ml three-necked round bottom flask, and 75 g of MeOH (methanol) was added thereto. The mixture was stirred at 25° C. to make the liquid uniform, subsequently 17.7 g of a 1.3 mass % aqueous solution of $H_3PO_4$ was added to the mixture, and the resulting mixture was stirred for 24 hours at 25° C. Thus, a solution having a silane concentration of 35% was obtained. 1-Butanol was added to the silicon compound solution, and thus a silicon compound solution having the silane concentration adjusted to 1 mass % was obtained. Each of the solid substrates having a microparticle-laminated thin film formed thereon as described above, was placed on a spin coater, and 20 ml of the silicon compound solution mentioned above was spread over the entire substrate. Subsequently, the solution was spread and dried at a speed of rotation of 1000 $min^{-1}$. Thereafter, the solution was dried at 25° C. for 24 hours, and thus a low refractive index film was produced.

3. Evaluation of Refractive Index

The refractive index and thickness of the low refractive index film on the silicon wafer were evaluated in the same manner as in Example 1, and as a result, the refractive index of the low refractive index film was 1.25, while the thickness was 110 nm.

4. Evaluation of Transparency

The haze value of the glass substrate thus obtained having the low refractive index film formed thereon was measured in the same manner as in Example 1, and as a result, the haze value was 0.4%. The haze value of the glass substrate only was measured in the same manner, and as a result, the haze value was 0.1%. The turbidity of the low refractive index film was determined by subtracting the haze value of the solid substrate only, from the haze value of the solid substrate having the low refractive index film formed thereon. As a result, the turbidity of the low refractive index film was 0.3%, and it was found that the low refractive index film had very high transparency.

5. Evaluation of Anti-Reflection Performance

A transmission spectrum of the glass substrate having the low refractive index film formed thereon was measured in the same manner as in Example 1, and the maximum transmittance in the wavelength range of 400 to 800 nm was 95%.

Furthermore, a black adhesive tape (trade name: VT-196, manufactured by Nichiban Co., Ltd.) was adhered on the surface of the glass substrate opposite to the surface where the low refractive index film was formed such that no air bubbles remained under the adhesive tape, and a spectrum of the surface reflection ratio of the one surface where the low refractive index film was formed, was measured in the same manner as in Example 1. The minimum surface reflection ratio of the glass substrate having the low refractive index film formed thereon in the wavelength range of 400 to 800 nm was 0.1%.

Since the transmittance of the glass substrate was 91%, and the surface reflection ratio was 4.5%, it was found that an anti-reflection film having excellent properties was formed, and the transmittance was also enhanced.

6. Evaluation of Adhesiveness

An adhesive tape (trade name: HITALEX L-7330, manufactured by Hitachi Chemical Co., Ltd.) having an adhesive force of 320 cN/25 mm and a width of 25 mm was used as an adhesive tape, and the adhesive tape was adhered to the low refractive index film using a roll laminator (LMP-350EX, manufactured by Lami Corporation, Inc.) under the conditions of a roll load of 0.3 MPa, a transfer speed of 0.3 m/min, and a temperature of 20° C.

One minute after the adhesion of the tape, one edge of the tape was lifted perpendicularly to the substrate surface and was instantaneously peeled by pulling. The low refractive index film was visually observed, and as a result, the substrate surface was not seen, while the low refractive index film did not scatter visible light. Therefore, it was found that the low refractive index film was closely adhered to the substrate. The low refractive index films on the silicon substrate, the glass substrate and the polystyrene were all closely adhered to the substrates.

In addition, an adhesive tape (BGP-101B, manufactured by Denki Formula Kogyo Kabushiki Kaisha) having an adhesive force of 360 cN/25 mm (after ultraviolet irradiation, 25 cN/25 mm) and a width of 25 mm was used as an adhesive tape, and the adhesive tape was adhered to the low refractive index film using a roll laminator (LMP-350EX, manufactured by Lami Corporation, Inc.) under the conditions of a roll load of 0.3 MPa, a transfer speed of 0.3 m/min, and a temperature of 20° C.

One minute after the adhesion of the tape, the substrate was irradiated with 200 $mJ/cm^2$ of ultraviolet radiation using an ultraviolet exposure apparatus (HMW-6N-4, manufactured by Orc Manufacturing Co., Ltd.). One edge of the tape was lifted perpendicularly to the substrate surface and was instantaneously peeled by pulling. The low refractive index films on the silicon substrate, the glass substrate, the polystyrene, and the microlens array sheet were all closely adhered to the substrates.

7. Evaluation of Shape Conformity

The microlens array sheet having a microparticle-laminated film formed thereon was observed with a scanning electron microscope (trade name: XL30ESEM, manufactured by Philips Electronics, N.V.) at an angle of 75° from the normal direction of the sheet surface, and thereby the shape of the microlens having the microparticle-laminated film formed thereon was observed.

Furthermore, the shape of the microlens at the area where the microparticle-laminated film was not formed was also observed in the same manner. The outline of the observed image of the microlens having the microparticle-laminated film formed thereon is indicated with a dashed line in FIG. 3.

Figure 3:
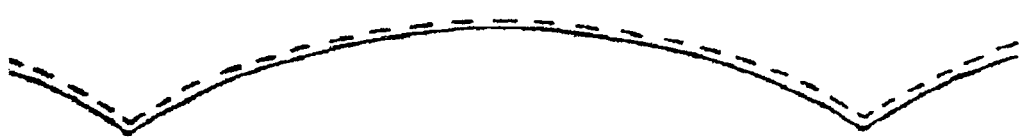
FIG. 3 is a diagram showing an outline of an image obtained by observing, with SEM, a microlens having a microparticle-laminated film of Examples 11 and 12 formed thereon (dashed line in the drawing) and an outline of an image obtained by observing, with SEM, a microlens having a microparticle-laminated film formed thereon (solid line in the drawing), with the outlines being laid in parallel through a vertically shift by 0.1 μm.

Furthermore, the outline of the observed image of the microlens on which the microparticle-laminated film is not formed is indicated with a solid line in FIG. 3. Assuming that the thickness of the microparticle-laminated film was 0.1 μm, the outline of the microlens having the microparticle-laminated film formed thereon was recorded above the outline of the microlens on which the microparticle-laminated film was not formed, with a 0.1 μm shift. As a result, it could be confirmed that the thickness of the microparticle-laminated film on the microlens in the normal direction of the microlens was uniform, and it could be confirmed that the microparticle-laminated film was satisfactorily conforming to the shape of the microlens.

Example 13

First, a microparticle-laminated film was produced according to Example 12.

Next, a low refractive index film was produced according to Example 12, except that 50 g of tetramethoxysilane (manufactured by Tama Chemicals Co., Ltd.; methyl orthosilicate)

was placed in a 300-ml three-necked round bottom flask, 81 g of MeOH was added thereto, the mixture was stirred at 25° C. to make the liquid uniform, subsequently 12.1 g of a 2.7 mass % aqueous solution of $H_3PO_4$ was added to the mixture, the resulting mixture was stirred for 4 hours at 25° C. to obtain a solution having a silane concentration of 35%, and that the silane concentration of this solution was adjusted to 5% by mass to obtain a silicon compound solution.

The refractive index of the low refractive index film evaluated in the same manner as in Example 12 was 1.25, and the thickness was 110 nm. The turbidity of the low refractive index film evaluated in the same manner as in Example 12 was 0.3%.

The transmission spectrum of the glass substrate having the low refractive index film formed thereon was measured in the same manner as in Example 12, and the maximum transmittance in the wavelength range of 400 to 800 nm was 95%.

The surface reflection spectrum of the glass substrate having the low refractive index film formed thereon was measured in the same manner as in Example 12, and the minimum surface reflection ratio in the wavelength range of 400 to 800 nm was 0.1%.

The adhesiveness was evaluated in the same manner as in Example 12, and in regard to the use of an adhesive tape (trade name: HITALEX L-7330, manufactured by Hitachi Chemical Co., Ltd.) having an adhesive force of 320 cN/25 mm and a width of 25 mm, the low refractive index films on the silicon substrate, the glass substrate and the polystyrene were all closely adhered to the substrates. In regard to the use of an adhesive tape (trade name: BGP-101B, manufactured by Denki Formula Kogyo Kabushiki Kaisha) having an adhesive force of 360 cN/25 mm (after ultraviolet irradiation, 25 cN/25 mm) and a width of 25 mm, the low refractive index films on the silicon substrate, the glass substrate, the polystyrene and the microlens array sheet were all closely adhered to the substrates.

The microlens having the low refractive index film formed thereon and the microlens on which the low refractive index film was not formed, were observed with a scanning electron microscope in the same manner as in Example 12, and a comparison of the outlines of the observed images was made. As a result, it could be confirmed that the thickness of the low refractive index film in the normal direction of the microlens was uniform as shown in FIG. 3, and it could be confirmed that the microparticle-laminated film was satisfactorily conforming to the shape of the microlens.

Example 14

A microparticle-laminated film was produced on a substrate according to Example 12, except that an aqueous solution of an electrolyte polymer which contained polyethyleneimine (PEI) at an adjusted concentration of 0.1% by mass, without adjusting the pH, was used, and the number of microparticle alternate lamination was set at 3 times.

A low refractive index film was produced according to Example 12, except that 50 g of an ethoxysilane oligomer (trade name: ETHYL SILICATE 40, manufactured by Colcoat Co., Ltd.) was placed in a 300-ml three-necked round bottom flask, 42 g of MeOH was added thereto, the mixture was stirred at 25° C. to make the liquid uniform, subsequently 7.4 g of a 0.05 mass % aqueous solution of $H_3PO_4$ was added to the mixture, the resulting mixture was stirred for 72 hours at 25° C. to obtain a solution having a silane concentration of 50% (stock solution), that the silane concentration of this solution was adjusted to 1% by mass to obtain a silicon compound solution, and that the film was dried for 30 minutes at 80° C. instead of drying for 24 hours at 25° C.

The refractive index of the low refractive index film evaluated in the same manner as in Example 12 was 1.25, and the thickness was 110 nm. The turbidity of the low refractive index film evaluated in the same manner as in Example 12 was 0.3%.

The transmission spectrum of the glass substrate having the low refractive index film formed thereon was measured in the same manner as in Example 12, and the maximum transmittance in the wavelength range of 400 to 800 nm was 95%.

The surface reflection spectrum of the glass substrate having the low refractive index film formed thereon was measured in the same manner as in Example 12, and the minimum surface reflection ratio in the wavelength range of 400 to 800 nm was 0.1%.

The adhesiveness was evaluated in the same manner as in Example 12, and in regard to the use of an adhesive tape (trade name: HITALEX L-7330, manufactured by Hitachi Chemical Co., Ltd.) having an adhesive force of 320 cN/25 mm and a width of 25 mm, the low refractive index films on the silicon substrate, the glass substrate and the polystyrene were all closely adhered to the substrates. In regard to the use of an adhesive tape (trade name: BGP-101B, manufactured by Denki Formula Kogyo Kabushiki Kaisha) having an adhesive force of 360 cN/25 mm (after ultraviolet irradiation, 25 cN/25 mm) and a width of 25 mm, the low refractive index films on the silicon substrate, the glass substrate, the polystyrene and the microlens array sheet were all closely adhered to the substrates.

The microlens having the low refractive index film formed thereon and the microlens on which the low refractive index film was not formed, were observed with a scanning electron microscope in the same manner as in Example 12, and a comparison of the outlines of the observed images was made. As a result, it could be confirmed that the thickness of the low refractive index film in the normal direction of the microlens was uniform as shown in FIG. 3, and it could be confirmed that the microparticle-laminated film was satisfactorily conforming to the shape of the microlens.

Example 15

First, a microparticle-laminated film was produced according to Example 14.

Next, a low refractive index film was produced according to Example 12, except that 50 g of an ethoxysilane oligomer (trade name: ETHYL SILICATE 48, manufactured by Colcoat Co., Ltd.) was placed in a 300-ml three-necked round bottom flask, 46 g of MeOH was added thereto, the mixture was stirred at 25° C. to make the liquid uniform, subsequently 3.6 g of a 10.0 mass % aqueous solution of $H_3PO_4$ was added to the mixture, the resulting mixture was stirred for 24 hours at 25° C. to obtain a solution having a silane concentration of 50% (stock solution), and that the silane concentration of this solution was adjusted to 1% by mass to obtain a silicon compound solution.

The refractive index of the low refractive index film evaluated in the same manner as in Example 12 was 1.25, and the thickness was 110 nm. The turbidity of the low refractive index film evaluated in the same manner as in Example 12 was 0.3%.

The transmission spectrum of the glass substrate having the low refractive index film formed thereon was measured in the same manner as in Example 12, and the maximum transmittance in the wavelength range of 400 to 800 nm was 95%.

The surface reflection spectrum of the glass substrate having the low refractive index film formed thereon was measured in the same manner as in Example 12, and the minimum surface reflection ratio in the wavelength range of 400 to 800 nm was 0.1%.

The adhesiveness was evaluated in the same manner as in Example 12, and in regard to the use of an adhesive tape (trade name: HITALEX L-7330, manufactured by Hitachi Chemical Co., Ltd.) having an adhesive force of 320 cN/25 mm and a width of 25 mm, the low refractive index films on the silicon substrate, the glass substrate and the polystyrene were all closely adhered to the substrates. In regard to the use of an adhesive tape (trade name: BGP-101B, manufactured by Denki Formula Kogyo Kabushiki Kaisha) having an adhesive force of 360 cN/25 mm (after ultraviolet irradiation, 25 cN/25 mm) and a width of 25 mm, the low refractive index films on the silicon substrate, the glass substrate, the polystyrene and the microlens array sheet were all closely adhered to the substrates.

The microlens having the low refractive index film formed thereon and the microlens on which the low refractive index film was not formed, were observed with a scanning electron microscope in the same manner as in Example 12, and a comparison of the outlines of the observed images was made. As a result, it could be confirmed that the thickness of the low refractive index film in the normal direction of the microlens was uniform as shown in FIG. 3, and it could be confirmed that the microparticle-laminated film was satisfactorily conforming to the shape of the microlens.

Example 16

First, a microparticle-laminated film was produced according to Example 14.

Next, a low refractive index film was produced according to Example 12, except that 50 g of a methoxysilane oligomer (trade name: METHYL SILICATE 51, manufactured by Colcoat Co., Ltd.) was placed in a 300-ml three-necked round bottom flask, 40 g of MeOH was added thereto, the mixture was stirred at 25° C. to make the liquid uniform, subsequently 9.7 g of a 4.3 mass % aqueous solution of $H_3PO_4$ was added to the mixture, the resulting mixture was stirred for 4 hours at 25° C. to obtain a solution having a silane concentration of 50% (stock solution), and that the silane concentration of this solution was adjusted to 5% by mass to obtain a silicon compound solution.

The refractive index of the low refractive index film evaluated in the same manner as in Example 12 was 1.25, and the thickness was 110 nm. The turbidity of the low refractive index film evaluated in the same manner as in Example 12 was 0.3%.

The transmission spectrum of the glass substrate having the low refractive index film formed thereon was measured in the same manner as in Example 12, and the maximum transmittance in the wavelength range of 400 to 800 nm was 95%.

The surface reflection spectrum of the glass substrate having the low refractive index film formed thereon was measured in the same manner as in Example 12, and the minimum surface reflection ratio in the wavelength range of 400 to 800 nm was 0.1%.

The adhesiveness was evaluated in the same manner as in Example 12, and in regard to the use of an adhesive tape (trade name: HITALEX L-7330, manufactured by Hitachi Chemical Co., Ltd.) having an adhesive force of 320 cN/25 mm and a width of 25 mm, the low refractive index films on the silicon substrate, the glass substrate and the polystyrene were all closely adhered to the substrates. In regard to the use of an adhesive tape (trade name: BGP-101B, manufactured by Denki Formula Kogyo Kabushiki Kaisha) having an adhesive force of 360 cN/25 mm (after ultraviolet irradiation, 25 cN/25 mm) and a width of 25 mm, the low refractive index films on the silicon substrate, the glass substrate, the polystyrene and the microlens array sheet were all closely adhered to the substrates.

The microlens having the low refractive index film formed thereon and the microlens on which the low refractive index film was not formed, were observed with a scanning electron microscope in the same manner as in Example 12, and a comparison of the outlines of the observed images was made. As a result, it could be confirmed that the thickness of the low refractive index film in the normal direction of the microlens was uniform as shown in FIG. 3, and it could be confirmed that the microparticle-laminated film was satisfactorily conforming to the shape of the microlens.

Example 17

First, a microparticle-laminated film was produced according to Example 14.

Next, a low refractive index film was produced according to Example 12, except that an ethoxysilane oligomer (trade name: ETHYL SILICATE 48, manufactured by Colcoat Co., Ltd.) was used as a solution having a silane concentration of 100% (stock solution), and the silane concentration of this solution was adjusted to 1% by mass to obtain a silicon compound solution.

The refractive index of the low refractive index film evaluated in the same manner as in Example 12 was 1.25, and the thickness was 110 nm. The turbidity of the low refractive index film evaluated in the same manner as in Example 12 was 0.3%.

The transmission spectrum of the glass substrate having the low refractive index film formed thereon was measured in the same manner as in Example 12, and the maximum transmittance in the wavelength range of 400 to 800 nm was 95%.

The surface reflection spectrum of the glass substrate having the low refractive index film formed thereon was measured in the same manner as in Example 12, and the minimum surface reflection ratio in the wavelength range of 400 to 800 nm was 0.1%.

The adhesiveness was evaluated in the same manner as in Example 12, and in regard to the use of an adhesive tape (trade name: HITALEX L-7330, manufactured by Hitachi Chemical Co., Ltd.) having an adhesive force of 320 cN/25 mm and a width of 25 mm, the low refractive index films on the silicon substrate, the glass substrate and the polystyrene were all closely adhered to the substrates. In regard to the use of an adhesive tape (trade name: BGP-101B, manufactured by Denki Formula Kogyo Kabushiki Kaisha) having an adhesive force of 360 cN/25 mm (after ultraviolet irradiation, 25 cN/25 mm) and a width of 25 mm, the low refractive index films on the silicon substrate, the glass substrate, the polystyrene and the microlens array sheet were all closely adhered to the substrates.

The microlens having the low refractive index film formed thereon and the microlens on which the low refractive index film was not formed, were observed with a scanning electron microscope in the same manner as in Example 12, and a comparison of the outlines of the observed images was made. As a result, it could be confirmed that the thickness of the low refractive index film in the normal direction of the microlens was uniform as shown in FIG. 3, and it could be confirmed that the microparticle-laminated film was satisfactorily conforming to the shape of the microlens.

Example 18

First, a microparticle-laminated film was produced according to Example 14.

Next, a low refractive index film was produced according to Example 12, except that a methoxysilane oligomer (trade name: METHYL SILICATE 51, manufactured by Colcoat Co., Ltd.) was used as a solution having a silane concentration of 100% (stock solution), and the silane concentration of this solution was adjusted to 5% by mass to obtain a silicon compound solution.

The refractive index of the low refractive index film evaluated in the same manner as in Example 12 was 1.25, and the thickness was 110 nm. The turbidity of the low refractive index film evaluated in the same manner as in Example 12 was 0.3%.

The transmission spectrum of the glass substrate having the low refractive index film formed thereon was measured in the same manner as in Example 12, and the maximum transmittance in the wavelength range of 400 to 800 nm was 95%.

The surface reflection spectrum of the glass substrate having the low refractive index film formed thereon was measured in the same manner as in Example 12, and the minimum surface reflection ratio in the wavelength range of 400 to 800 nm was 0.1%.

The adhesiveness was evaluated in the same manner as in Example 12, and in regard to the use of an adhesive tape (trade name: HITALEX L-7330, manufactured by Hitachi Chemical Co., Ltd.) having an adhesive force of 320 cN/25 mm and a width of 25 mm, the low refractive index films on the silicon substrate, the glass substrate and the polystyrene were all closely adhered to the substrates. In regard to the use of an adhesive tape (trade name: BGP-101B, manufactured by Denki Formula Kogyo Kabushiki Kaisha) having an adhesive force of 360 cN/25 mm (after ultraviolet irradiation, 25 cN/25 mm) and a width of 25 mm, the low refractive index films on the silicon substrate, the glass substrate, the polystyrene and the microlens array sheet were all closely adhered to the substrates.

The microlens having the low refractive index film formed thereon and the microlens on which the low refractive index film was not formed, were observed with a scanning electron microscope in the same manner as in Example 12, and a comparison of the outlines of the observed images was made. As a result, it could be confirmed that the thickness of the low refractive index film in the normal direction of the microlens was uniform as shown in FIG. 3, and it could be confirmed that the microparticle-laminated film was satisfactorily conforming to the shape of the microlens.

Example 19

First, a microparticle-laminated film was produced according to Example 14.

Next, a low refractive index film was produced according to Example 12, except that 50 g of tetraethoxysilane (manufactured by Wako Pure Chemical Industries, Ltd.; tetraethyl orthosilicate) was placed in a 300-ml three-necked round bottom flask, 75 g of MeOH was added thereto, the mixture was stirred at 25° C. to make the liquid uniform, subsequently 17.7 g of a 1.3 mass % aqueous solution of $H_3PO_4$ was added to the mixture, the resulting mixture was stirred for 24 hours at 25° C., subsequently 50 g of an ethoxysilane oligomer (trade name: ETHYL SILICATE 48, manufactured by Colcoat Co., Ltd.) was added thereto, the mixture was stirred for 5 minutes at 25° C. to obtain a solution having a silane concentration of 70% (stock solution), and the silane concentration of this solution was adjusted to 1% by mass to obtain a silicon compound solution.

The refractive index of the low refractive index film evaluated in the same manner as in Example 12 was 1.25, and the thickness was 110 nm. The turbidity of the low refractive index film evaluated in the same manner as in Example 12 was 0.3%.

The transmission spectrum of the glass substrate having the low refractive index film formed thereon was measured in the same manner as in Example 12, and the maximum transmittance in the wavelength range of 400 to 800 nm was 95%.

The surface reflection spectrum of the glass substrate having the low refractive index film formed thereon was measured in the same manner as in Example 12, and the minimum surface reflection ratio in the wavelength range of 400 to 800 nm was 0.1%.

The adhesiveness was evaluated in the same manner as in Example 12, and in regard to the use of an adhesive tape (trade name: HITALEX L-7330, manufactured by Hitachi Chemical Co., Ltd.) having an adhesive force of 320 cN/25 mm and a width of 25 mm, the low refractive index films on the silicon substrate, the glass substrate and the polystyrene were all closely adhered to the substrates. In regard to the use of an adhesive tape (trade name: BGP-101B, manufactured by Denki Formula Kogyo Kabushiki Kaisha) having an adhesive force of 360 cN/25 mm (after ultraviolet irradiation, 25 cN/25 mm) and a width of 25 mm, the low refractive index films on the silicon substrate, the glass substrate, the polystyrene and the microlens array sheet were all closely adhered to the substrates.

The microlens having the low refractive index film formed thereon and the microlens on which the low refractive index film was not formed, were observed with a scanning electron microscope in the same manner as in Example 12, and a comparison of the outlines of the observed images was made. As a result, it could be confirmed that the thickness of the low refractive index film in the normal direction of the microlens was uniform as shown in FIG. 3, and it could be confirmed that the microparticle-laminated film was satisfactorily conforming to the shape of the microlens.

Comparative Example 2

An isopropanol dispersion liquid of silica microparticles (trade name: IPA-ST-UP, manufactured by Nissan Chemical Industries, Ltd.; organosilica sol) in which beaded silica microparticles having an average primary particle size of 8 nm as measured by a BET method were dispersed, was adjusted to a concentration of 1.5% by mass to obtain a microparticle dispersion liquid.

50 g of tetraethoxysilane (manufactured by Wako Pure Chemical Industries, Ltd.; tetraethyl orthosilicate) was placed in a 300-ml three-necked round bottom flask, and 75 g of MeOH was added thereto. The mixture was stirred at 25° C. to make the liquid uniform, subsequently 17.7 g of a 1.3 mass % aqueous solution of $H_3PO_4$ was added to the mixture, and the resulting mixture was stirred for 24 hours at 25° C. Thus, a solution having a silane concentration of 35% (stock solution) was obtained. 1-Butanol was added to this solution, and thus a silicon compound solution having the silane concentration adjusted to 1% by mass was obtained.

50 Parts by mass of the silicon compound treatment liquid and 50 parts by mass of the microparticle dispersion liquid were mixed, and thus a microparticle-dispersed silicon compound solution was obtained.

As substrates, a silicon wafer (6PW-A1, manufactured by Sumco Corp.; diameter 6 inches, 625 μm in thickness), a glass substrate (trade name: S1111, manufactured by Matsunami Glass Industries, Ltd.; 25 mm×75 mm×0.7 mm in thickness, refractive index at a wavelength of 550 nm is 1.54), a polystyrene plate irradiated with ultraviolet radiation emitted from a low pressure mercury lamp (10 mW) for 2 minutes (manufactured by Hikari Co., Ltd.; transparent, 1 mm in thickness), and a microlens array sheet having microlenses as a microstructure (photocurable resin, width 9 μm, height 1.5 μm) were respectively treated such that the microparticle-dispersed silicon compound solution was added dropwise and was spread and dried at a speed of rotation of 1000 $min^{-1}$.

refractive index films on the silicon substrate, the glass substrate, the polystyrene and the microlens array sheet were all closely adhered to the substrates.

The microlens having the low refractive index film formed thereon and the microlens on which the low refractive index film was not formed, were observed with a scanning electron microscope in the same manner as in Example 12, and a comparison of the outlines of the observed images was made. As a result, the thickness of the low refractive index film in the normal direction of the microlens was non-uniform as shown in FIG. 4, and the thickness increased in the areas closer to the valley areas of the microlenses. Thereby, it can be seen that the low refractive index film changes the shape of the microlens, and it is speculated that the low refractive index film decreases the light harvesting performance.

The results of the Examples and Comparative Example described above are presented in Table 3.

TABLE 3

| | Method for producing | | Characteristics of low refractive index film | | |
|---|---|---|---|---|---|
| | microparticle-laminated film or low refractive index film | Silicon compound | Adhesiveness, L7330 used | Adhesiveness, BGP101B used | Conformity with shape of microlens |
| Example 12 | Alternate lamination method | Hydrolysate/condensate of tetraethoxysilane | ○ | ○ | ○ |
| Example 13 | Alternate lamination method | Hydrolysate/condensate of tetramethoxysilane | ○ | ○ | ○ |
| Example 14 | Alternate lamination method | Hydrolysate/condensate of ETHYL SILICATE 40 | ○ | ○ | ○ |
| Example 15 | Alternate lamination method | Hydrolysate/condensate of ETHYL SILICATE 48 | ○ | ○ | ○ |
| Example 16 | Alternate lamination method | Hydrolysate/condensate of METHYL SILICATE 51 | ○ | ○ | ○ |
| Example 17 | Alternate lamination method | ETHYL SILICATE 48 | ○ | ○ | ○ |
| Example 18 | Alternate lamination method | METHYL SILICATE 51 | ○ | ○ | ○ |
| Example 19 | Alternate lamination method | Mixture of hydrolysate/condensate of tetraethoxysilane, and ETHYL SILICATE 48 | ○ | ○ | ○ |
| Comparative Example 2 | Spin coating method | Mixture of hydrolysate/condensate of tetraethoxysilane, and silica microparticles | ○ | ○ | x |

Thus, low refractive index films were formed on the substrates. Furthermore, a protective tape was adhered to a part of the microlens array sheet to provide an area where the low refractive index film was not formed.

The refractive index of the low refractive index film evaluated in the same manner as in Example 12 was 1.25, and the thickness was 110 nm. The turbidity of the low refractive index film evaluated in the same manner as in Example 12 was 0.3%.

The transmission spectrum of the glass substrate having the low refractive index film formed thereon was measured in the same manner as in Example 12, and the maximum transmittance in the wavelength range of 400 to 800 nm was 95%.

The surface reflection spectrum of the glass substrate having the low refractive index film formed thereon was measured in the same manner as in Example 12, and the minimum surface reflection ratio in the wavelength range of 400 to 800 nm was 0.1%.

The adhesiveness was evaluated in the same manner as in Example 12, and in regard to the use of an adhesive tape (trade name: HITALEX L-7330, manufactured by Hitachi Chemical Co., Ltd.) having an adhesive force of 320 cN/25 mm and a width of 25 mm, the low refractive index films on the silicon substrate, the glass substrate, the polystyrene an the microlens array sheet were all closely adhered to the substrates. In regard to the use of an adhesive tape (trade name: BGP-101B, manufactured by Denki Formula Kogyo Kabushiki Kaisha) having an adhesive force of 360 cN/25 mm (after ultraviolet irradiation, 25 cN/25 mm) and a width of 25 mm, the low It can be clearly seen from Table 3 that when any one of an alkoxysilane, a hydrolysate and a condensation reaction product of the hydrolysate of the alkoxysilane, and a mixture of those is brought into contact with the microparticle-laminated film, the low refractive index film can be imparted with adhesiveness to the substrate.

Furthermore, it can be clearly seen that when the microparticle-laminated film is produced by an alternate lamination method, the low refractive index film can be made to conform to the shape of a microstructure such as a microlens.

Next, Examples for the microparticle-laminated thin film-attached substrate of the present invention (Examples 20 to 27) will be described.

(Production of Microparticle-Laminated Thin Film-Attached Substrate)

Beaded silica microparticles having an average primary particle size of 7.5 nm as measured by a BET method were used as microparticles. A 1.0 mass % aqueous dispersion liquid of silica (trade name: SNOWTEX (ST) OUP, manufactured by Nissan Chemical Industries, Ltd.; silica sol, anionic) was used as a microparticle dispersion liquid, and polydiallyldimethylammonium chloride (PDDA, manufactured by Sigma-Aldrich Company Ltd.; weight average molecular weight 100000, cationic) was used as an electrolyte polymer. A 0.3 mass % aqueous solution of PDDA and a 1.0 mass % microparticle dispersion liquid were prepared as solutions. The pH of the microparticle dispersion liquid was 4 without any adjustment, and the pH of the aqueous solution of PDDA was adjusted to 9. A PET substrate (trade name:

A4100, manufactured by Toyobo Co., Ltd.; 100 mm×150 mm×125 μm in thickness, coefficient of thermal expansion: 50 ppm/K) as a plastic substrate was subjected to (α) a process of immersing the substrate for one minute in the aqueous solution of PDDA, and then immersing the substrate in ultrapure water for rinsing purpose for three minutes, and (β) a process of immersing the substrate for one minute in the microparticle dispersion liquid, and then immersing the substrate in ultrapure water for rinsing purpose for three minutes, in this sequence. Performing this process (α) one time and the process (β) one time in order was defined as one cycle, and this cycle was performed 3 times (number of microparticle alternate lamination). Thus, a microparticle-laminated film-attached substrate was formed on the surface of the substrate.

(Synthesis of Alcoholic Silica Sol)

<Methyl Silicate-Based Alcoholic Silica Sol>

61.5 g of tetramethoxysilane was placed in a 1-L (liter) four-necked round bottom flask, and 463.9 g of MeOH (methanol) was added thereto. While the liquid temperature was maintained at a constant temperature of 30° C., the liquid was stirred to make the liquid uniform. Subsequently, an aqueous solution prepared by adding 3.0 g of $HNO_3$ to 71.6 g of water, was added thereto, and the resulting mixture was stirred for 5 hours at 30° C. This methyl silicate-based alcoholic silica sol (50 parts) and isopropyl alcohol (50 parts) were mixed, and n-butyl alcohol was added to adjust the solids concentration to a predetermined concentration.

<Ethyl Silicate-Based Alcoholic Silica Sol>

85.7 g of tetraethoxysilane was placed in a 1-L (liter) four-necked round bottom flask, and 356.7 g of MeOH (methanol) was added thereto. While the liquid temperature was maintained at a constant temperature of 30° C., the liquid was stirred to make the liquid uniform. Subsequently, an aqueous solution prepared by adding 3.0 g of $HNO_3$ to 154.6 g of water, was added thereto, and the resulting mixture was stirred for 5 hours at 30° C. This ethyl silicate-based alcoholic silica sol (50 parts) and isopropyl alcohol (50 parts) were mixed, and n-butyl alcohol was added to adjust the solids concentration to a predetermined concentration.

<Dimethyl Dimethoxysilicate Sol>

60 g of dimethyldimethoxysilane was placed in a 1-L (liter) four-necked round bottom flask, and 463.9 g of MeOH was added thereto. While the liquid temperature was maintained at a constant temperature of 30° C., the liquid was stirred to make the liquid uniform. Subsequently, an aqueous solution prepared by adding 3.0 g of $HNO_3$ to 71.6 g of water, was added thereto, and the resulting mixture was stirred for 5 hours at 30° C. This dimethylsilicone-based alcoholic silica sol (50 parts) and isopropyl alcohol (50 parts) were mixed, and n-butyl alcohol was added to adjust the solids concentration to a predetermined concentration.

Example 20

The PET substrate (trade name: A4100, manufactured by Toyobo Co., Ltd.; 100 mm×150 mm×125 μm in thickness, coefficient of thermal expansion: 50 ppm/K) having the microparticle-laminated thin film formed thereon as described above, was placed on a spin coater, 20 ml of the methyl silicate-based alcoholic silica sol (solids concentration: 0.4% by mass) described above was spread over the entire substrate, and then the substrate was rotated at a speed of rotation of 1000 rotations/min for 30 seconds. Thereafter, the substrate was heated for 60 seconds on a hot plate heated to 80° C., and thus a microparticle-laminated thin film-attached substrate having the microparticles bonded with the silica sol, and the microparticles bonded with the substrate, was produced.

Example 21

A microparticle-laminated thin film-attached substrate was produced in the same manner as in Example 20, except that the ethyl silicate-based alcoholic silica sol (solids concentration: 0.4% by mass) described above was used instead of the methyl silicate-based alcoholic silica sol.

Example 22

20 ml of a mixture of 50 parts of the methyl silicate-based alcoholic silica sol (solids concentration: 0.2% by mass) and 50 parts of the ethyl silicate-based alcoholic silica sol (solids concentration: 0.2% by mass), was spread over the entire PET substrate on which the microparticle-laminated thin film had been formed as described above, and then the substrate was rotated at a speed of rotation of 1000 rotations/min for 30 seconds. Thereafter, the substrate was heated for 60 seconds on a hot plate heated to 80° C., and thus a microparticle-laminated thin film-attached substrate having the microparticles bonded with the silica sol, and the microparticles bonded with the substrate, was produced.

Example 23

20 ml of a mixture of 50 parts of the dimethyl dimethoxysilicate sol (solids concentration: 0.2% by mass) and 50 parts of the ethyl silicate-based alcoholic silica sol (solids concentration: 0.2% by mass), was spread over the entire PET substrate on which the microparticle-laminated thin film had been formed as described above, and then the substrate was rotated at a speed of rotation of 1000 rotations/min for 30 seconds. Thereafter, the substrate was heated for 60 seconds on a hot plate heated to 80° C., and thus a microparticle-laminated thin film-attached substrate having the microparticles bonded with the silica sol, and the microparticles bonded with the substrate, was produced.

A microparticle-laminated thin film-attached substrate was produced in the same manner as in Example 20 using the same microparticle-laminated thin film, except that an acrylic resin plate (trade name: SUMIPEX, manufactured by Sumitomo Chemical Co., Ltd.; 100 mm×150 mm×1 mm in thickness, coefficient of thermal expansion: 50 ppm/K) was used instead of the PET substrate.

Example 25

A microparticle-laminated thin film-attached substrate was produced in the same manner as in Example 20 using the same microparticle-laminated thin film, except that a silicone resin substrate (trade name: SCR1016(A/B), manufactured by Shin-Etsu Silicone Co., Ltd.; coefficient of thermal expansion: 220 ppm/K) was used instead of the PET substrate.

Example 26

A microparticle-laminated thin film-attached substrate was produced in the same manner as in Example 20 using the same microparticle-laminated thin film, except that a polycarbonate substrate (trade name: POLYCA ACE AF, manufactured by Sumitomo Bakelite Co., Ltd.; coefficient of thermal expansion: 70 ppm/K) was used instead of the PET substrate.

Example 27

A microparticle-laminated thin film-attached substrate was produced in the same manner as in Example 20 using the same microparticle-laminated thin film, except that a substrate in which a semispherical lens shape having a diameter of 10 μm and a height of 4 μm was formed from a photosensitive resin (trade name: XP-SU8 3050-N02, manufactured by Kayaku Microchem Corp.; positive type resist, coefficient of thermal expansion: 62 ppm/K) as a plastic substrate, on a silicon wafer (trade name: 6PW-A1, manufactured by Sumco Corp.; diameter: 6 inches, 625 μm in thickness) substrate, was used instead of the PET substrate.

The refractive index, thickness and porosity of the microparticle-laminated thin film were measured, and the values were respectively refractive index: 1.26, thickness: 100 nm, and porosity: 51%.

Comparative Example 3

MgF$_2$ was vacuum-deposited on a PET substrate. The film thickness and the refractive index were measured, and the values were refractive index: 1.38, and thickness: 100 nm.

Comparative Example 4

A PET substrate having the above-described microparticle-laminated thin film formed thereon, was heated to 80° C. without bringing the substrate into contact with an alcoholic silica sol. The film thickness, refractive index and porosity were measured, and the values were thickness: 100 nm, refractive index: 1.21, and porosity: 63%.

Comparative Example 5

An isopropanol dispersion liquid of silica microparticles (trade name: IPA-ST-UP, manufactured by Nissan Chemical Industries, Ltd.; organosilica sol) in which beaded silica microparticles having an average primary particle size of 8 nm as measured by a BET method, was adjusted to a concentration of 1.5% by mass to obtain a microparticle dispersion liquid.

50 g of tetraethoxysilane (manufactured by Wako Pure Chemical Industries, Ltd.; tetraethyl orthosilicate) was placed in a 300-ml three-necked round bottom flask, and 75 g of MeOH was added thereto. The mixture was stirred at 25° C. to make the liquid uniform, subsequently 17.7 g of a 1.3 mass % aqueous solution of H$_3$PO$_4$ was added to the mixture, and the resulting mixture was stirred for 24 hours at 25° C. to obtain a silicon compound solution having a silane concentration of 35% by mass. 1-Butanol was added to the silicon compound solution, and thus a silicon compound treatment liquid having the silane concentration adjusted to 1% by mass was obtained.

50 parts by mass of the silicon compound treatment liquid and 50 parts by mass of the microparticle dispersion liquid were mixed, and thus a microparticle-dispersed silicon compound solution was obtained.

The microparticle-dispersed silicon compound solution was added dropwise on a substrate having a semispherical lens shape with a diameter of 10 μm and a height of 4 formed thereon, which was produced in the same manner as in Example 27, and the microparticle-dispersed silicon compound solution was spread and dried at a speed of rotation of 1000 rotations/min, to form a low refractive index film on the substrate.

(Determination of Refractive Index and Thickness of Microparticle-Laminated Thin Film)

The refractive index and thickness of the microparticle-laminated thin film was determined from the spectrum of surface reflection ratio, by an analytic program of an instant photometric spectrophotometer (trade name: F20, manufactured by Filmetrics, Inc.) which combines a reflection ratio spectrometric method and a curve fitting method.

(Determination of Porosity of Microparticle-Laminated Thin Film)

In the microparticle-laminated thin film of the present invention, air is present in the gaps between the microparticles. That is, since pores can be observed by an observation of the surface and the cross-section using a scanning electron microscope, it is known that if the apparent refractive index of the silica microparticle-laminated thin film is lower than that of silica, the factor causing a decrease in the refractive index is air that is present in the gaps. Based on this assumption, porosity $\rho_0$ in the microparticle-laminated thin film was determined by the following expression.

$$\rho_0 = 1 - \frac{n_c^2 - n_0^2}{n_p^2 - n_0^2} \quad \text{[Expression 10]}$$

wherein $n_p$ represents the refractive index of the material that constitutes the microparticles; $n_o$ represents the refractive index of air=1.0; and $n_c$ represents the apparent refractive index.

(Evaluation Method for Adhesive Force)

In order to measure the adhesive force of the microparticle-laminated thin film, an adhesive tape (trade name: No. 31B, manufactured by Nitto Denko Corp.; polyester adhesive tape) was adhered and then peeled by pulling. If the microparticle-laminated thin film was easily peeled from the substrate and was transferred to the adhesive tape side, it was judged that the adhesive force was insufficient.

The peel strength of this adhesive tape with respect to the PET film was 6 N/19 mm (3 N/10 mm). The method for measuring the peel strength was such that the load required when peeling was performed using a constant speed elongation type tensile tester (trade name: RTM-10, manufactured by Orientech Co., Ltd.; temperature: room temperature (25° C.), testing method: T-type peeling, peeling speed: 0.2 m/min), was designated as the peel strength, thereby the adhesiveness was evaluated. In regard to the adhesiveness, when the adhesive tape mentioned above was pasted and peeled, the case in which there was no change in the film was rated as ○, and the case in which no film was left behind was rated as x.

(Method for Evaluating Scratch Resistance)

The evaluation of scratch resistance was carried out by rubbing the tip of a cotton swab against the film. First, a sample was pressed against a cotton swab which was fixed at an angle of 90° with respect to the sample. The load applied on the sample by the cotton swab was set at 100±0.5 g. When a scratch such as slightly cutting into the surface of the film was observed, it was judged to be "scratched". The case in which no scratches were produced was rated as ○, and the case in which scratches were produced was rated as x.

(Method for Evaluating Thermal Cracking Resistant Properties)

In the method for evaluating the thermal cracking resistant properties, when a film-attached substrate was placed on a hot plate at 105° C., with the substrate surface facing down, and the substrate was heated for one hour, the surface of the film was observed with a microscope. The case in which there was no change was rated as 0, and the case in which cracking occurred was rated as x.

The evaluation results for the microparticle-laminated thin film thus obtained are presented in Table 4.

TABLE 4

|  | Refractive index | Film thickness (nm) | Porosity (%) | Adhesiveness | Scratch resistance | Resistance to thermal cracking |
|---|---|---|---|---|---|---|
| Example 20 | 1.25 | 110 | 53 | ○ | ○ | ○ |
| Example 21 | 1.25 | 110 | 53 | ○ | ○ | ○ |
| Example 22 | 1.25 | 110 | 53 | ○ | ○ | ○ |
| Example 23 | 1.25 | 110 | 53 | ○ | ○ | ○ |
| Example 24 | 1.25 | 110 | 53 | ○ | ○ | ○ |
| Example 25 | 1.25 | 110 | 53 | ○ | ○ | ○ |
| Example 26 | 1.25 | 110 | 53 | ○ | ○ | ○ |
| Example 27 | 1.25 | 110 | 53 | ○ | ○ | ○ |
| Comparative Example 3 | 1.38 | 100 | 0 | ○ | ○ | X |
| Comparative Example 4 | 1.21 | 100 | 63 | X | X | ○ |
| Comparative Example 5 | 1.25 | 100 | 53 | ○ | ○ | X |

The method for producing a microparticle-laminated thin film-attached substrate of the present invention is a method for producing an anti-reflection film excellent in mass productivity, because a porous film-attached substrate excellent in the scratch resistance and the resistance to thermal cracking can be produced only by bringing a microparticle-laminated thin film formed by an alternate lamination method, into contact with an alcoholic silica sol and heating the film using an oven or the like.

DESCRIPTION OF REFERENCE NUMERALS

1 SUBSTRATE
2 ELECTROLYTE POLYMER
3 MICROPARTICLES
4 VOIDS
5 ALCOHOLIC SILICA SOL PRODUCT
10 MICROPARTICLE-LAMINATED THIN FILM

The invention claimed is:

1. A method for producing a microparticle-laminated thin film-attached substrate in which a microparticle-laminated thin film having voids is formed on a plastic substrate, the method comprising:
 (A) having a plastic substrate having a coefficient of thermal expansion of 50 to 350 (ppm/K), brought into contact with or coated thereon with any of an electrolyte polymer solution and a microparticle dispersion liquid;
 (B) having the plastic substrate obtained after the contact or coating with the electrolyte polymer solution, brought into contact with or coated thereon with a dispersion liquid of microparticles having a charge opposite to that of an electrolyte polymer of the electrolyte polymer solution, or having the plastic substrate obtained after the contact or coating with the microparticle dispersion liquid, brought into contact with or coated thereon with a solution of an electrolyte polymer having a charge opposite to that of microparticles of the microparticle dispersion liquid; and
 (C) binding microparticles of the microparticle dispersion liquid and adhering the microparticle-laminated thin film obtained after the contact or coating with the electrolyte polymer solution or the microparticles to the plastic substrate by filling voids within the microparticle-laminated thin film with an applied alcoholic silica sol product.

2. The method for producing a microparticle-laminated thin film-attached substrate according to claim 1, wherein the step (A) and the step (B) are alternately repeated two or more rounds, and then the step (C) is carried out.

3. The method for producing a microparticle-laminated thin film-attached substrate according to claim 2, wherein (D) rinsing is carried out after the step (A) and/or the step (B).

4. The method for producing a microparticle-laminated thin film-attached substrate according to claim 2, wherein a heat treatment is carried out after the step (C).

5. The method for producing a microparticle-laminated thin film-attached substrate according to claim 1, wherein (D) rinsing is carried out after the step (A) and/or the step (B).

6. The method for producing a microparticle-laminated thin film-attached substrate according to claim 1, wherein a heat treatment is carried out after the step (C).

7. The method for producing a microparticle-laminated thin film-attached substrate according to claim 6, wherein a temperature of the heat treatment is a glass transition temperature of the plastic substrate or a temperature higher than the glass transition temperature.

8. The method for producing a microparticle-laminated thin film-attached substrate according to claim 6, wherein the temperature of the heat treatment is 20 to 260° C.

* * * * *